United States Patent [19]
Iwakawa et al.

[11] Patent Number: 5,583,860
[45] Date of Patent: Dec. 10, 1996

[54] COMMUNICATIONS NETWORK INDEPENDENT DESIGNING SYSTEM AND MANAGING METHOD

[75] Inventors: Akinori Iwakawa, Kanagawa, Japan; Zhisheng Niu, Beijing, China; Shunji Abe, Kanagawa, Japan

[73] Assignee: Fujitsu Limited, Kanagawa, Japan

[21] Appl. No.: 278,270

[22] Filed: Jul. 21, 1994

[30] Foreign Application Priority Data

| Jul. 21, 1993 | [JP] | Japan | 5-180476 |
| Dec. 20, 1993 | [JP] | Japan | 5-320316 |
| Jul. 19, 1994 | [JP] | Japan | 6-165704 |

[51] Int. Cl.⁶ ............................. H04L 12/56
[52] U.S. Cl. .................. 370/232; 370/237; 370/352
[58] Field of Search .................... 370/60, 60.1, 94.1, 370/94.2, 16, 17, 13, 118, 94.3, 95.1, 95.3, 85.7, 85.6

[56] References Cited

U.S. PATENT DOCUMENTS

| 4,864,567 | 9/1989 | Giorgio | 370/118 |
| 4,984,264 | 1/1991 | Katsube | 370/17 |
| 5,119,367 | 6/1992 | Kawakatsu et al. | 370/94.1 |
| 5,153,877 | 10/1992 | Esuki et al. | 370/94.1 |
| 5,280,470 | 1/1994 | Buhrke et al. | 370/13 |

*Primary Examiner*—Douglas W. Olms
*Assistant Examiner*—Ajit Patel

[57] ABSTRACT

A designing and managing system for a communications network having a physical network and a logical network includes a designing system adaptable to a traffic fluctuation through a simple procedure, and a managing system for quickly selecting a suitable communications path in response to a path connection request and a path capacity change request. The designing system has units for respectively determining the topologies of the physical network and the logical network independently of traffic conditions, and units for setting the path capacities of the physical network and the logical network, respectively, based upon a long-term traffic demand and an actual request. The managing system includes a unit for registering the limited number of detour path candidates, a unit for determining the existence of a detour path in response to a virtual path connection request, and a unit, provided in a start point node of a communications path, for determining the acceptability of a change in the capacity of a path based on a value of a size of each link forming part of the communications path.

26 Claims, 58 Drawing Sheets

|  | DISTANCE (Lij) |
|---|---|
| BETWEEN A AND B | 5 km |
| BETWEEN A AND C | 4 km |
| BETWEEN A AND D | 2 km |
| BETWEEN B AND C | 11 km |
| BETWEEN B AND D | 8 km |
| BETWEEN C AND D | 5 km |

FIG. 13

| DESTINATION NODE NUMBER | NEXT NODE NUMBER IN PATH | VIRTUAL PATH IDENTIFICATION NUMBER | VIRTUAL PATH CAPACITY |
|---|---|---|---|
| 2 | 2 | 1 1 0 | 0 |
| 3 | 2 | 0 5 2 | 0 |
| 4 | 3 | 3 6 5 | 0 |
| 5 | 2 | 1 5 2 | 0 |
| . . . | . . . | . . . | . . . |

FIG. 14

| | CALL AMOUNT | PEAK BAND | REQUEST QUALITY (LOST-CALL RATE) | REQUISITE BAND |
|---|---|---|---|---|
| BETWEEN A AND B | 2.0 | 10 Mb/s | $10^{-3}$ | 80 Mb/s |
| BETWEEN A AND C | 2.5 | 10 Mb/s | $10^{-3}$ | 90 Mb/s |
| BETWEEN A AND D | 0.3 | 30 Mb/s | $10^{-2}$ | 90 Mb/s |
| BETWEEN B AND C | 3.0 | 6 Mb/s | $10^{-2}$ | 48 Mb/s |
| BETWEEN B AND D | 0.2 | 30 Mb/s | $10^{-5}$ | 150 Mb/s |
| BETWEEN C AND D | 0.8 | 20 Mb/s | $10^{-3}$ | 80 Mb/s |

FIG. 15

| i-j | MEDIA | CALL AMOUNT | PEAK BAND | ALLOWED LOST-CALL RATE | REQUISITE BAND |
|---|---|---|---|---|---|
| A·B | MEDIA 1 | 10erl | 64 kb/s | $10^{-3}$ | 90.8Mb/s |
| | MEDIA 2 | 0.1erl | 30 Mb/s | $10^{-3}$ | |
| A·C | MEDIA 1 | 10erl | 64 kb/s | $10^{-3}$ | 61.2Mb/s |
| | MEDIA 2 | 0.04erl | 30 Mb/s | $10^{-3}$ | |
| A·D | MEDIA 1 | 70erl | 64 kb/s | $10^{-3}$ | 34.8Mb/s |
| | MEDIA 2 | 0.1erl | 10 Mb/s | $10^{-3}$ | |
| B·C | MEDIA 1 | 50erl | 64 kb/s | $10^{-3}$ | 93.5Mb/s |
| | MEDIA 2 | 0.1erl | 30 Mb/s | $10^{-3}$ | |
| B·D | MEDIA 1 | 30erl | 64 kb/s | $10^{-3}$ | 102.3Mb/s |
| | MEDIA 2 | 3erl | 10 Mb/s | $10^{-3}$ | |
| C·D | MEDIA 1 | 30erl | 64 kb/s | $10^{-3}$ | 62.5Mb/s |
| | MEDIA 2 | 0.02erl | 30 Mb/s | $10^{-3}$ | |

FIG. 16

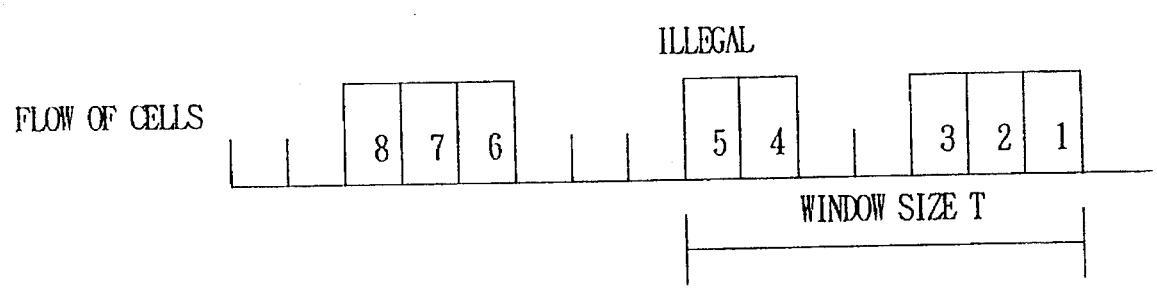
F I G. 1 9

| LINK NUMBER | TOTAL BAND CAPACITY Mb/s | RESERVED BAND CAPACITY Mb/s | BAND CAPACITY BEING USED | | AVAILABLE BAND CAPACITY | |
|---|---|---|---|---|---|---|
| | | | SHARED BAND Mb/s | RESERVED BAND Mb/s | SHARED BAND Mb/s | RESERVED BAND Mb/s |
| 1 | 600 | 100 | 300 | 50 | 200 | 50 |
| 2 | 2400 | 600 | 1200 | 400 | 600 | 200 |
| 3 | 600 | 200 | 200 | 0 | 200 | 200 |
| 4 | 2400 | 300 | 1800 | 150 | 300 | 150 |
| 5 | 600 | 150 | 400 | 150 | 50 | 0 |
| ... | ... | ... | ... | ... | ... | ... |

FIG. 23

|  | DISTANCE (km) |
|---|---|
| A—B | 10 |
| A—C | 5 |
| A—D | 4 |
| A—E | 2 |
| B—C | 10 |
| B—D | 12 |
| B—E | 13 |
| C—D | 4 |
| C—E | 5 |
| D—E | 3 |

FIG. 26

| ROUTE ID | INFORMATION PACKET | NODE 5 ID | SPARE CAPACITY 6→5 | NODE 6 ID | ... |
|---|---|---|---|---|---|

F I G. 3 0

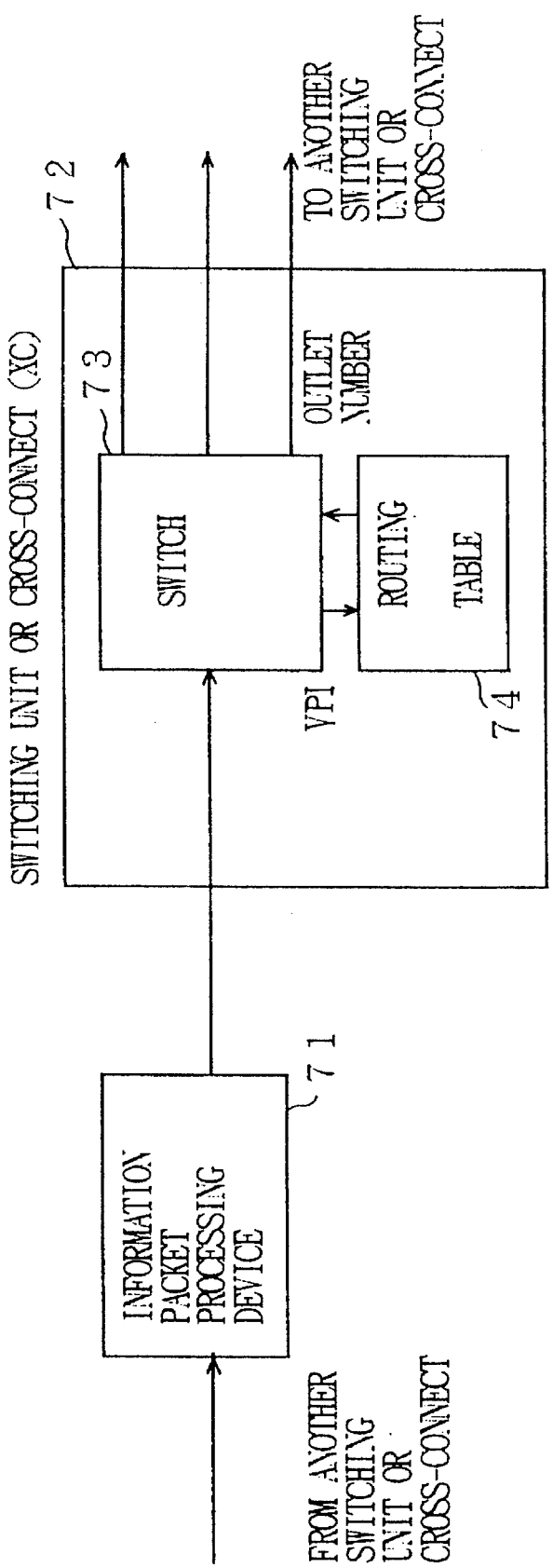
F I G. 32

| 1 | 2 | 3 |
|---|---|---|
| OBJECT NODE | VPI | REDUNDANCY FLAG |
|  |  |  |

( ACCOMMODATING VP STARTING FROM PRESENT NODE ONLY )

FIG. 35

| 1 | 2 | 3 |
|---|---|---|
| OUTLET NUMBER | ADJACENT NODE ID | SPACE BAND |
| 1 | 18 | 100 |
| 2 | 22 | 200 |
|  |  |  |

( ACCOMMODATING VP STARTING FROM PRESENT NODE ONLY )

FIG. 39

| st \ dt | 1 | 2 | 3 | 4 | 5 |
|---|---|---|---|---|---|
| 1 | | | | | |
| 2 | | | | | |
| 3 | | | | | |
| 4 | | | | | |
| 5 | | | | | |

FIG. 41

| VPI | PATH INFORMATION |
|---|---|
| 3 | 643510 |
| 5 | 256310 |
| 4 | 872563140 |
| 6 | 325670 |
|  |  |

(ALL VPs ARE ACCOMMODATED)

FIG. 47

| DESTINATION NODE | VPI | REDUNDANCY FLAG |
|---|---|---|
| 1 | 132 | 0 |
| 1 | 102 | 1 |
| 2 | 011 | 0 |
| 3 | 202 | 1 |
| 5 | 189 | 0 |
| 0 | 0 | 0 |

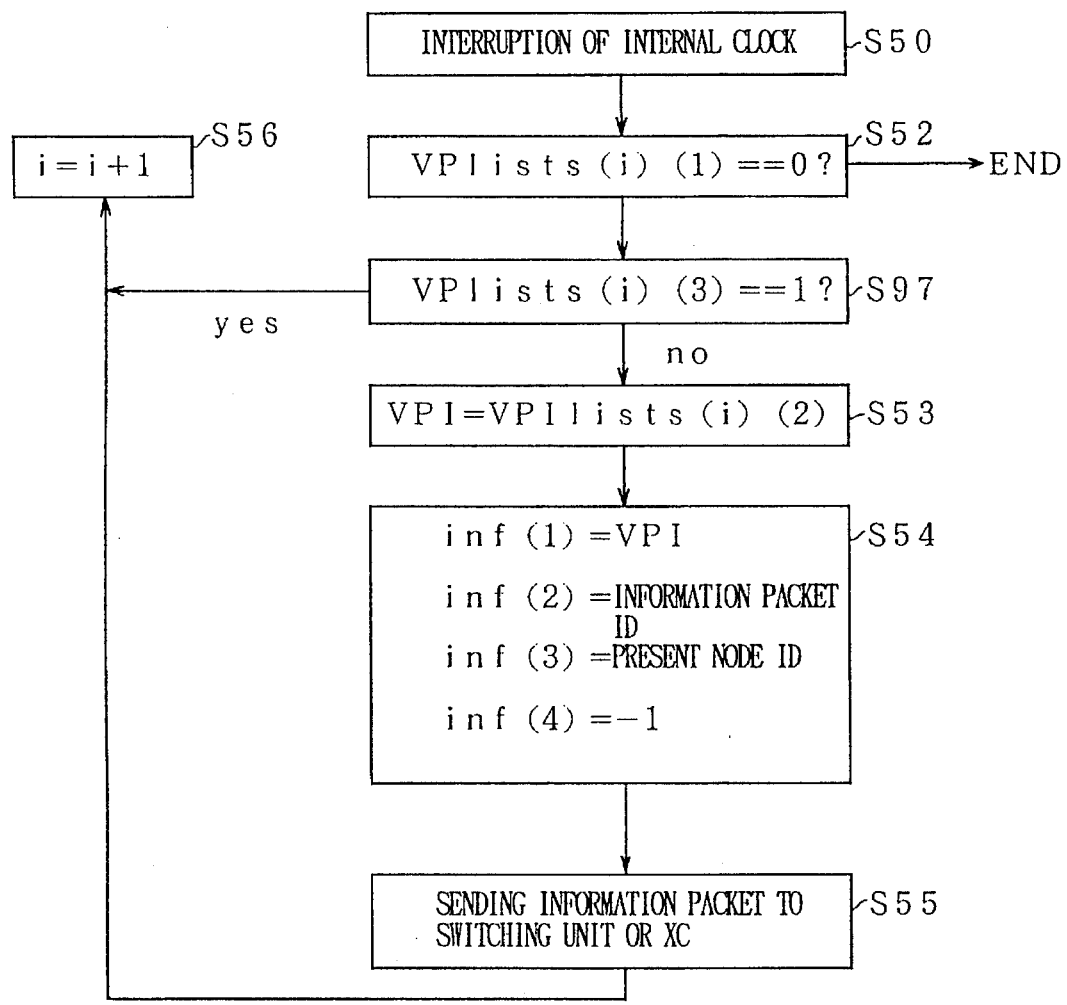
F I G. 5 7

COMMUNICATIONS NETWORK INDEPENDENT DESIGNING SYSTEM AND MANAGING METHOD

BACKGROUND OF THE INVENTION

1. Field of the Invention

The present invention relates to a method of designing a communications network comprising a physical network and a logical network, and to a method of managing the designed communications network. The designing method aims to have a system quickly and flexibly respond to, for example, the fluctuation of traffic using simple designing procedures by individually designing the topology and the capacity of the communications network. The managing method aims to shorten the time taken for selection of an applicable communications path in response to a request to connect a virtual path, and to enable the capacity to be altered, in response to a request to alter the capacity of a communications path, by quickly selecting one of a plurality of virtual paths defined between two nodes in the communications path.

2. Description of the Related Art

The present invention has been developed based on the following background. First, the concept of a logical network has been introduced into the concept of an ATM network, that is, forming a communication network of a new generation. Second, the topology and the capacity of the logical network can be flexibly set and independently controlled. Third, as communications networks grow in scale and communications services are vigorously diversified, it has become very hard to precisely estimate the traffic demand and characteristics accommodated in a communications network, and their values are subject to constant changes.

Thus, a conventional complicated optimization design method using a specific traffic pattern does not work effectively, and such a simple and flexible method of designing a communications network is needed which flexibly handles various traffic conditions. Since both a physical network and a logical network are required in designing a communications network, respective shares of both networks should be carefully considered to design the simplest possible network.

According to the conventional technology of designing a communications network comprising a physical network and a logical network, the logical network is optimally designed, first based on a specific traffic condition and request quality, and then in accordance with the result the physical network is designed for optimal accommodation. Accordingly, if a traffic condition or a request quality of a service is changed, then the above described design cycle must be reconsidered from the very beginning, thereby falling into the problem that traffic fluctuation cannot be quickly reflected.

Furthermore, with remarkable progress in information communications technologies, it will be more and more difficult to exactly estimate traffic condition, and the optimization design technology based on a specific traffic condition can no longer be effective.

Explained below is the conventional technology relating to the demand for communications over a designed communications network, that is, relating to a communications network managing method. In the conventional communications network, there has only been the concept of a physical network, and the physical network has a hierarchy of connection nodes such as a control center, a primary center, a toll center, an end office, etc. As a rule, primary centers are connected as if they were satellites to a control center, toll centers are connected as if they were satellites to a primary center, end offices are connected as if they were satellites to a toll center, and control centers are connected to one another to form a meshwork. Since the configuration matches the purpose of reducing the cost of transmission lines which occupies a large share in an entire cost of a communications system. Furthermore, there has been a single information medium and a rare change in the amount of information. Therefore, the traffic amount can be easily estimated, and the above described network can sufficiently meet the demand for communications.

Lately, there has been an increasing demand for data transmission and transmission via facsimile. In this case, though, a network is fixed each time a service is presented.

With an increasing number of digitalized telephone networks, a demand for a transmission via facsimile has considerably grown, and broadband communications in TV conferences have been increasingly requested. However, traffic has been dominated by services of less than the basic unit 64 Kb/s of telephone networks. Therefore, in N-ISDN, most settings indicate 64 Kb/s with a primary speed appropriately covered.

As information communications have been used widely in the fields of ordinary life, industrial activities, etc., the users' demand for communications services includes higher-level services such as:

1. High-speed communications services such as communications among LANs, transmissions of large files, HDTV, CATV, etc.;
2. Requests for multimedia communications services from single-media communications services; and
3. Requests for more flexible communications services.

Thus required are communications networks according to new concepts and functions.

On the other hand, the optical transmission technologies have advanced greatly and now prevail, and the costs for transmission lines have been reduced to a great extent, thereby causing communications business a problem that communications nodes should be configured more effectively.

Taking these demands and conditions into account, an asynchronous transfer mode (ATM) has been actively studied in various fields. In the B-ISDN, the ATM allows a plurality of media having different requisite bands to be integrally processed, and its standardization is earnestly requested internationally.

The features of the ATM reside in that:

(1) The concept of virtual path is introduced to establish a simple and flexible network. That is, a communications network is composed of a physical network and a logical network. The logical network can be designed flexibly.

(2) A user specifies one of a plurality of service qualities provided by the network and requests for communications (issues a call). In response to the call, the network determines whether or not the call can be connected.

On the other hand, the multimedia communications makes the estimation of the demand for traffic more difficult.

Therefore, in the communications network in the ATM, it is important to manage the resources flexibly and efficiently when a completely new method is realized in designing and managing the communications network, and the estimation of traffic demand is very difficult.

For example, a serious problem in managing an ATM network is that a single communications path, for example, a virtual path connection is provided between optional nodes in a network, or another path, that is, a detour path connection is permitted to meet the traffic demand in the network.

If only a single virtual path connection is permitted in a network, then a new transmission link is not searched for in response to a change in traffic condition, but the capacity in a predetermined transmission link is increased or decreased. It is an effective method providing for simplicity of a large-scale communications network accommodating multimedia traffic.

However, relating to the efficiency of the network, the traffic load actually applied to each communications node is not balanced well. Furthermore, the "burst" brings forth unequal service quality between different calls due to lack of a detour transmission link. Moreover, a busy transmission link prevents communications from being established even if there is another transmission link available, thereby reducing the efficiency of the network.

If, to solve the above described problems, a detour is permitted to all communicable transmission path connections in response to a large number of communications connection requests which cannot be accommodated in a predetermined transmission link, then there is the problem that an undesirably long time and a large amount of control are required to select detour transmission path connections as the network grows larger in scale. Thus, the network fails to flexibly respond to a change in traffic.

Furthermore, even if detour paths are established between optional nodes in an ATM network, that is, communications paths of a limited number, for example, virtual paths are established, there is no specific method of selecting communications paths meeting a change request from among a plurality of communications paths in response to the communications capacity change request between optional nodes. Therefore, much time has been taken for experimental selection of detour paths.

SUMMARY OF THE INVENTION

The first object of the present invention relates to a communications network designing method, and is to provide a communications network designing method for flexibly and quickly meeting both a short-term fluctuation of traffic requirements and a long-term change in traffic demand using a simple design procedure.

The second object of the present invention is to provide a communications network managing method of shortening time taken for a search for an available detour communications path while allowing for the lost-call rate in processing a request to connect a virtual path even in a large-scale communications network The third object of the present invention is to provide a communications network managing method for quickly selecting a virtual path to meet a capacity change request from among a plurality of virtual paths existing in optional nodes in response to a communications capacity change request between the nodes.

A feature of the present invention resides in a traffic and topology independent communications network designing system for use in a communications network having a physical network and a logical network established among a plurality of nodes, comprising a physical network topology designing unit for setting a topology of the physical network independently of a traffic condition of the communications network, a logical topology designing unit for setting a topology of the logical network independently of the traffic condition, a physical network capacity setting unit for setting based on a long-term traffic demand in the communications network a capacity of a transmission line in the physical network having the topology of the physical network and a logical network capacity setting unit for setting based on an actual traffic demand in the communications network a capacity of a virtual path in the physical network having the set topology, wherein topologies and capacities of the physical and logical networks can be independently designed.

BRIEF DESCRIPTION OF THE DRAWINGS

One skilled in the art can easily understand additional features and objects of the invention from the description of the preferred embodiments and some of the attached drawings. In the drawings:

FIG. 13 shows the distance between each node shown in FIG. 10;

FIG. 14 shows an example of the contents of the routing table;

FIG. 15 shows a requisite band of the physical transmission link for a single media.;

FIG. 16 shows a requisite band of the physical transmission link for multimedia;

FIG. 19 shows a method of realizing UPC functions through window control;

FIG. 23 shows an example of a band management table stored in the band managing unit;

FIG. 26 shows the distance between the nodes shown in FIG. 22;

FIG. 30 shows an example of a format of an information packet;

FIG. 32 is a block diagram showing the general configuration of the communications node according to the third embodiment;

FIG. 35 shows the contents of the storage of the VP candidate table (VP lists);

FIG. 39 shows the contents stored in a spare capacity table (OUT free) in the present node;

FIG. 41 shows an example of the spare capacity table (fre(st)(dt));

FIG. 47 shows the contents stored in the VP path table (VP route)f

FIG. 57 is a detailed flowchart of the process of sending an information packet without redundancy.

DESCRIPTION OF THE PREFERRED EMBODIMENTS

Figure 1:
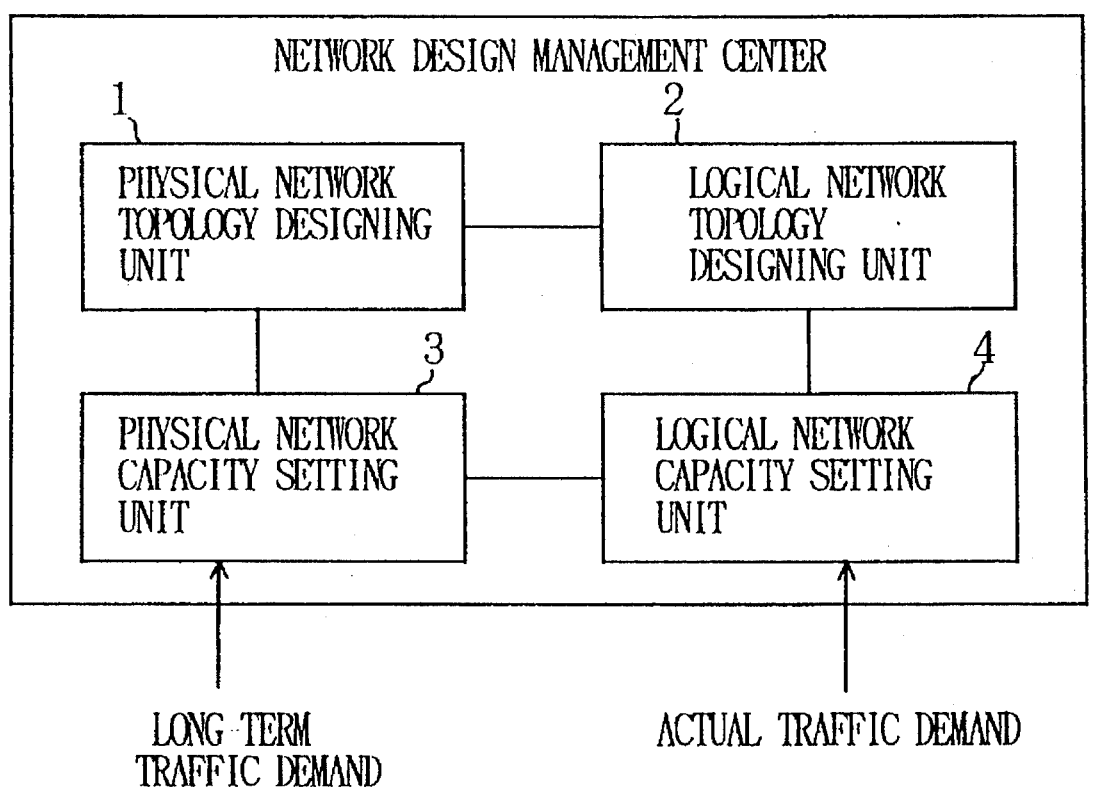
FIG. 1 is a block diagram showing the principle of the first embodiment.

FIG. 1 is the block diagram showing the principle of the first embodiment to solve the first object of the present invention. It is the block diagram showing the principle of the communications network designing method of designing the topology of a physical network and a logical network, that is, a network format, and a network capacity independently in a communications network composed of the physical network and the logical network.

In FIG. 1, a physical network topology designing unit 1 defines the topology of a physical network independently of the traffic condition of the communications network. A logical network topology designing unit 2 likewise defines the topology of a logical network independently of the traffic condition.

A physical network capacity setting unit 3 determines the capacity of a physical transmission line in the physical network whose topology is defined by the physical network topology designing unit 1 based on a long-term demand for communications network traffic, for example, a user-defined long-term demand covering a long period such as 10 to 15 years. A logical network capacity setting unit 4 determines the capacity of a virtual path in the logical network whose topology is defined by the logical network topology designing unit 2 based on an actual traffic demand in the communications network, for example, a traffic call amount declared by a user when the call is issued, a peak value of a communications speed, etc.

Figure 2:
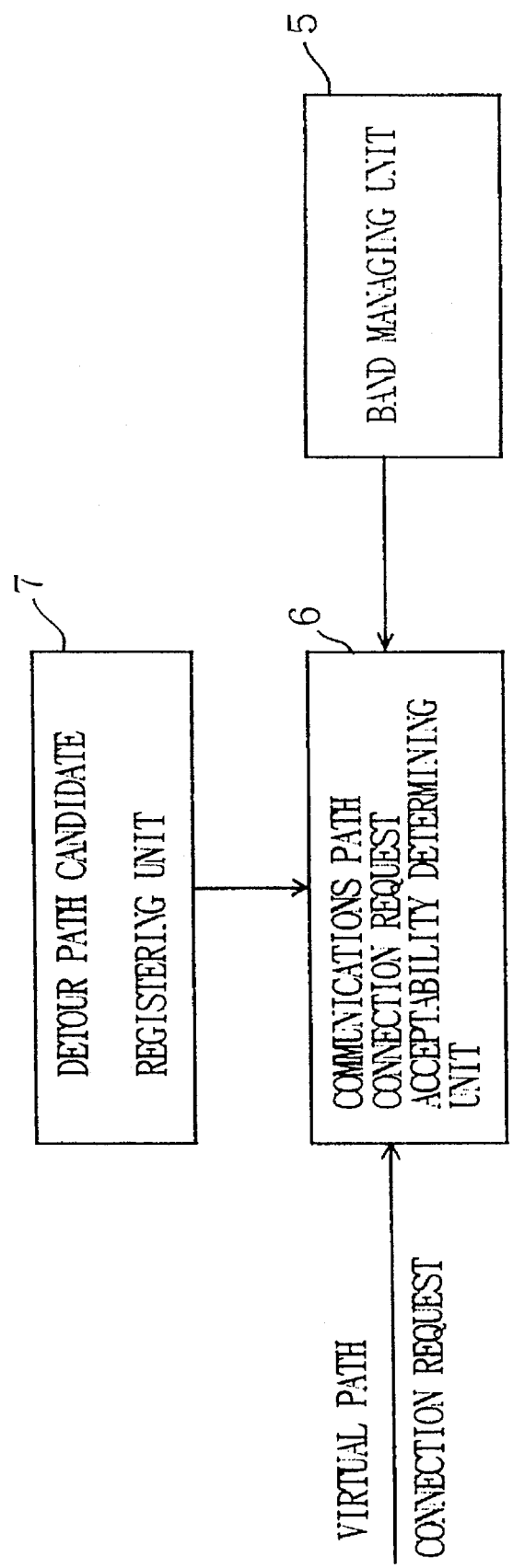
FIG. 2 is a block diagram showing the principle of the second embodiment.

FIG. 2 is the block diagram showing the principle of the second embodiment to solve the second object of the present invention. It is the block diagram showing the principle of the communications network managing method of attaining the second object of the present invention, that is, shortening the time taken to search for a communications path in response to a request issued to connect a virtual path.

In FIG. 2, a band managing unit 5, a communications path connection request acceptability determining unit 6, and a detour path candidate registering unit 7 are provided in each node in a communications network comprising a physical network and a logical network. The band managing unit 5 divides the band of a physical transmission link from a present node to an adjacent node in the physical network into a shared band and a reserved band for management. The reserved band is used for high-priority communications which requires immediate processes such as voice and image data. The shared band is used regardless of the priority of communications.

The communications path connection request acceptability determining unit 6 determines the acceptability of a connection request in response to a communications path connection request in which the unit belongs to an originating node. If the priority of the connection-requested communication is low, the determination is made for the shared band. If the priority of the connection-requested communication is high, the determination is made for both shared and reserved bands.

The detour path candidate registering unit 7 preliminarily registers a plurality of communications paths connecting the originating node it belongs to a terminating node specified in the connection request, that is, a plurality of communications path candidates including a detour path. Then, it transmits the communications path candidates to the communications path connection request acceptability determining unit 6 before determining the acceptability of the communications path connection request.

Figure 3:
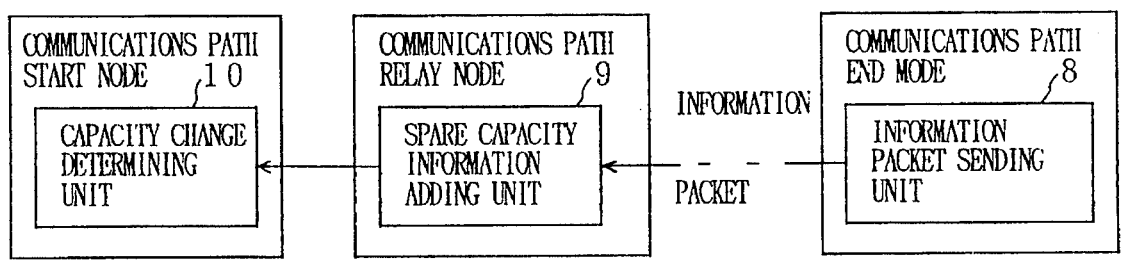
FIG. 3 is a block diagram showing the principle of the third embodiment.

FIG. 3 is the block diagram showing the principle of the third embodiment to solve the third object of the present invention. The third object of the present invention is to quickly select, in response to a request to change the capacity of a communication, a communications path meeting the capacity change request from among the plural communications paths defined between specified nodes. FIG. 3 is the block diagram showing the principle of the communications network managing method used to attain the object.

In FIG. 3, an information packet sending unit 8 is provided in a terminating node of one communications path among a plurality of nodes in a communications network comprising a physical network and a logical network. A spare capacity information adding unit 9 is provided in each relay node in the communications path. A capacity change determining unit 10 is provided in an originating node in a communications path.

The information packet sending unit 8 sends, in the opposite direction of the communications path established through an optional node, an information packet, for example, a packet for periodically informing of a spare capacity in the communications path, to the originating node of the communications path. The spare capacity information adding unit 9 adds spare capacity information for the communications path connected to the terminating node or to the adjacent relay node to the information packet received from the terminating node or the adjacent relay node in the communications path. Then, it sends the packet in the opposite direction of the communications path to the originating node in the communications path.

Based on the contents of the information packet sent from the terminating node of the communications path through each relay node, the capacity change determining unit 10 determines the acceptability of a communications capacity change request in the communications path. Depending on the determination result of the capacity change determining unit 10, a communications path is selected to meet the communications capacity change request.

In the first embodiment, the topology of a physical network is designed by the physical network topology designing unit 1 shown in FIG. 1, and the GapaGity is determined by the physical network capacity setting unit 3. On the other hand, the topology of a logical network is designed by the logical network topology designing unit 2, and the capacity is determined by the logical network capacity setting unit 4. The communications network designing method is the first embodiment of the present invention, and is featured by the following three points (1)–(3).

(1) First, a physical network designing process is separated from a logical network designing process. The physical network is designed according to a long-term traffic design and the logical network is designed according to an actual traffic demand. Thus, the system flexibly corresponds to a long-term traffic demand and a temporary request. The fluctuation of the demand and request can be reflected simply by redesigning the physical and the logical networks, thereby improving the flexibility against the fluctuation of the network traffic and simplifying the network design itself.

(2) Second, the design of the physical network is further divided into topological design and capacity design. The topology is designed independently of traffic conditions, and the capacity is designed according to long-term traffic demand. Thus, the physical network topology maintains stability without being affected by a traffic condition. Since the system responds to a change in long-term traffic demand simply by redesigning the capacity without altering the physical network topology, the network quickly responds to the traffic fluctuation as a result of the easier designing procedure.

(3) A logical network is designed separately for the topology and the capacity. The topology is first designed independently of the traffic condition, and the capacity is designed at any time according to actual traffic requirements. Thus, the logical network topology maintains stable without being affected by the traffic condition and fluctuation. In response to a request, a logical path can be set or switched only by designing the capacity without a complicated path selection control. Therefore, the network quickly corresponds to such traffic fluctuation using an easier designing procedure.

As described above, the topology of a network is designed independently of traffic conditions in a communications network comprising a physical network and a logical network according to the first embodiment. The capacity of the network is set according to long-term traffic demand or actual traffic requirements.

In the second embodiment, the most flexible mesh structure is applied as a topology of a communications network, and the band of physical transmission connection is managed divisionally. When a detour connections path is selected, a limited detour routing method is applied in which the number of selectable detour paths is limited.

Data from a terminal unit are monitored by, for example, a flow monitor whether or not the flow matches the declared value. Then, a virtual path link is determined by, for example, a self-routing switch, and communications data are sent to a trunk via an output line buffer. During the process, data such as the destination of virtual paths, communications speed, request quality, etc. are transmitted from the terminal unit to the communications path connection request acceptability determining unit 6, and the communications path connection request acceptability determining unit 6 refers to the data of the band managing unit 5, determines whether or not the virtual path has a band which provides communications quality requested by the virtual path, and determines whether or not the request to connect the virtual path is acceptable.

In the third embodiment, an information packet is periodically generated at a terminating node in each communications path defined in a communications network, and sent to the originating node in each communications path. In a trunk node in each communications path, an identifier of its node and spare capacity information of a link belonging to a corresponding communications path among output lines from the node are added to the packet and sent to the originating node of the communications path. The originating node of the communications path receives the information packet, and writes it into, for example, a spare capacity table of the node. When a request to change the capacity is issued to the communications path, it is determined whether or not the capacity of a path can be changed by sequentially checking spare capacities in a plurality of communications paths up to the destination node according to the contents of the table. If it is determined that the capacity of a path can be changed, then the capacity can be changed successfully.

Described below is the first embodiment of realizing the first object of the present invention, that is, setting a communications network design method for designing the topology and the capacity of the physical and logical networks independently.

Figure 4:
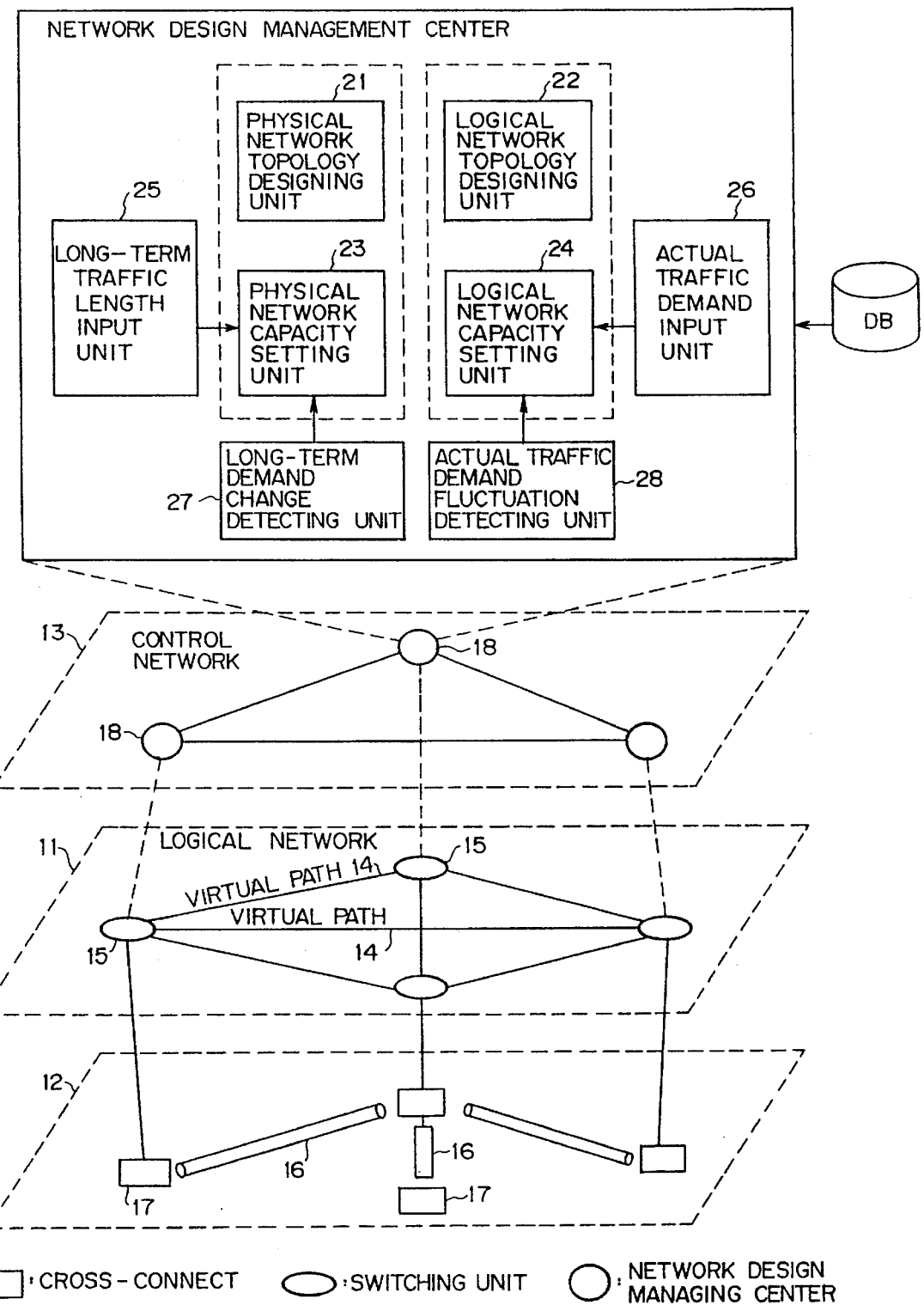
FIG. 4 shows the functions required to realize the first embodiment.

FIG. 4 shows the functions required as a communications system in the first embodiment and the correlations between them.

In FIG. 4, the communications system comprises a logical network 11, a physical network 12, and a control network 13 for controlling the operations among the networks. The logical network 11 is provided at both ends of a plurality of virtual paths 14 forming part of the logical network. It also comprises a switching unit 15 for accommodating a communications terminal, etc. The physical network 12 comprises a physical transmission link 16 such as optical cables, and a cross-connect 17 functioning as a terminal or connection point of the physical transmission link 16. The control network 13 integrally controls the logical network 11 and the physical network 12, and comprises a plurality of locally assigned network design managing centers 18 and signal lines connecting them to one another.

The network design managing center 18 for integrally controlling the logical network 11 and the physical network 12 comprises a physical network topology designing unit 21 for designing the topology of the physical network independently of the traffic condition of the communications network, a logical network topology designing unit 22 for designing the topology of the logical network independently of the traffic condition, a physical network capacity setting unit 23 for determining the capacity of the physical network based on a long-term traffic demand, and a logical network capacity setting unit 24 for determining the capacity of the logical network based on an actual traffic request.

The physical network capacity setting unit 23 is connected to a long-term traffic demand input unit 25 and a long-term traffic demand change detecting unit 27. According to a long-term traffic demand received from the long-term traffic demand input unit 25, the physical network capacity setting unit 23 determines the capacity of the physical network. A long-term traffic demand corresponds to the conditions required by users, and is specified in a long-term plan to establish a network. Practically, the traffic demand is set based on an approximate estimate for 10 or 15 years ahead. For example, if it is estimated that the traffic amount of the communications between nodes A and B is 50 erl, the peak value of the communication speed is 150 Mb/s, and the lost call rate is lower than $10^{-3}$ as the quality of a service request, then a long-term traffic demand is determined based on the estimated values.

The change in the long-term traffic demand is detected by the long-term traffic demand change detecting unit 27. When a change value exceeds a predetermined value, a request to reset the capacity of the physical network is issued to the physical network capacity setting unit 23. The change in the long-term traffic demand is detected by, for example, detecting the use rate of the physical transmission line semiannually. The capacity of the transmission line is set by the physical network capacity setting unit 23, and stored in the memory of the network design management center 18. Likewise, the capacity of a virtual path is set by the logical network capacity setting unit 24, and stored in the memory. Therefore, the use rate of the physical transmission line is obtained by periodically, for example, semiannually detecting the active band of the physical transmission line accommodating virtual paths, and by dividing the detection result by the capacity of the physical transmission line.

An actual traffic request input unit 26 and an actual traffic request change detecting unit 28 are connected to the logical network capacity setting unit 24, and the capacity of the logical network is set based on an actual traffic request input from the actual traffic request input unit 26. An actual traffic request refers to the requisite amount of traffic in a time scale such as one day or a half day, or of traffic required each time a user issues a request to connect a call. Actually, it corresponds to a traffic call amount declared by a user when a call is issued; a peak value and an average value of communication speed; quality of call such as a lost-call rate; the communication quality of cells such as a discarded-cell rate, cell delay time, etc.

The actual traffic request change detecting unit 28 carries out a detecting operation by monitoring the above listed lost-call rate, discarded-cell rate, or cell delay time. The operation is described later in detail. If the lost-call rate, discarded-cell rate, or cell delay time exceeds a predetermined value, then the logical network capacity setting unit 24 resets the capacity of the logical network.

Figure 5:
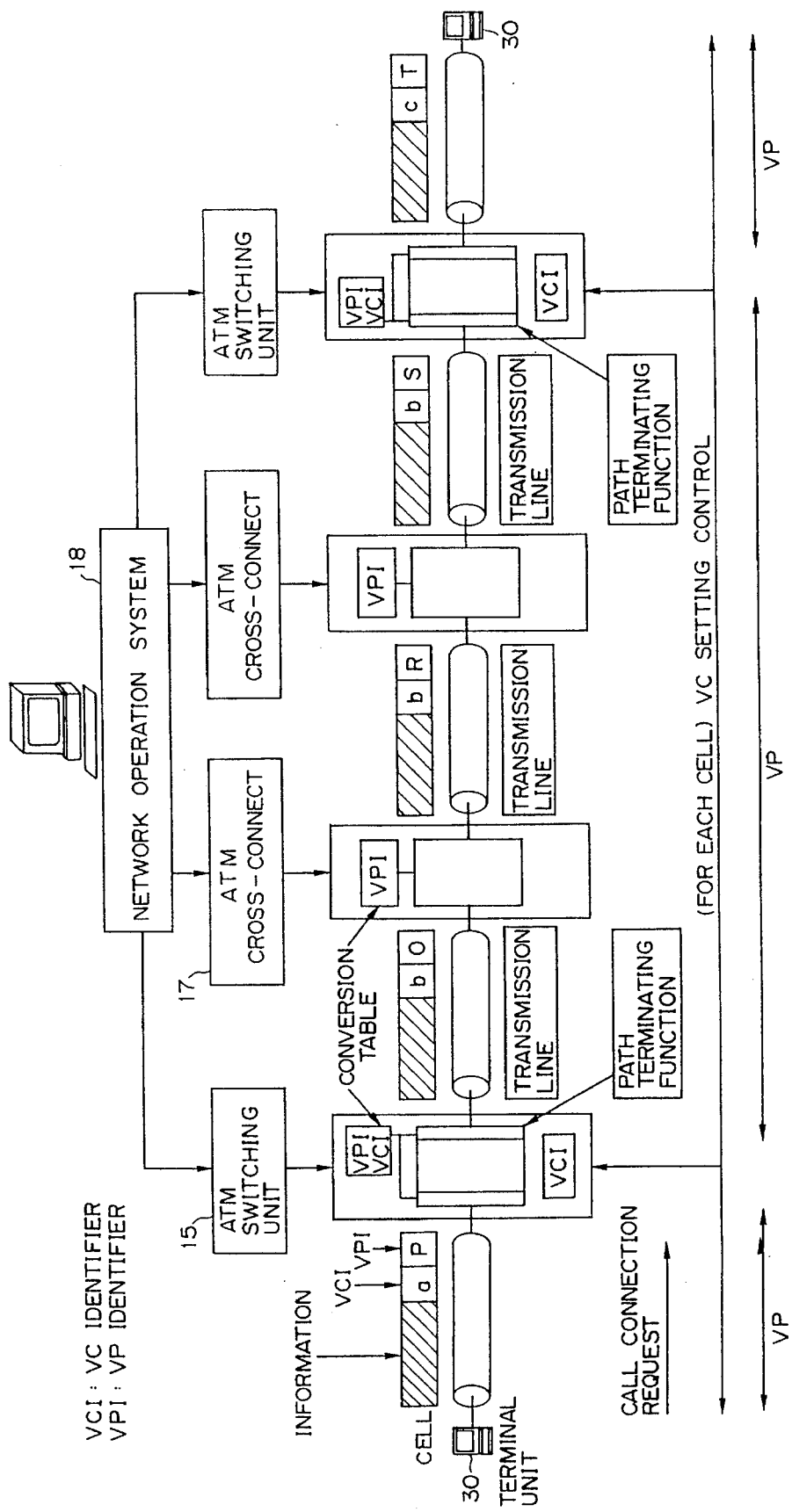
FIG. 5 shows a distribution of the functions of the ATM network.

FIG. 5 shows the distribution of the functions in the network in an asynchronous transmission mode (ATM) as a practical example of a communications network as compared with FIG. 4. In FIG. 5, an ATM cell is provided with a virtual channel identifier (VCI) and a virtual path identifier (VPI) by a terminal unit 30 and transmitted to the ATM switching unit 15. Then, it is transmitted to the ATM switching unit 15 to which a receiving terminal unit 30 is connected via transmission lines and cross-connects forming a physical network and a logical network. Finally, it is output to the receiving terminal unit 30. A terminating function for a virtual path is provided corresponding to the ATM switching unit 15. In the path between the terminating functions, an ATM cell is identified by a virtual path identifier (VPI) for transmission. The network operation system 18 controls the ATM switching unit and the ATM cross-connect 17, and is identical to the network design managing center 18.

Figure 6A:
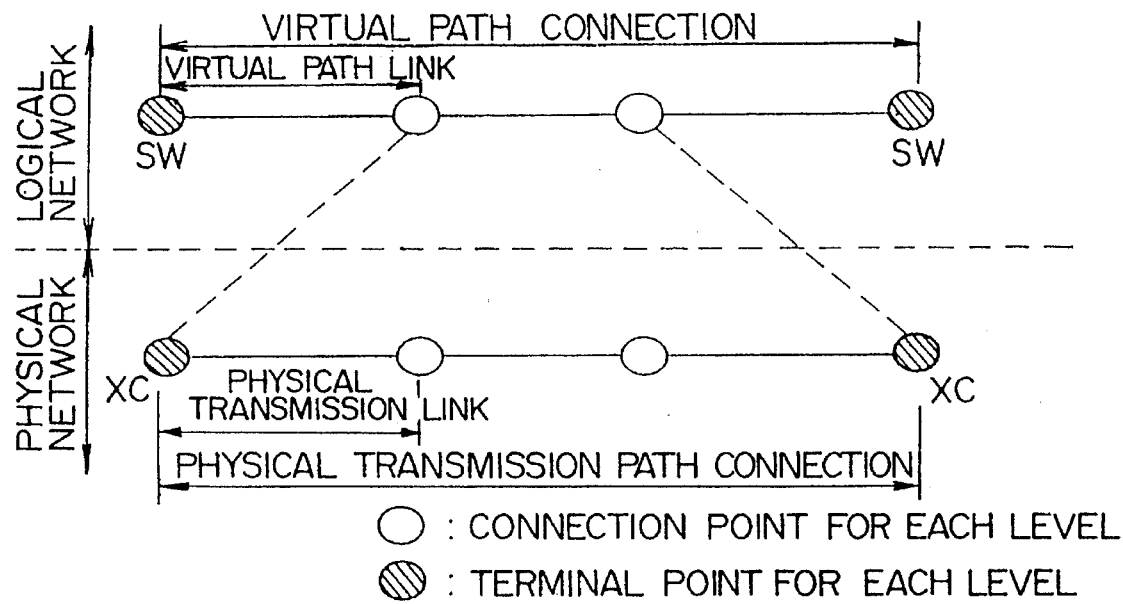
FIGS. 6A and 6B respectively show a concept of the connections and the links in the physical network and the logical network, and also shows the correspondence between the physical network and the ATM network.
Figure 6B:
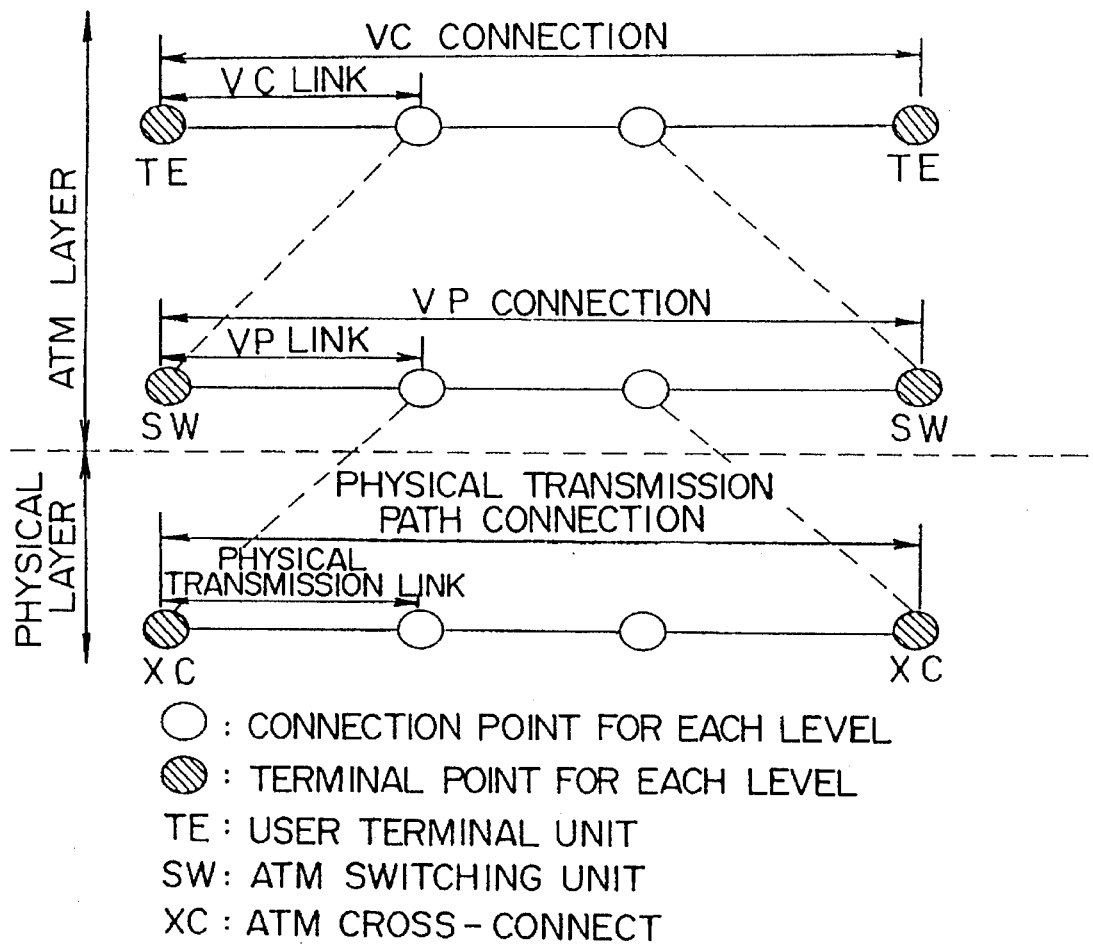

FIGS. 6A and 6B show the concept of the connections and the links in the physical network and the logical network, and also shows the correspondence between the physical network and the ATM network. FIG. 6A shows the concept of the connections and the links in the physical network and the logical network. In the logical network, the virtual path connection is formed by a plurality of virtual path links. In the physical network, the physical transmission path connection corresponds to the virtual path link in the logical network, and is formed by connecting a plurality of physical transmission links.

FIG. 6B shows the basic structure of an ATM network. In an ATM layer, user terminal equipments TE are connected to each other via a plurality of virtual channel links, that is, connections of virtual channels (VC). The virtual path (VP)

connections between the ATM switching units shown in FIG. 5 are formed by connecting a plurality of VP links. On the other hand, in a physical layer, the physical transmission path connections between the ATM cross-connect in the VP connection in the ATM layer is formed by connecting a plurality of physical transmission links.

The logical network explained in the present invention is established in a physical transmission network. In the logical network, the paths are identified by physical numbers, and the capacity is virtually assigned by a parameter. The logical network corresponds to a VC/VP network in the ATM layer of the ATM network. On the other hand, the physical network corresponds to a transmission path and refers to a physical layer.

Figure 7:
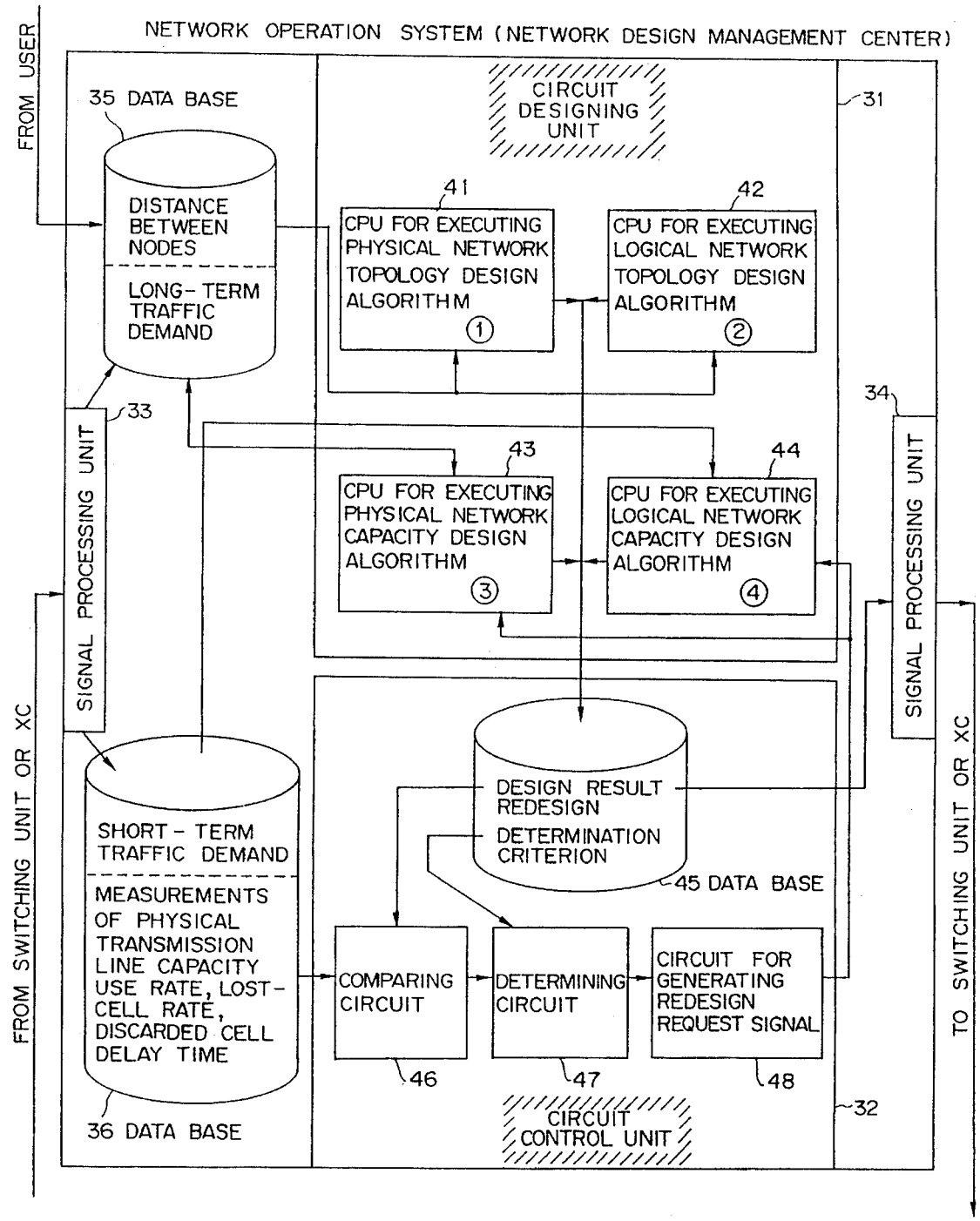
FIG. 7 is a block diagram showing the configuration of the network design managing center.

FIG. 7 is the block diagram of the configuration showing the embodiment of the network operation center (network design managing center). In FIG. 7, the network operation center comprises a circuit designing unit 31, a circuit control unit a signal processing unit 33 for processing a signal input from a switching unit or a cross-connect, a signal processing unit 34 for processing a signal output to a switching unit or a cross connect, a data base 35 for storing data relating to a long-term traffic demand, and a data base 36 for storing a data relating mainly to a short-term traffic demand.

The data base 35 stores, for example, the number of nodes corresponding to cross-connects and the distance between nodes in a physical network in addition to the data relating to a long-term traffic demand provided by users directly or from a switching unit or an XC through the signal processing unit 33. The data base 36 stores measurements of a physical transmission line capacity use rate indicating a change in a long-term demand, a lost-call rate indicating a change in a short-term demand, a discarded-cell rate, a cell delay time, etc. in addition to a short-term traffic demand, that is, an actual traffic request in a communications network. Among the traffic data input from the switching unit or the XC to the signal processing unit 33, data relating to a long-term demand are stored in the data base 35, while those relating to a short-term demand are stored in the data base 36.

The circuit designing unit 31 comprises a CPU ① 41 (corresponding to the physical network topology designing unit 21 shown in FIG. 4) for executing a physical network topology design algorithm according to the contents of the data base 35, etc., a CPU ③ 43 (corresponding to the physical network capacity setting unit 23) for executing a physical network capacity design algorithm, a CPU ② 42 (corresponding to the logical network topology designing unit 22) for executing a logical network topology design algorithm for use in designing a logical network using data on the number of nodes, etc. stored in the data base 35 independently of a traffic condition, and a CPU ④ 44 for executing a logical network capacity design algorithm using a short-term traffic demand stored in the data base 36, etc. The design results obtained by these four CPUs 41 through 44 are stored in the data base 45.

The circuit control unit 32 comprises a data base 45 for storing results of designing physical and logical networks and a redesign determination criterion, a comparing circuit 46 for comparing the measurements of a physical transmission line capacity use rate indicating a change in a long-term demand, a lost-call rate indicating a change in a short-term demand, a discarded-cell rate, and a cell delay time output by the data base 36 with the design result stored in the data base 45, a determining circuit 47 for comparing an output of the comparing circuit 46 with the redesign determination criterion in the data base 45 and determining whether or not a redesign request is required, and a circuit 48 for generating a redesign request signal according to an output of the determining circuit 47. If a redesigning is required, a redesign request signal is issued to CPU 3 43 or CPU 4 44 to redesign a physical network or a logical network.

Figure 8:
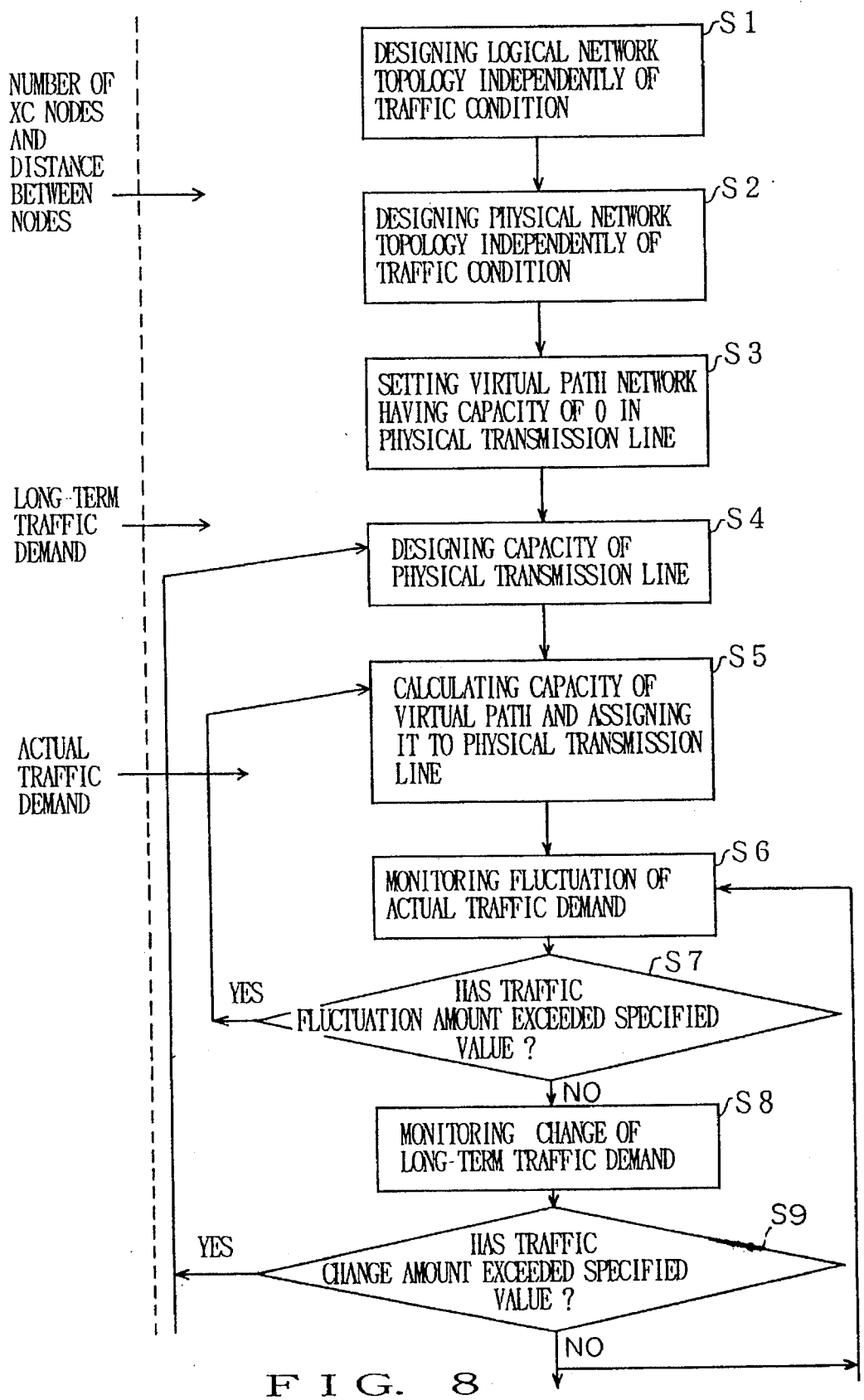
FIG. 8 is a flowchart showing the general process in the communications network design method according to the first embodiment.

FIG. 8 is the flowchart showing the entire process performed in a network design method according to the present invention. In FIG. 8, the topology of a logical network is designed independently of a traffic condition in step S1. The most common topology of the logical network is a mesh-form topology connecting all nodes. If it is certain that specific two nodes do not communicate with each other, the connection between the nodes is omitted.

Then, in step S2, a physical network topology is designed independently of a traffic condition based on the number of nodes, indicating the number of cross-connects 17, and the distance between nodes in the physical network 12 shown in FIG. 4. Then, the design of the physical network topology is explained in detail.

Figure 9:
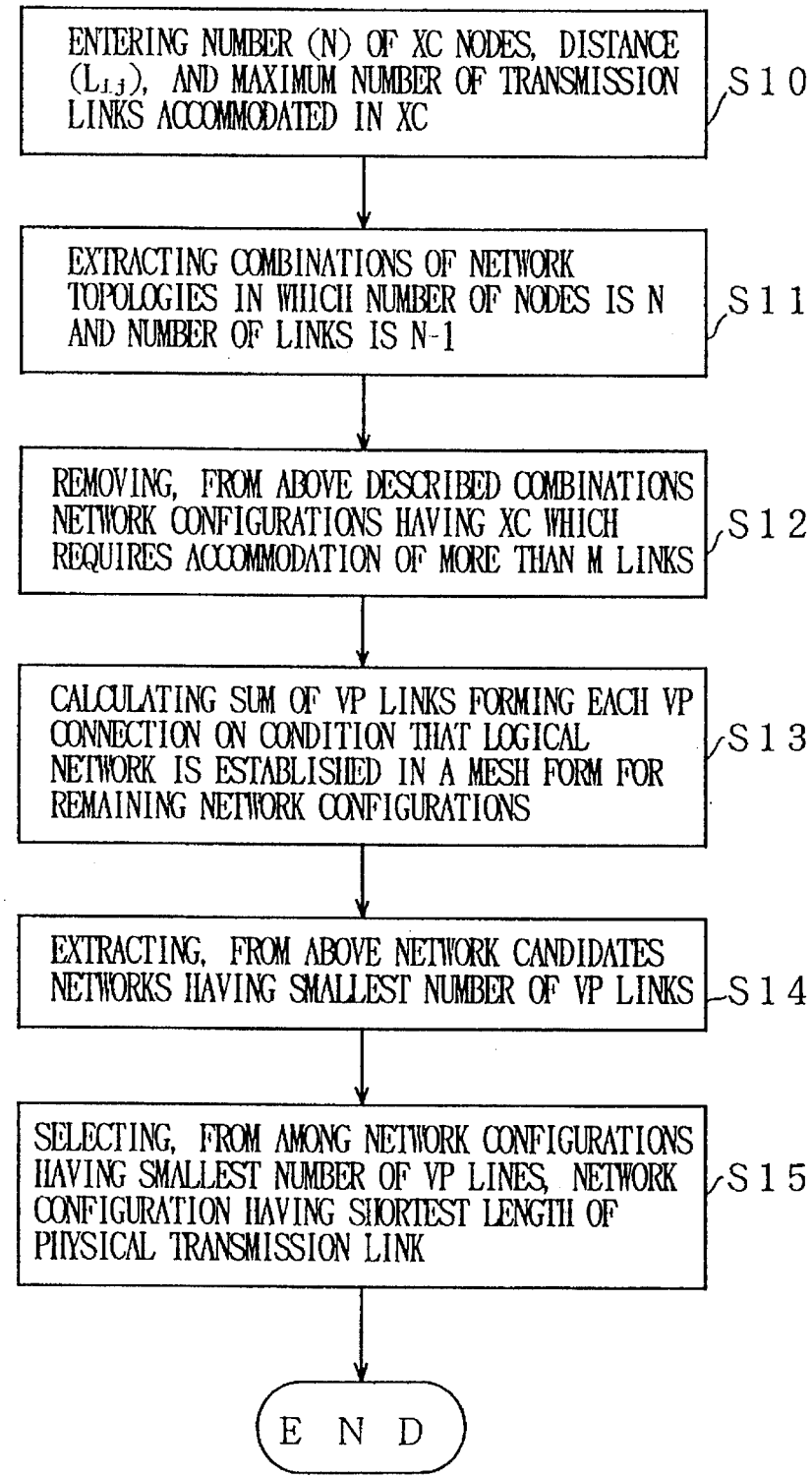
FIG. 9 is a detailed flowchart showing the process of designing the topology of the physical network.

FIG. 9 is the detailed flowchart showing the process of designing a physical network topology in step S2. In FIG. 9, the number N of nodes, that is, the number of cross-connects, the distance $L_{ij}$ between nodes, and the maximum number M of links accommodated in each cross-connect are input in step S10. A combination of the number N of nodes and the number N–1 of links in a network topology is extracted in step S11. The processes in and after step S11 are explained below by referring to FIGS. 10 and 11.

Figure 10B:
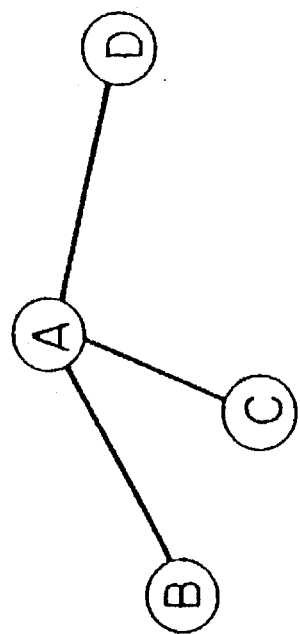
FIGS. 10A and 10B respectively show an example of the physical topology of a 4-point-node network.
Figure 10A:
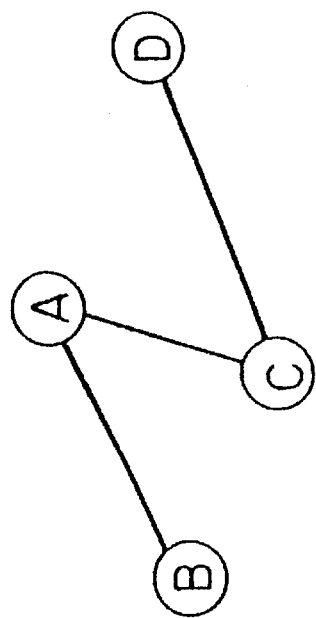

FIGS. 10A and 10B show an example of a physical network topology in a 4-point-node network comprising four nodes. It shows two types of network topologies in which the number N of nodes is 4, and the number N–1 of links is 3.

Figure 11C:
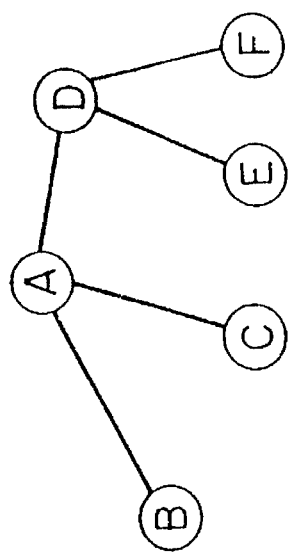
FIGS. 11A to 11C show an example of the physical topology of a 6-point-node network.
Figure 11B:
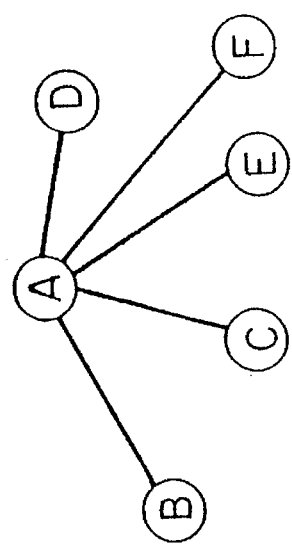
Figure 11A:
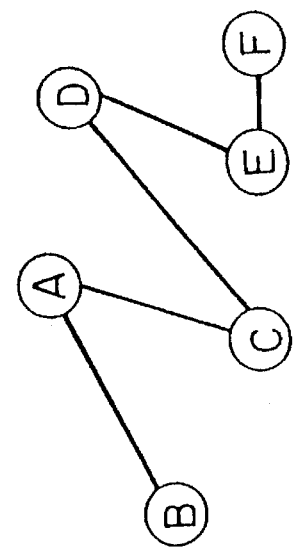

By contrast, FIGS. 11A to 11C show three types of physical network topologies of 6-point-node networks. Since the number of nodes is 6, the network topology has five links.

In step S12 shown in FIG. 9, a network topology which contains a cross-connect having the maximum number M of transmission links is removed from the combinations extracted in step S11. If M, that is, the maximum number of transmission links accommodated in a single cross-connect is 3, then the star-type network topology shown in FIG. 11B is removed from 6-point-node network topologies.

Then, in step S13, a total of virtual path (VP) links corresponding to the logical network topology designed in step S1 shown in FIG. 8 is calculated. Assuming that, for simplicity, a mesh-form logical network is established in step S1, a total number of VP links forming a VP connection between nodes shown in FIGS. 10 and 11 is calculated as follows.

A VP link refers to a plurality of links, each having nodes connected at both ends, forming a VP connection between two nodes. For example, in FIG. 10A, the VP links forming the VP connection between nodes B and D are three links between nodes B and A, A and C, and C and D. First, when node A is regarded as reference, the number of links is one between nodes A and B, and A and C, and two between A and D. Next, when node B is regarded as reference, the VP link between nodes B and A has already been counted as the VP link between nodes A and B when node A is regarded as reference. Therefore, the number of links is not counted for the VP connection. As a result, there are two links between nodes B and C and three links between nodes B and D. Furthermore, when node C is regarded as reference, there is a single link for the connection between nodes C and D.

Thus, a total number of the VP links shown in FIG. 10A is ten. By contrast, a total number of the VP links shown in FIG. 10B is nine.

When the sum of the VP links is obtained in step S13 in FIG. 9, a network topology having the smallest sum is selected in step S14 from the combinations extracted in step S11. Star-type connection (b) is selected as a network topology in FIG. 10, and star-type connection (c) is selected in FIG. 11.

Figure 12:
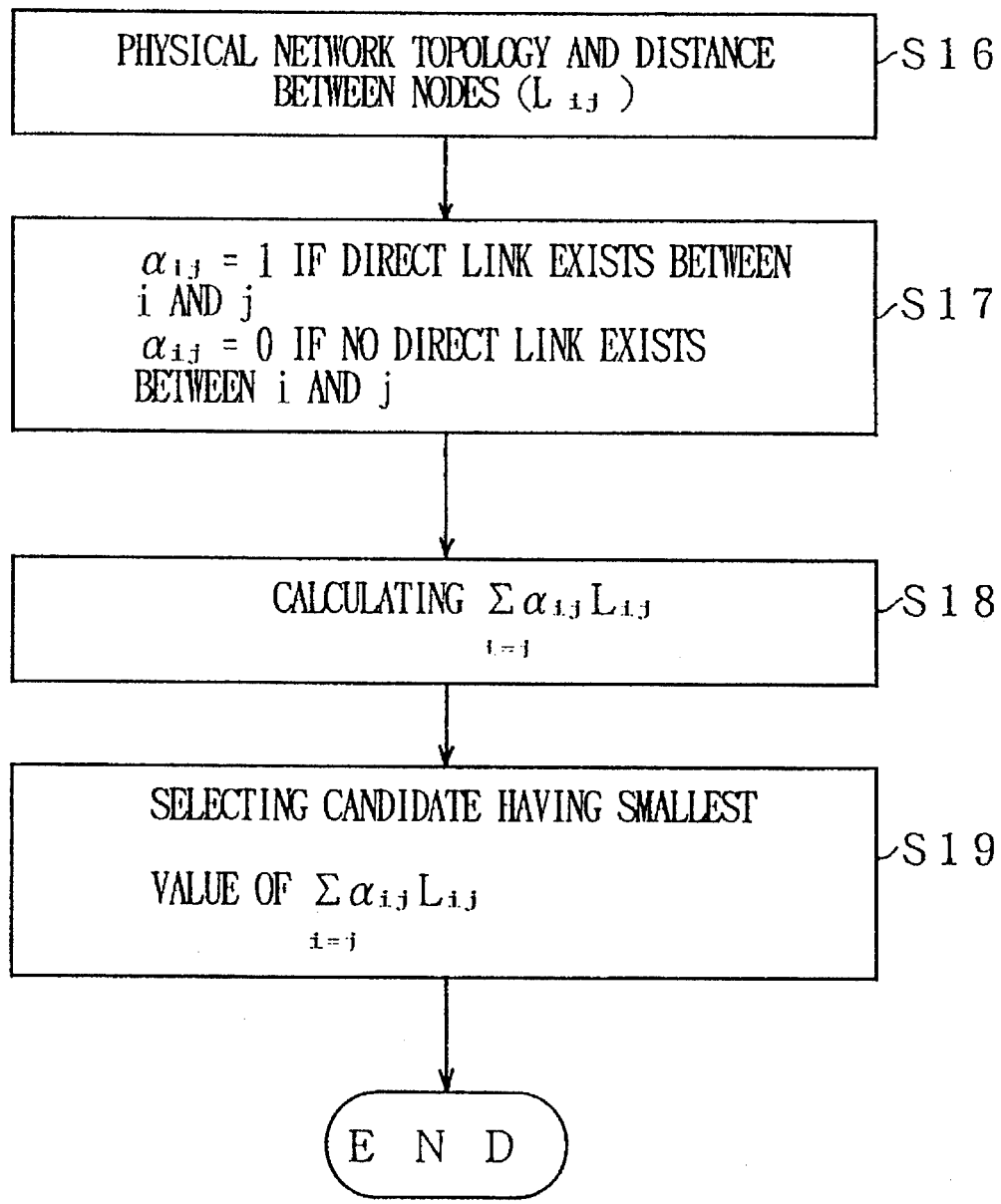
FIG. 12 is a flowchart showing the process of selecting a physical topology having the shortest total distance.

Then in step S15, the arrangement of nodes is determined in an actual network topology. For example, although star-type connection (c) is selected in FIG. 11, the total length of the physical transmission link as a physical network varies when nodes other than A and D, for example, B and C are used as the center of the star. Therefore, a node arrangement indicating the smallest value of the total link length is actually selected. FIG. 12 is the flowchart of the process of selecting a network topology having the smallest value of the total link length.

Figure 20:
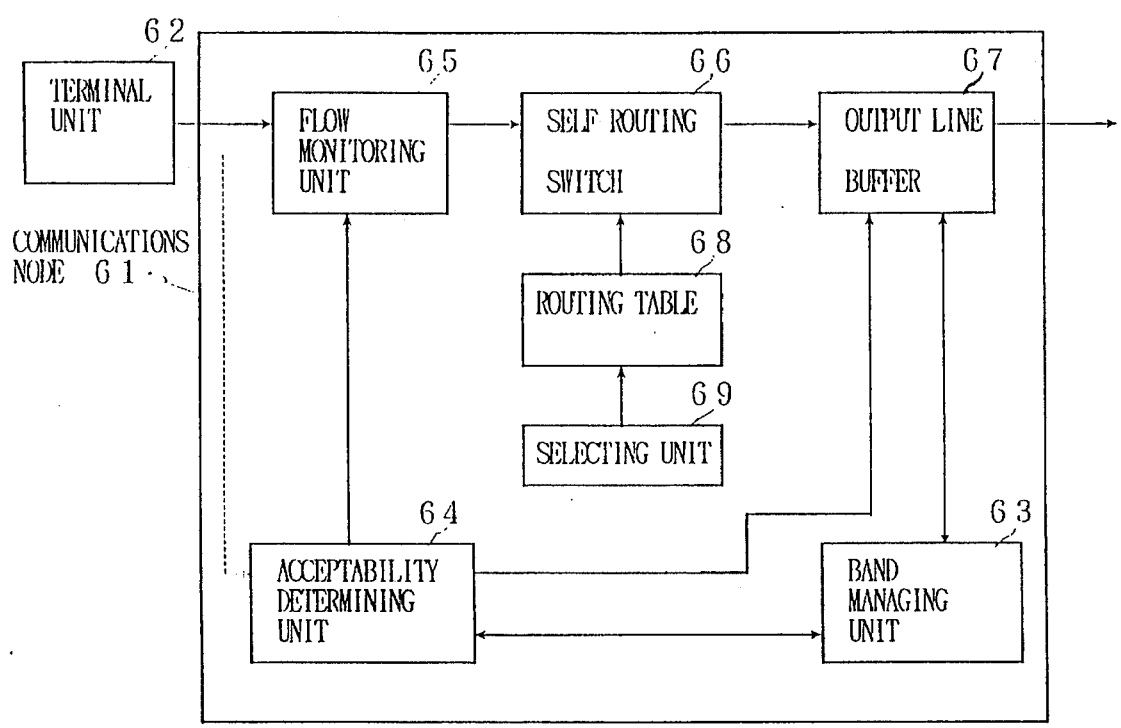
FIG. 20 is a block diagram showing the configuration of the communications node according to the second embodiment.

In FIG. 20, a physical network topology candidate and a distance $L_{ij}$ between nodes are input in step S16. In step S17, the value of $\alpha_{ij}$ is set to "1" when a direct link exists between nodes i and j and "0" when it does not exist. In step S18, a sum of the products between $\alpha_{ij}$ and the inter-node distance $L_{ij}$ is calculated as a total length of the physical transmission link. In step S19, a candidate having the smallest value of the total length is selected.

For example, the total length is calculated of the physical transmission link of the star-type network topology shown in FIG. 10B. FIG. 13 shows the distance $L_{ij}$ between nodes shown in FIG. 10. As shown in FIG. 10, when node A is a high-order node, the value of $\alpha_{ij}$ is 1 between A and B, A and C, and A and D, and 0 between B and C, B and D, and C and D. Thus, the total length of the physical transmission link is 11 kilometers. Likewise, if node B, C, or D is a high-order node, then the total length of the physical transmission link is 24, 20, or 15 kilometers respectively. Therefore, the topology having node A as a high-order node as shown in FIG. 10B is selected in step S19.

The process in step S2 shown in FIG. 8 has been thus completed. That is, a physical network topology has been designed. Then, in step S3, a virtual path network having the capacity 0 is set corresponding to a logical network topology in the physical transmission line of a designed physical network.

Explained below is the setting of a virtual path network (in step S3) having the capacity of 0 by referring to FIG. 14. FIG. 14 shows an example of the contents of a routing table provided in a node. Setting a virtual path having the capacity of 0 is only setting a virtual path route without assigning its capacity, that is, assigning the capacity of 0, between nodes which request to communicate with each other. In the routing table shown in FIG. 14, a path is specified by a destination node number, that is, an end point of a virtual path to another node to be communicated with, an identification number of the virtual path, and the next node number in the virtual path. However, the capacity assigned to the virtual path remains zero. If a packet corresponding to a communication request has arrived, a header reader in a switching unit reads the destination node number of the packet and refers to the routing table. Then, a path is selected for the packet and the packet is sent through the path.

After a virtual path having the capacity of 0 has been set in the physical transmission line corresponding the logical network topology in step S3 shown in FIG. 8, the capacity of the physical transmission line is set based on a long-term traffic demand in step S4. The setting of the capacity of the physical transmission line is explained corresponding to the physical network topology shown in FIG. 10B by referring to FIGS. 15 and 16. FIG. 15 shows the requisite band of the physical transmission link corresponding to the long-term traffic demand from a single media. FIG. 16 shows the requisite band of the physical transmission link corresponding to the long-term traffic demand from multimedia.

In the case of the single media shown in FIG. 15, a requisite band is determined corresponding to a call amount as communication requests between nodes, a peak band, and a lost-call rate as a request quality. That is, the requisite band is determined by equation of erl B in:

[Math 1]
$$B_{ij} = \frac{\frac{a_{ij}^{s_{ij}}}{s_{ij}!}}{\sum_{k=0}^{s_{ij}} \frac{a_{ij}^{k}}{k!}} \qquad \text{equation (1)}$$

Practically, the number s of required lines is calculated by equation (1) above such that lost-call rate B as service request quality meets traffic call amount a. The calculation result is multiplied by the peak band of the communication speed. The resultant product indicates the requisite band of the physical transmission line. In the equation;

$a_{ij}$ indicates a long-term demand for traffic call amount communicated between node i and node j;

$B_{ij}$ indicates a allowable lost-call rate communicated between node i and node j; and $s_{ij}$ indicates the number of lines required to accommodate the traffic between node i and node j.

Equation (1) is cited from the document by Haruo Akimaru of R. B. Cooper Communications Traffic Technology published by Maruzen in 1985.

The requisite band calculated by equation (1) is shown in the right-most column in FIG. 15. For example, the capacity of the physical transmission line between nodes A and B is assigned as a total 278 Mb/s of the requisite link bands between A and B, B and C, and B and D. Likewise, the capacity of the physical transmission line between nodes A and C is assigned as 218 Mb/s, and the capacity of the physical transmission line between nodes A and D is assigned as 320 Mb/s.

In the case of multimedia shown in FIG. 16, the required capacity of the physical transmission line is determined by applying the analytic result of the multifactor traffic model described in the document above instead of equation of erl B. For example, if media 1 and 2 coexist and media 1 requests for the peak speed of 64 Kb/s between nodes whereas media 2 requests for different peak speed values between respective nodes, then the number $s_{ij}$ of required lines is obtained by the following equations (2) and (3) such that each of the traffic call amount and service request quality shown in FIG. 16 can be simultaneously satisfied.

[Math 2]
$$B_{ij}^{(1)} = C \sum_{k=0}^{[S_{ij}/m]} \frac{a_{ij}^{(1)s_{ij}-mk}}{(s_{ij}-mk)!} \cdot \frac{a_{ij}^{(2)k}}{k!} \qquad \text{equation (2)}$$

[Math 3]
$$B_{ij}^{(2)} = C \sum_{r=s_{ij}-m+1}^{s_{ij}} \sum_{k=0}^{[r/m]} \frac{a_{ij}^{(1)r-mk}}{(r-mk)!} \cdot \frac{a_{ij}^{(2)k}}{k!} \qquad \text{equation (3)}$$

where, $$C = \left[ \sum_{i=0}^{S_{ij}[i/m]} \sum_{k=0}^{a_{ij}^{(1)i-mk}} \frac{a_{ij}^{(2)k}}{(i-mk)!} \frac{a_{ij}^{(2)k}}{k!} \right]^{-1}$$

$a_{ij}$ indicates traffic call amount of media n between i and j.

$B_{ij}$ indicates service request quality of traffic of media n between i and j.

where $s_{ij}$ indicates a total number of required channels each having 64 Kb/s. Thus, the product of the multiplication of $s_{ij} \times 64$ Kb/s indicates the band of the physical transmission link required to meet the given condition. The results are shown in the right-most column in FIG. 16. The capacity of the physical transmission line between nodes A and B is 90.8+93.5+102.3=286.6 Mb/s, the capacity between nodes A and C is 217.2 Mb/s, and the capacity between nodes A and D is 199.6 Mb/s.

When the capacity of the physical transmission line is set in step S4 as shown in FIG. 8, the capacity of the virtual path is calculated based on an actual traffic request, that is, the above described call amount, lost-call rate, discarded cell rate, cell delay time, etc. and is allocated to the physical transmission line in step S5. The capacity of the virtual path is calculated by the virtual band calculating method (Document by Miyao, Y. "A Dimension Scheme in ATM Networks" '92 pp. 171–176, 1992).

The allocated capacity of the virtual path is released after the communications, that is, the value of the capacity is reset to 0. Then, the fluctuation of the actual traffic request is monitored in step S6, and it is determined whether or not the actual traffic fluctuation amount exceeds a predetermined value in step S7. If yes, the processes in and after step S5 are repeatedly performed.

The fluctuation of the actual traffic request is monitored in step S6 based on the measurements of the lost-call rate, discarded-cell rate, or cell delay time stored in the data base 36 as described by referring to FIG. 7. The comparing circuit 46 and the determining circuit 47 in the circuit control unit 32 determines whether or not the fluctuation has exceeded a predetermined value. Described below is a method of detecting a lost-call rate, discarded-cell rate, cell delay time, etc. stored in the data base 36.

Figure 17:
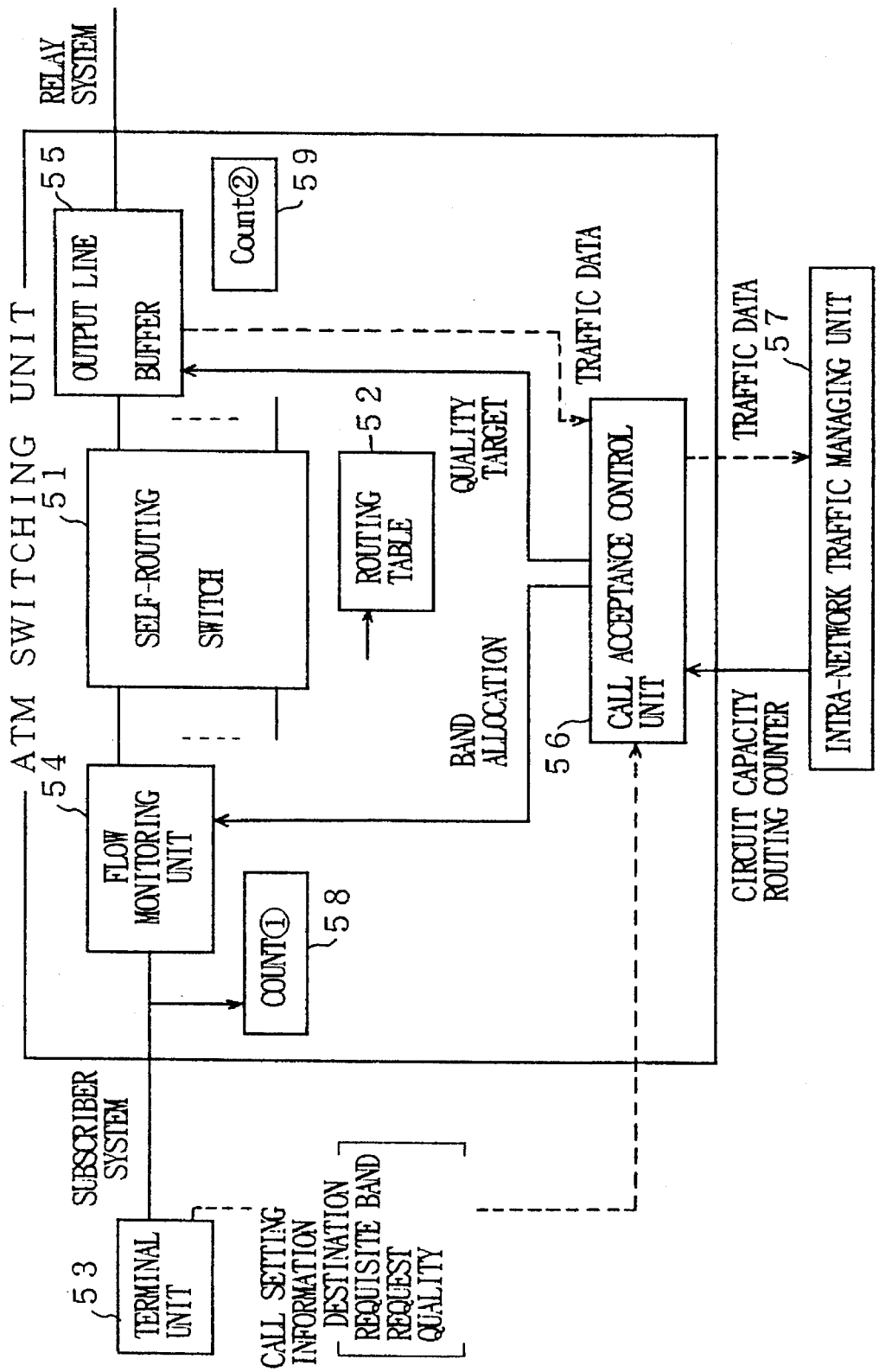
FIG. 17 shows a distribution of the functions of the ATM switching unit.
Figure 18:
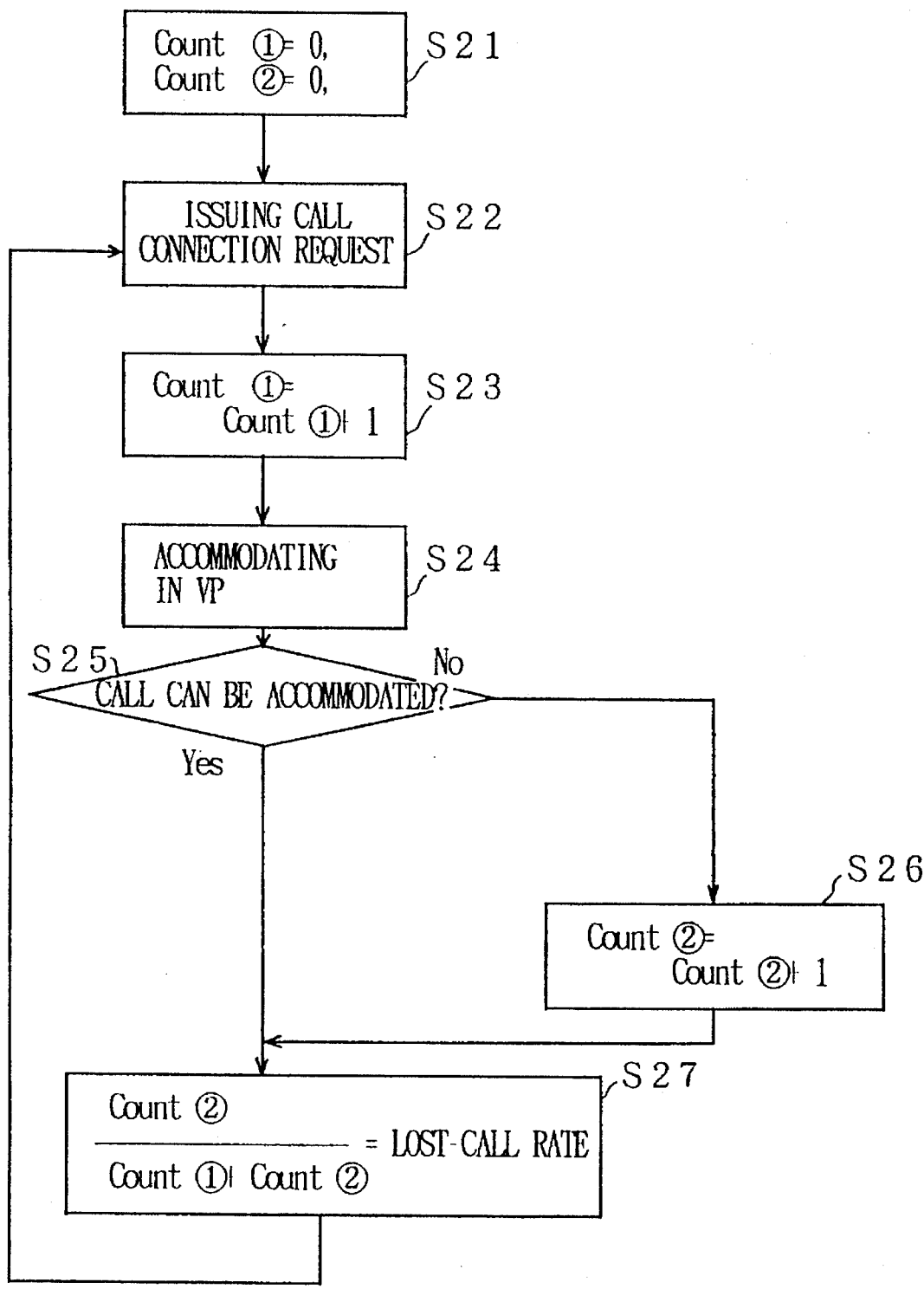
FIG. 18 is a flowchart showing the process of detecting a lost-call rate.

FIG. 17 shows the distribution of the functions of the ATM switching unit for detecting a lost-call rate. FIG. 18 is the flowchart showing the process of detecting a lost-call rate. In FIG. 17, the ATM switching unit comprises a self-routing switch 51 forming an important part of the ATM switching unit, a routing table 52 for use in controlling the routing operation of the self-routing switch, a flow monitoring unit 54 for monitoring the flow of ATM cells input from a terminal unit 53, an output line buffer 55 for outputting an ATM cell from the self-routing switch 51 to a relay system, and a call acceptance control unit 56 for controlling the acceptance of a call in a communications network. The call acceptance control unit 56 is controlled by an intra-network traffic managing unit 57. The ATM switching unit further comprises counter ① 58 for counting the occurrence of a call connection request each time it is issued from the terminal unit 53 and count ② 59 for counting the occurrence of rejection of the call connection request by the output line buffer 55. Counter ① stores a total of call connection requests and counter ② stores the number of calls which were not connected due to the insufficient capacity of the transmission line.

In the flowchart shown in FIG. 18, if counters and ① are reset to ② in step S21 and a call connection request is issued in step S22, then the value in counter ① is stepped up in step S23. It is determined whether or not the call can be accommodated in a virtual path in steps S24 and S25. In step S26, the value of counter ② is stepped up if "no", and the value of counter ② is not stepped up if "yes". In step S27, the value of a lost-call rate is calculated and the processes in and after step S22 are repeatedly performed. The lost-call rate in step S27 is calculated by dividing the value of counter ② by a sum of the values of counters ① and ②.

A discarded-cell rate can be detected in the same manner as the detection of a lost-call rate. A cell delay time is detected by detecting the delay time of each cell in each switching unit, transmitting the detection result to a network design managing center via a signal channel, calculating an average value, and determining a delay time. If the determination is made periodically, for example, every five minutes, a cell delay time can be detected.

Furthermore, in addition to the detection of measurement of actual traffic, the network design managing center activates at specified time intervals a program for calculating a lost-call rate, discarded cell rate, or cell delay time based on a declared parameter, calculates the values, and determines whether or not the capacity of a logical network is to be reset based on the calculation results.

If the fluctuation of actual traffic has not exceeded a predetermined value in step S7 shown in FIG. 8, then the change in a long-term traffic demand is monitored in step S8. In step S9, it is determined whether or not the change in the long-term traffic demand has exceeded a predetermined value. If yes, the processes in and after step S4 are repeatedly performed. If no, the processes in and after step S6 (monitoring the fluctuation of an actual traffic request) are repeatedly performed. If a change amount of the long-term traffic demand exceeds the predetermined value in step S9, the capacity of a physical transmission line is redesigned. It is redesigned by changing the capacity of a leased transmission line when a user designs a virtual private network over a common network by using a synchronous digital hierarchy (SDH) transmission line from, for example, NTT and other carriers under a lease. Specifically, if optical cables must be additionally installed as a practical physical transmission line, then the circuit control unit 32 only generates a redesign request signal as described by referring to FIG. 7. It is separately determined whether or not the redesigning should be actually performed.

If the virtual path capacity calculated in step S5 shown in FIG. 8 is actually allocated to a physical transmission line, it is allocated by a polishing device provided in each subscriber switching unit, that is, by setting and changing a parameter of a usage parameter control (UPC). FIG. 19 shows how to realize the function of the UPC.

The UPC functions are realized by checking whether or not the traffic amount led into the self-routing switch by the flow monitoring unit 54 shown in FIG. 17 is exactly accommodated in the declared window size. That is, when a call connection request is detected in the input line of the ATM switching unit, the traffic amount can be controlled by a number of cells flowing into the area of the window size T shown in FIG. 19. For example, if the maximum number of cells in the window is 4 in accordance with the peak rate at the user-declared communication speed, then it is regarded as an illegal condition when five cells are detected in the window as shown in FIG. 19. Appropriately selecting the window size determines the communication band of a virtual path. The window size is changed to alter the capacity of the virtual path.

Described below is the second embodiment of the present invention. It relates to a method of managing a communications network for shortening the time taken to search for a detour path while limiting to an allowable range the lost-call rate relating to a request to connect a virtual path when the second object of the present invention is attained, that is, an applicable detour path is permitted as a virtual path to a node of a destination subscriber.

The second embodiment uses a band divisional management method and the limited detour routing method. The band divisional management method divides the band of a physical transmission link into a shared band and a reserved band. The limited detour routing method restricts the number of selectable detour paths when a specified path, for example, a direct path is busy when a request is issued to connect a virtual path. According to the second embodiment, a communications network has a mesh-form structure for simplicity.

FIG. 20 is the block diagram corresponding to the second embodiment and shows the communications node together with a terminal.

In FIG. 20, 61 is a communications node; 62 is a terminal unit; 63 is a band managing unit; 64 is an acceptability determining unit; 65 is a flow monitor; 66 is a self-routing switch; 67 is an output line buffer; 68 is a routing table, and 69 is a selecting unit.

The information from a terminal is monitored by the flow monitor 65 to confirm that it is exactly what is declared. Then, it is assigned a virtual path link by the self-routing switch 66, and sent to a trunk through the output line buffer 67. During this process, the settings of the destination of a virtual path, communication speed, request quality, etc. are transmitted from the terminal 62 to the acceptability determining unit 64. The acceptability determining unit 64 refers to the data of the band managing unit 63 and determines whether or not there is any band satisfying the quality requested for the virtual path, and then determines whether or not the virtual path is acceptable. The selecting unit 69 forms part of the detour path candidate registering unit 7 shown in FIG. 2 and outputs a selected candidate to the routing table 68.

Figure 21:
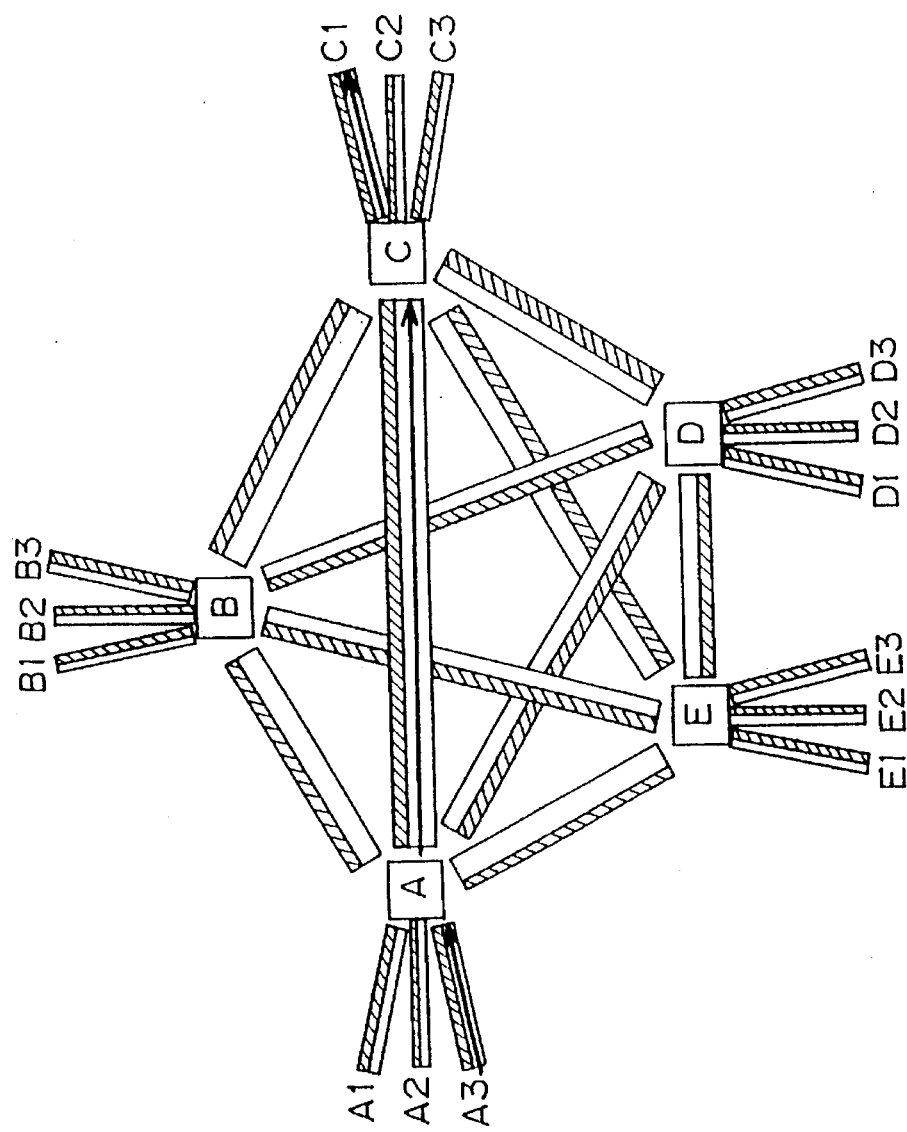
FIG. 21 shows a concept of the band managing method according to the second embodiment.

FIG. 21 shows the concept of the band divisional management method according to the second embodiment of the present invention.

FIG. 21 shows a communications network in which five high-order communications nodes (A–E) represent a mesh-form structure. Each of the nodes has three low-order communications nodes (for example, A1–A3) in a star form. The band of each transmission link is divided into a shared band and a reserved band and so managed.

According to the second embodiment, the band managing unit 63 divides the band of each transmission link into a shared band and a reserved band and so manages them. In response to a request to connect a low-priority virtual path, the acceptability determining unit 64 determines the acceptability by checking the shared band. In response to a request to connect a high-priority virtual path, the acceptability determining unit 6.4 determines the acceptability by checking both shared and reserved bands. Therefore, even if a request to connect a low-priority virtual path is rejected due to an insufficient shared band, a request to connect a high-priority virtual path can be accepted because it is determined based on both the shared and reserved bands. Thus, a transmission path connection can be allocated such that it satisfies the service quality for a virtual path, and the network efficiency can be reduced.

Figure 22:
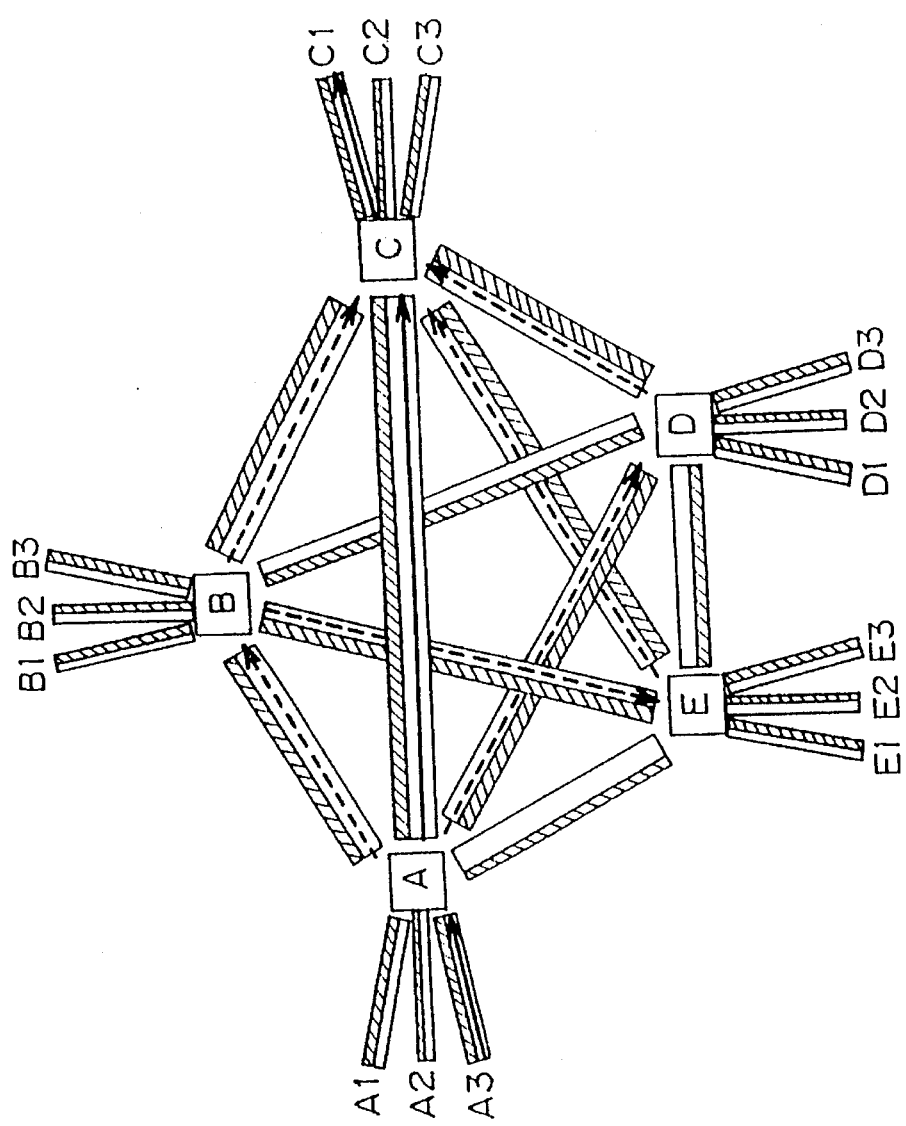
FIG. 22 shows a concept of a detour routing according to the second embodiment.

FIG. 22 shows the concept of the limited detour routing according to the second embodiment.

FIG. 22 shows a communications network in which five high-order communications nodes represent a mesh-form structure. Each of the nodes has three low-order communications nodes in a star form. It also shows the concept of a band divisional management method. For example, the selecting unit 69 in communication node A applies a direct path connection between communications nodes A and C, and selects and registers detour path connections A-B-C, A-B-E-C, and A-D-C from among a number of paths.

In an example shown in FIG. 22 according to the second embodiment, the selecting unit 69 registers three detour routing candidates in addition to a direct transmission path connection, and selects the detour path connections in a specified order. The acceptability determining unit 64 determines the acceptability of a virtual path by referring to the data of the band managing unit 63. Since detour path connections are predetermined, specified communications nodes can be connected to each other even if a specified transmission link is busy, thereby lowering the lost-call rate, that is, improving the network efficiency. By also using the above described band divisional management method, a path connection can be made to satisfy the quality requested for a virtual path. Since the number of allowable detour path connections is restricted, the time taken to determine the acceptability by selecting path connections can be limited to a given range even if a communications network is designed on a large scale.

FIG. 23 shows an example of a band management table stored in the band managing unit 63 shown in FIG. 20.

In FIG. 23, a link number refers to a number assigned to the physical transmission link connected to an output line of the communications nodes; a total band capacity refers to a total transmission capacity of the present links; a reserved band capacity refers to a transmission capacity for high-priority virtual path. Therefore, the difference between the total band capacity and the reserved band capacity equals the shared band capacity. Since the active band capacity is managed as being divided into a shared band and a reserved band, the available space band can also be managed as being divided into a shared band and a reserved band.

FIG. 20 shows the configuration in which the band managing unit 63 is provided in a communications node. The same function can be obtained if the band managing unit 63 is concentratively provided in the network design management center.

The acceptability determining unit 64 collates an available space band in the band management table in the band managing unit 63 with a band requested for a virtual path, and determines whether or not the virtual path is accepted.

Figure 24:
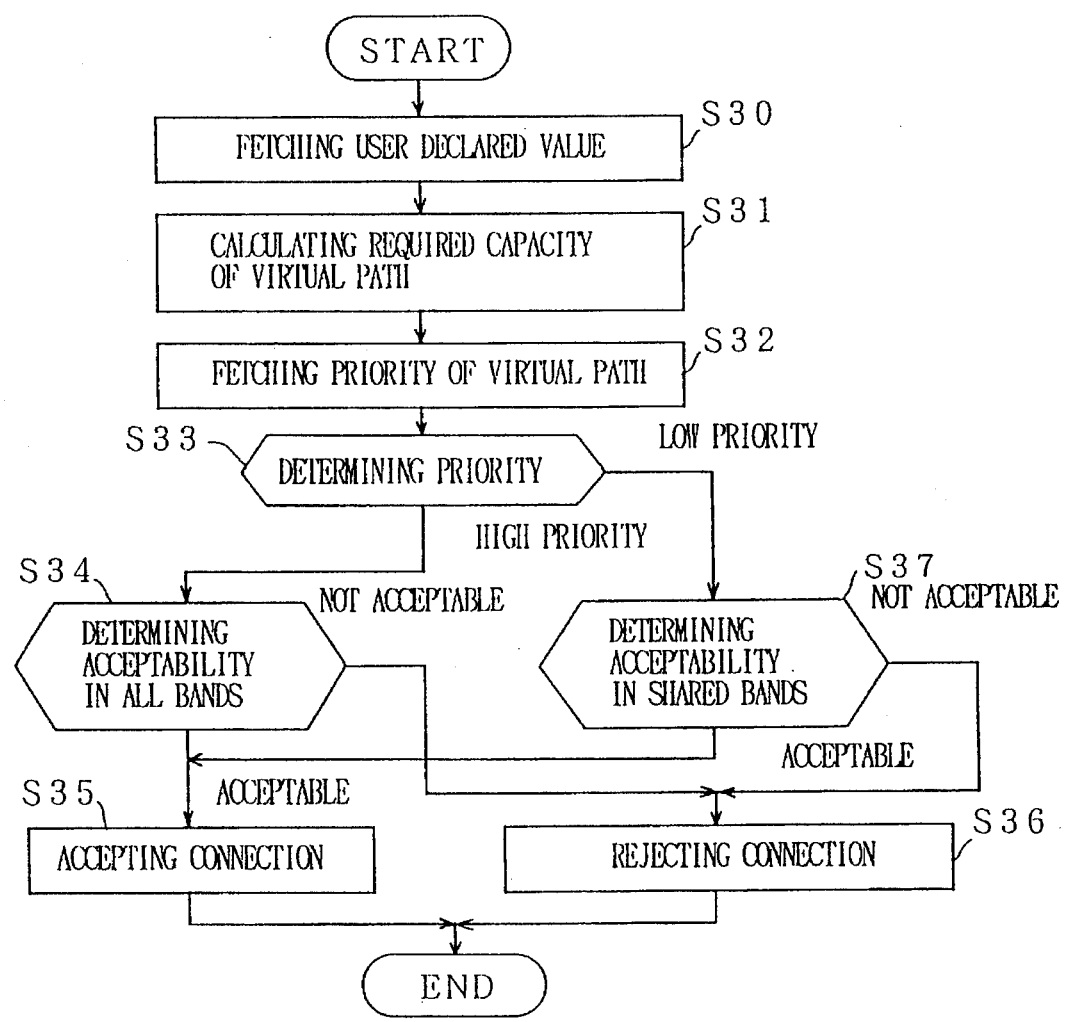
FIG. 24 is a flowchart (not permitting a detour) showing the operation of the acceptability determining unit.
Figure 25:
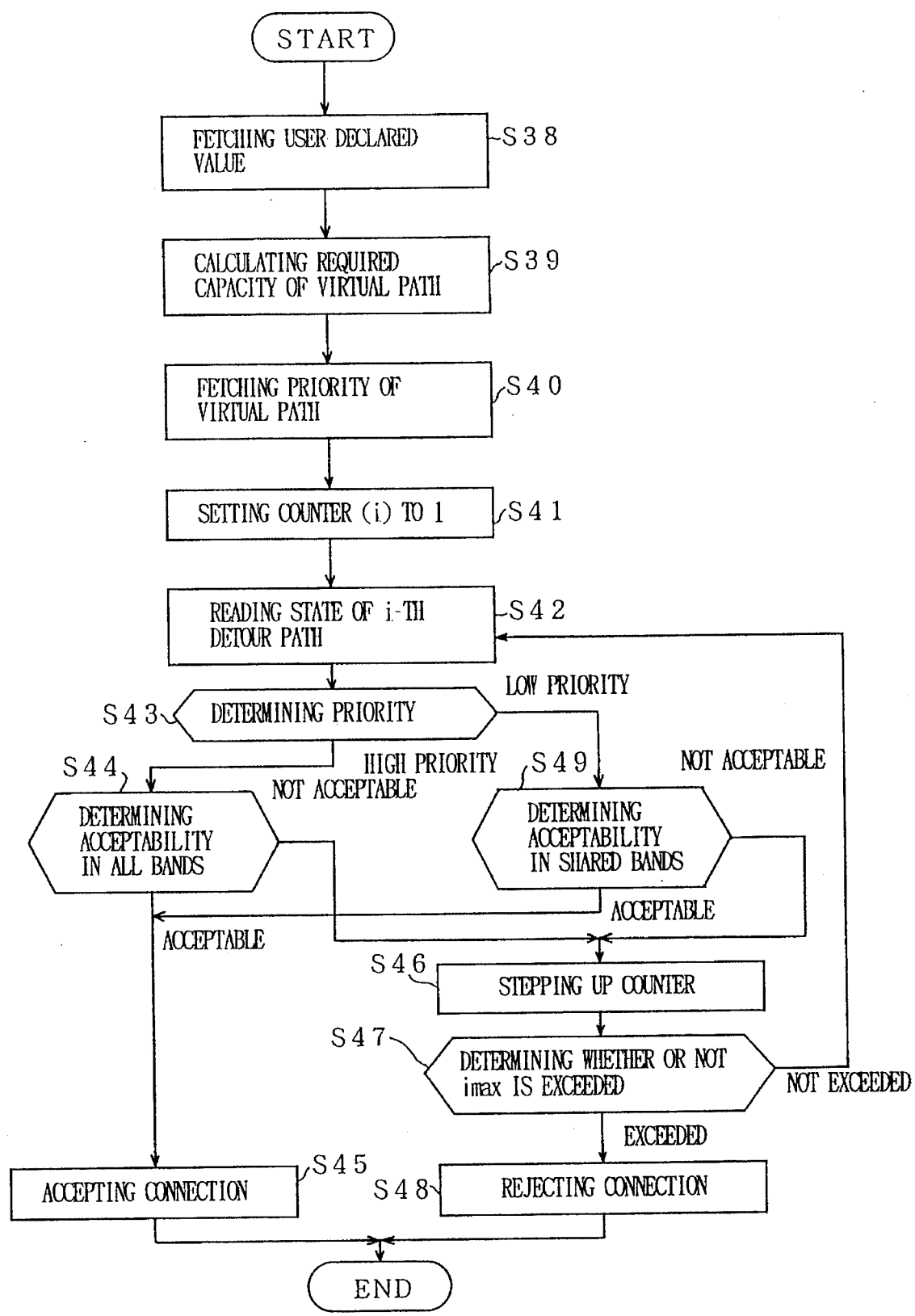
FIG. 25 is a flowchart (permitting a detour)

FIGS. 24 and 25 are the flowcharts explaining the operations of the acceptability determining unit 64. FIG. 24 shows the case in which no detours are permitted; and FIG. 25 shows the case in which detours are permitted.

First described is a no-detour operation (FIG. 24).

Step S30: Fetching user-declared values (call amount, average and peak values of communication speed, service request quality, etc.) when a request to connect a virtual path is issued.

Step S31: Calculating the capacity of a virtual path required to satisfy the requested service quality based on the declared values according to a given calculation algorithm.

Step S32: Fetching the priority and requisite band of a virtual path requested for connection.

Step S33: Determining the priority.

Step S34: Comparing the spare capacity with the requisite capacity in the shared and reserved bands for a high-priority path.

Step S35: Terminating the process after accepting the connection request if the spare capacity is larger.

Step S36: Terminating the process without accepting the connection request if the spare capacity is smaller.

Step S37: Comparing the spare capacity with the requisite capacity in the shared band for a low-priority path.

Step S35: Terminating the process after accepting the connection request if the spare capacity is larger.

Step S36: Terminating the process without accepting the connection request if the spare capacity is smaller.

A high-priority virtual path refers to one which carries, for example, voice and image traffic requiring an immediate processing, and one having a large number of physical transmission links forming a communications path from a source node to a destination node. A low-priority virtual path refers to one which carries, for example, data traffic not requiring an immediate processing, one having a retransmitting protocol in a high-order layer, and one having a small number of physical transmission links forming a communications path from a source node to a destination node.

A requisite band can be calculated according to, for example, Miyao, Y., "A dimension Scheme in ATM Networks", Network '92, pp.171–176, 1992.

Next described is a detouring operation (FIG. 25).

Step S38: Fetching user-declared values (call amount, average and peak values of communication speed, service request quality, etc.) when a request to connect a virtual path is issued.

Step S39: Calculating the capacity of a virtual path required to satisfy the requested service quality based on the declared values according to a given calculation algorithm.

Step S40: Fetching the priority and requisite band of a virtual path requested for connection.

Step S41: Setting the counter to i=1.

Step S42: Reading the state of the i-th detour path.

Step S43: Determining the priority.

Step S44: Comparing the spare capacity with the requisite capacity in the shared and reserved bands for a high-priority path.

Step S45: Terminating the process after accepting the connection request if the spare capacity is larger.

Step S46: Stepping up the counter if the spare capacity is smaller.

Step S47: Rejecting the connection (step S48) and terminating the process if the counter value indicates a value larger than a predetermined value $i_{max}$. Returning to step S42 if the counter value indicates a value not larger than a predetermined value $i_{max}$.

Step S49: Comparing the spare capacity with the requisite capacity in the shared band for a low-priority path.

Step S45: Terminating the process after accepting the connection request if the spare capacity is larger.

step S46: Stepping up the counter and proceed to step S47 if the spare capacity is smaller.

Thus, a determination is repeated as to whether or not predetermined detour paths are acceptable. If all the predetermined detour paths are unacceptable, the request is rejected.

The above described procedure of determining the acceptability is conditioned on predetermined detour paths regardless of the method of selecting a detour path. Described below is the method of selecting a detour path.

If the selecting unit 69 applies the first selecting method as a method of selecting a transmission path connection shown in FIG. 20, then a transmission path connection candidate is selected in the following procedure. First, all transmission path connections between a source node and a destination node are found. Five high-order communications nodes connected in a mesh form generate 16 communications paths. From these paths, a predetermined number of transmission path connection candidates are unconditionally selected, and the sequence of probable detours is recorded on the routing table 68 provided in each node. If a predetermined transmission path connection is unacceptable, another predetermined transmission path connection is selected in a specified order. Then, the acceptability determining unit 64 tries to detour by referring to the data of the transmission path connections managed by the band managing unit 63. If a request to communicate between communications nodes A and C is made, transmission path connection candidates A-B-C, A-D-C, and A-B-E-C are selected as shown in FIG. 22 in this order, and a direct transmission path connection A-C is unacceptable, then a transmission path connection is selected in the above listed order for acceptability determination. If all the three transmission path connections are unacceptable, the request is rejected.

Figure 27:
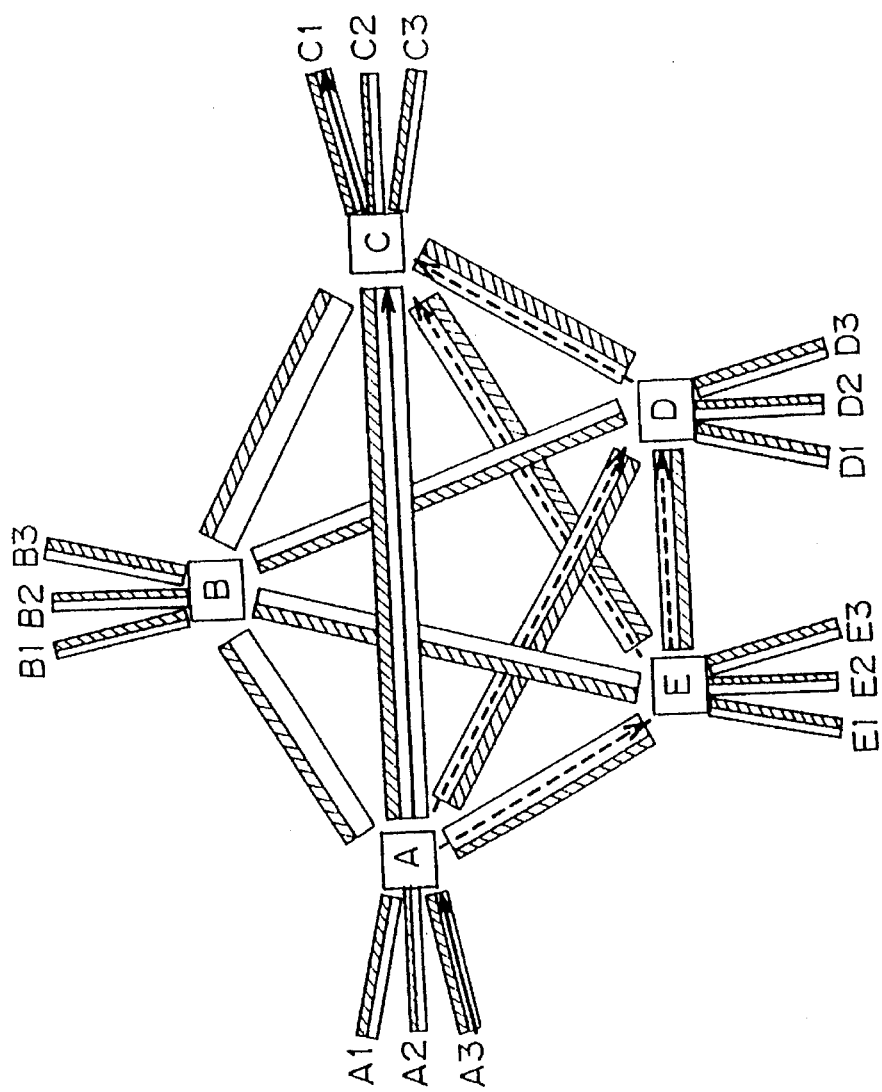
FIG. 27 shows a method of selecting a physical transmission connection having a shorter physical transmission distance.
Figure 28:
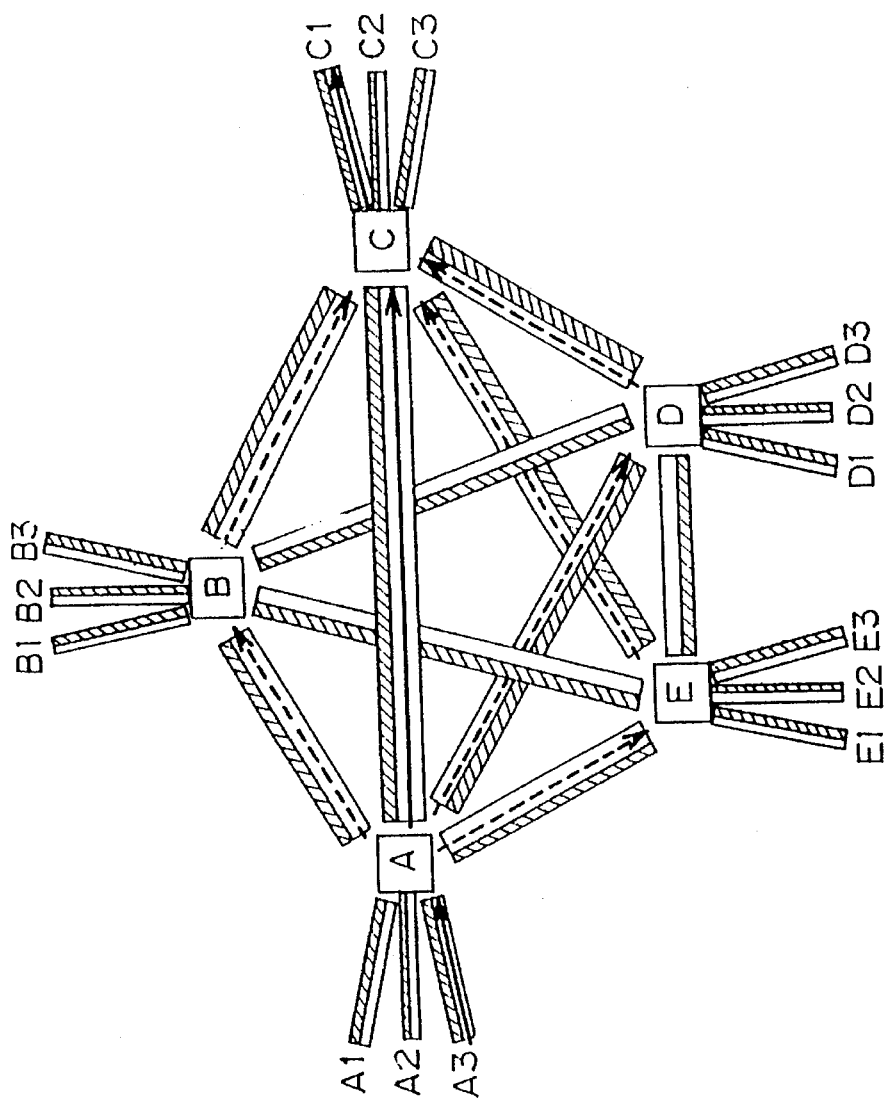
FIG. 28 shows a method of selecting a physical transmission connection having a smaller number of physical transmission links.

If the second selecting method is applied as a method of selecting a transmission path connection as shown in FIG. 20, then a predetermined number of transmission path connection candidates are selected in the order from the shortest physical transmission distance from among all possible transmission path connections between a source node to a destination node. The candidates are recorded on the routing table. As a method of selecting the communications paths in the order from the shortest physical transmission distance, the coupling correlation between nodes and the distance between them are input to select a path based on a "Dijkstra" algorithm. The Dijkstra algorithm is represented by "Data Network" translated by Hoshi published by Ohm Company. If the distance between nodes is assigned as shown in FIG. 26, the second shortest physical transmission distances after the direct route A-C (5 km) are A-E-C (7 Km), A-D-C (8 Km), and A-E-D-C (9 Km) as shown in FIG. 27. Therefore, the three transmission path connections are recorded into the routing table 68 of node A. If the direct route A-C is unacceptable, then the three above listed transmission path connections are selected in the order from the shortest physical transmission distance, and determined for acceptability by the acceptability determining unit 64. If all three transmission path connections are unacceptable, then the request is rejected.

Thus, selecting transmission path connections in the order from the shortest physical transmission distance is equivalent to selecting them in the order from the shortest delay time.

When the third selecting method is applied as the method of selecting transmission path connections shown in FIG. 20, a predetermined number of transmission path connections are selected from all possible transmission path connections between a source node and a destination node in the order from the smallest number of physical transmission links forming a transmission path connection.

In this case, transmission path connections can be selected in the order from the smallest number of physical transmission links if the Dijkstra algorithm is applied with the transmission distance between nodes set to 1 virtually and uniformly. If a plurality of connections have the same number of physical transmission links, selected are connections in the order from the shortest physical transmission distance. Thus, transmission path connections having a smaller number of physical transmission links between communications nodes A and C other than the direct route A-C are A-E-C (two links for 7 km), A-D-C (two links for 8 km), and A-B-C (two links for 20 km). Therefore, the three transmission path connections are recorded onto the routing table 68 of node A. If the direct route A-C is unacceptable, then the above described three transmission path connections are selected in the above explained order, and the acceptability determining unit 64 determines the acceptability of each connection. If all the three transmission path connections are unacceptable, the request is rejected.

Thus, selecting transmission path connections in the order from the smallest number of physical transmission links is equivalent to reducing the amount of control of connections generated in a communications network.

Explained below is the third embodiment of the present invention. The third embodiment aims to solve the third object of the present invention. The third object is to quickly select in response to a communication capacity change request a communications path satisfying the request from a plurality of communications paths when the plurality of communications paths are set including detour paths between optional nodes in a communications network comprising a physical network and a logical network. Therefore, as in the second embodiment, the third embodiment is conditioned on a plurality of communications paths, for example, a logical path between optional nodes in a communications network.

Figure 29:
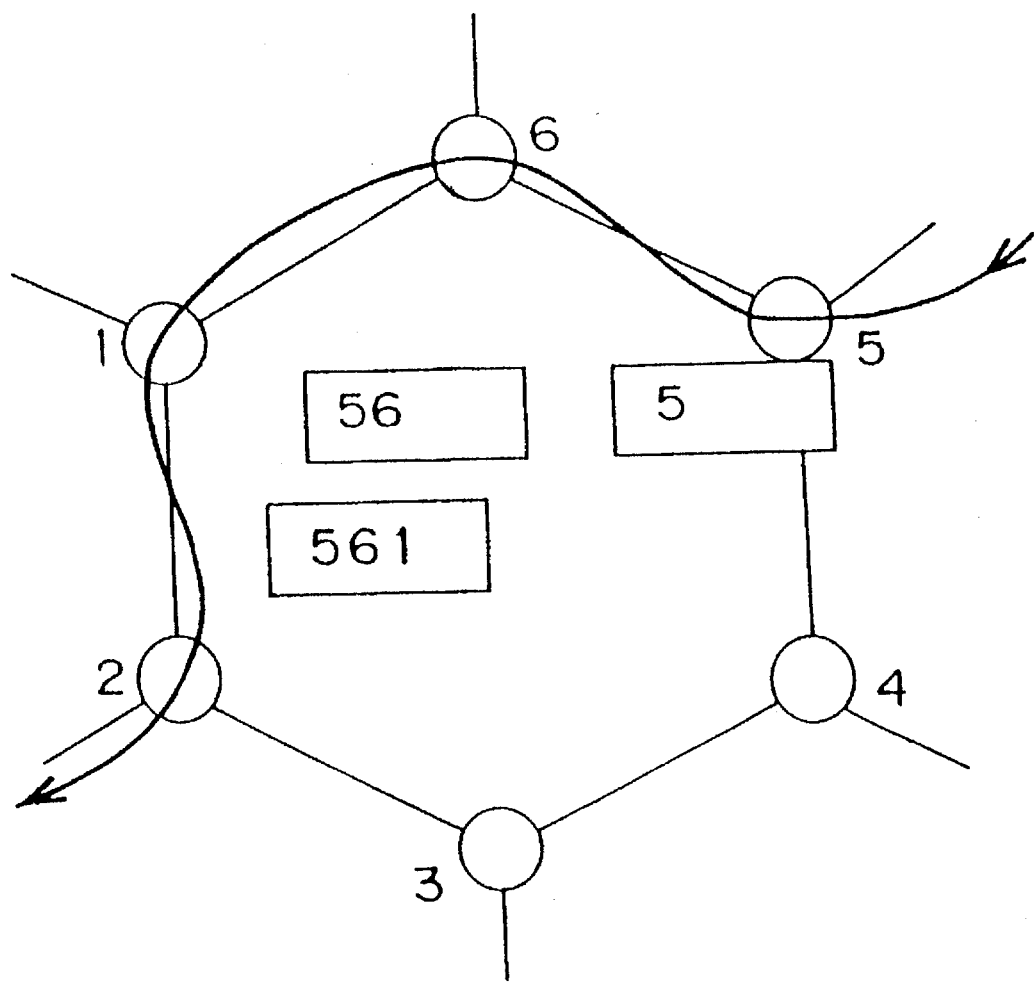
FIG. 29 shows a method of transferring an information packet according to the third embodiment.

FIG. 29 shows the information packet for informing of a spare capacity in a communications path. In FIG. 29, a circle indicates a node. Assuming that a communications path is established from node 2 to node 5 by way of nodes 1 and 6, a packet in the format shown in FIG. 30 is generated in node 5 which is the end point of the communications path.

FIG. 30 shows an example of the format of an information packet in a typical multiple label communications network. In the end point node 5 in the communications path shown in FIG. 29, route ID is an identifier of the communications path; information packet ID is an identifier of the information packet; and node 5 ID is an identifier of the end point node 5 of the path. These IDs are stored as the header of a packet, and the information packet is sent to node 6.

In node 6, a spare capacity in an output link from node 6 to node 5 forming part of the communications path is added together with the identifier of node 6 to a packet, and the packet is sent to node 1 again. Likewise, in the relay node in the communications path, a spare capacity and a node identifier in each output link are added to a packet, and the information packet is transmitted to the start point node 2 of the communications path. In the start point node 2, the contents of the information packet are written into a spare capacity table in its node as described later. When a communication path capacity change request is issued, the written contents are used in determining whether or not the change request is acceptable in the communications path.

Figure 31:
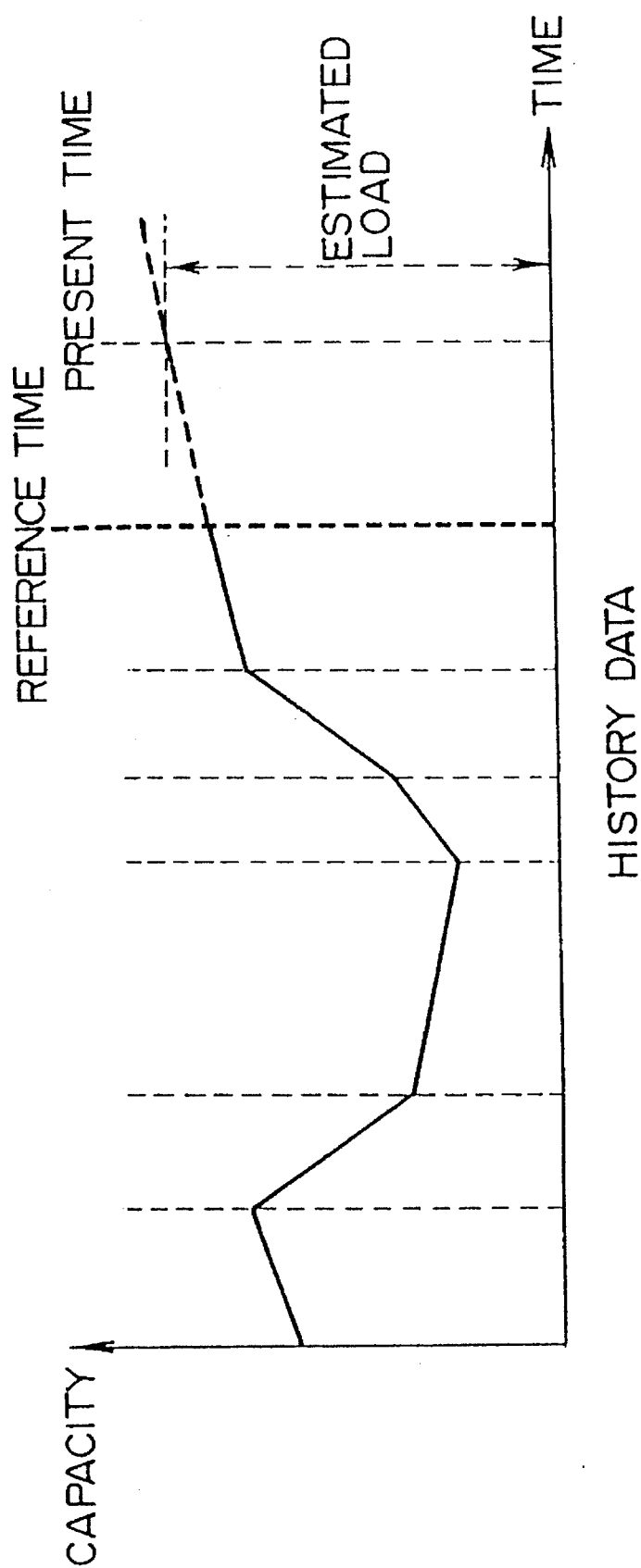
FIG. 31 shows a method of estimating a spare capacity in a link according to the third embodiment.

Thus, an acceptability of a capacity change request is determined based on a spare capacity value periodically provided for the start point node of the communications path. However, it is determined whether or not a capacity change is accepted not only directly based on a spare capacity value as is, but also based on an estimation of a spare capacity from the data of the past. FIG. 31 shows the method of estimating a spare capacity. For example, the present spare capacity can be estimated through a linear estimation using data of two points in the past, or by applying spare capacity information at some points in the past to a neural network.

FIG. 32 is the block diagram showing the general configuration of a node. In FIG. 32, a node comprises an information packet processing device 71 which is an important portion of the third embodiment, and a switching unit or a cross-connect 72. The switching unit or the cross-connect 72 comprises a routing switch 73 and a routing table 74 for controlling the routing operation performed by the switch 73. The routing table 74 stores an outlet number from the switch 73 corresponding to a virtual path identifier (VPI). FIG. 32 shows with an arrow the opposite direction of the communications path from node 2 to node 5 by way of nodes 1 and 6 as described by referring to FIG. 29.

Figure 33:
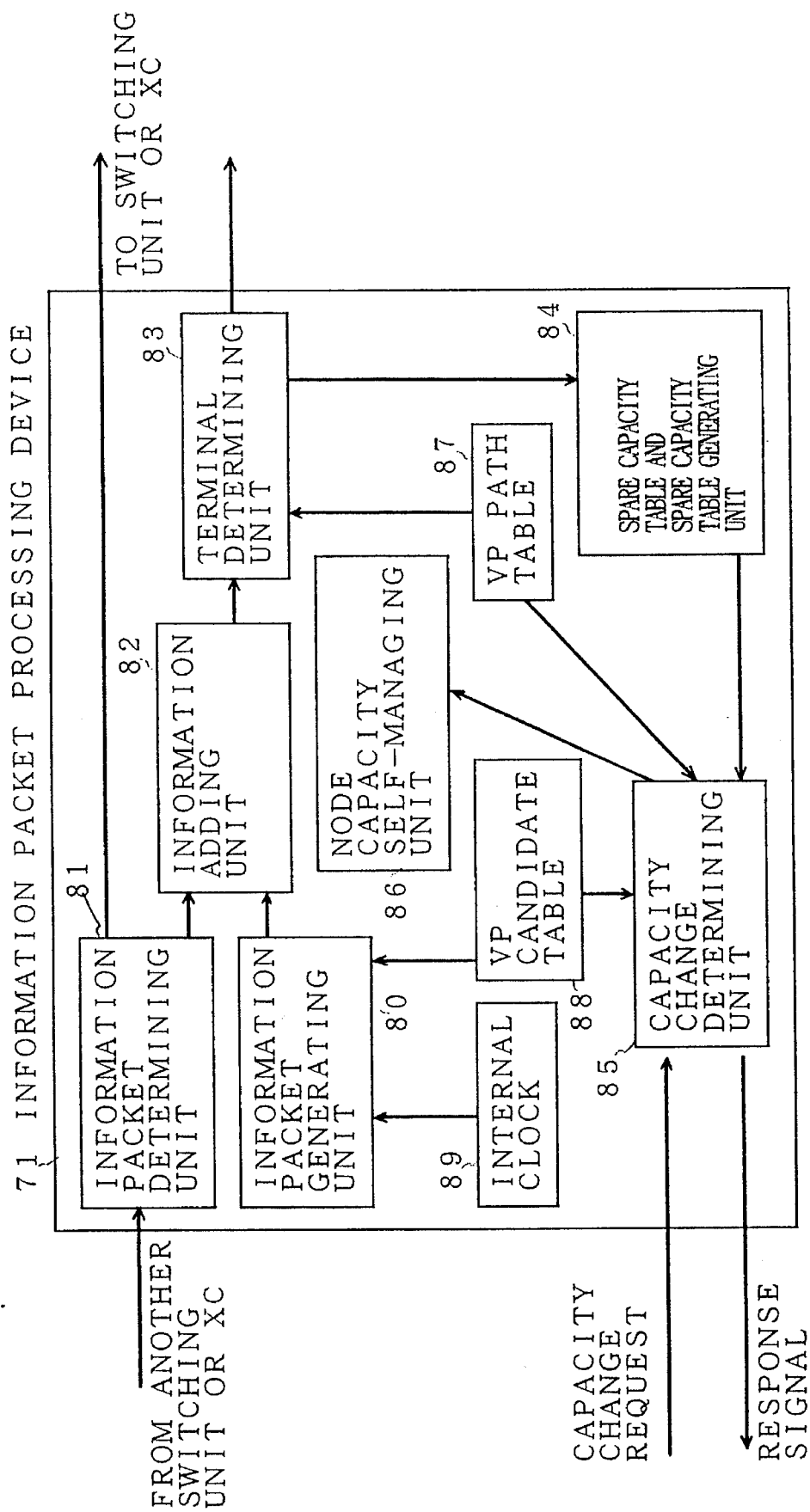
FIG. 33 is a block diagram showing the detailed configuration of the information packet processing device.

FIG. 33 is the block diagram showing the detailed configuration of the information packet processing device shown in FIG. 32. In FIG. 32, the information packet processing device 71 comprises an information packet generating unit 80 for generating an information packet when the current node is a start point node of a communications path, an information packet determining unit 81 for determining whether or not the packet received from another switching unit or cross-connect is an information packet, an information adding unit 82 for writing an identifier of the current node, a spare capacity of an output link, etc. to the information packet output from the information packet generating unit 80 or the information packet determining unit, a terminal determining unit 83 for determining whether or not the information packet output from the information adding unit 82 is addressed to the current-node, that is, the current node is the start point node of the communications path, a spare capacity table and a spare capacity table generating unit 84 for obtaining spare capacity information about a link belonging to the communications path from the information packet identified by the terminal determining unit 83 as being addressed to the current node, and for writing the data into the spare capacity table, a capacity change determining unit 85 for determining based on a spare capacity, etc. stored in the spare capacity table and the spare capacity table generating unit 84 whether or not a change is acceptable in response to a communication capacity change request, a node capacity self-managing unit 86 for managing the spare capacity in the output link from the current node corresponding to a determination result of the capacity change determining unit 85, a VP path table 87 for storing the identifier of a node through which each communications path passes corresponding to the value of a virtual path identifier VPI of the communications path, a VP candidate table 88 for storing an object node, a VPI value, etc. of a virtual path for which the current node is a source node, and an internal clock 89 for providing a timing at which information packets are generated by the information packet generating unit 80.

FIG. 33 shows the basic operation according to the third embodiment in which the acceptability of a capacity change request is determined by using "as is" the data in the spare capacity table for storing and periodically informing of a spare capacity value in each link without estimating the spare capacity value for the point of a capacity change request. The operation of the third embodiment corresponding to the configurational block diagram is explained below further in detail.

Figure 34:
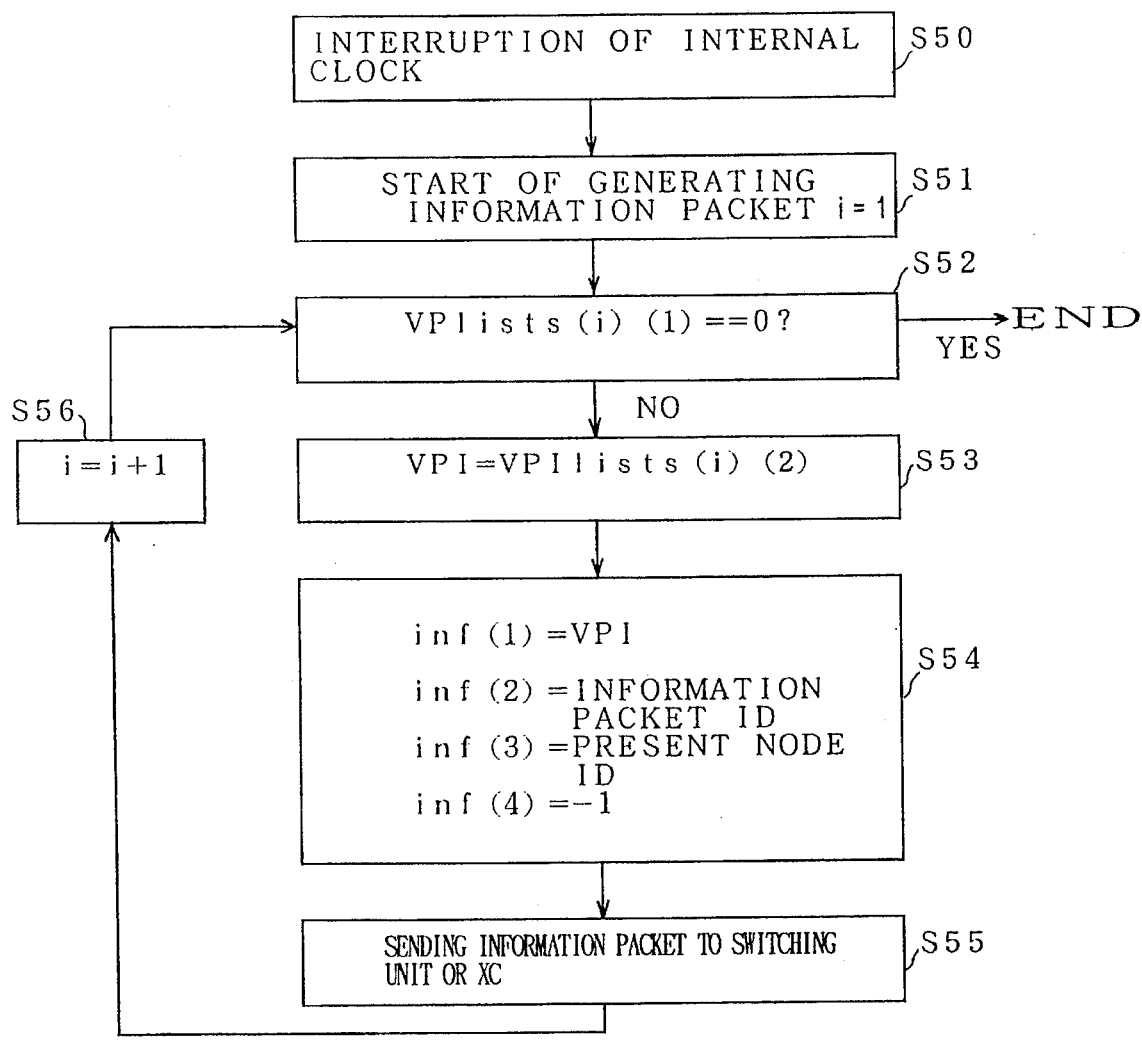
FIG. 34 is a detailed flowchart showing the process of sending an information packet.

FIG. 34 is the flowchart of an information packet sending process. In FIG. 34, if the process has started and an interruption of an internal clock indicating the timing of generating an information packet has arisen in step S50, then the generation of an information packet is started in step S51. In the information packet generating process, the contents of the VP candidate table VP list shown in FIG. 35 are used.

In FIG. 35, the VP candidate table stores for a virtual path for which the current node is a source node an object node of the virtual path, that is, an end point node of the communications path, a VPI value, and a redundancy flag. The redundancy flag is described later.

In step S51 shown in FIG. 34, the value of i indicating that the data are located in the i-th line of the VP candidate table is set to 1, and then an information packet generating process is started. It is determined whether or not the value of VP lists (i) (1) is 0 in step S52. The last "(1)" indicates the contents of the first column in the VP candidate table shown in FIG. 35, that is, the contents of an object node. Since i=1, it is determined whether or not the value of the object node is 0. If yes, practical data do not exist for the first line. If no practical data exist in the first line, it implies no data exist in the table. Thus, the process terminates without generating an actual information packet.

If the value of an object node in the first line is not 0 in step S52, the value in the second column in the line, that is, a VPI value, is obtained in step S53. In step S54, the data are stored in an information packet.

Figure 36:
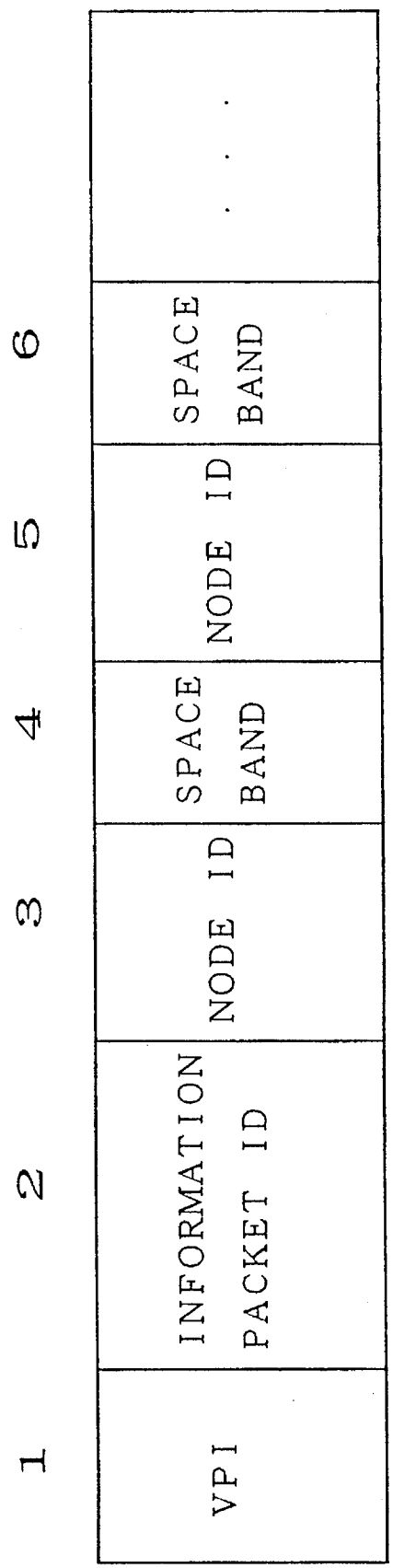
FIG. 36 shows a format of the information packet (inf) in an ATM network.

FIG. 36 shows an information packet in an ATM network, that is, the format of the information packet in which the value of a VPI is used as a route ID shown in FIG. 30. The contents of the information packet are represented by "inf (i)". The value of "(i)" indicates the position of data stored as the header of an information packet, followed by the identifier of the packet in the second position; the identifier of the current node in the third position; and "−1" in the fourth position. Thus, the generation of an information packet is completed. The information packet is sent to a switching unit or a cross-connect, that is, the block 72 in FIG. 32, in step S55. The value of i is incremented in step S56, and the processes in and after step S52 are repeatedly performed. In and after step S52, the contents of the VP candidate table shown in FIG. 35 are fetched in line units, and corresponding information packets are generated and sent to the switching unit or the cross-connect.

Figure 37:
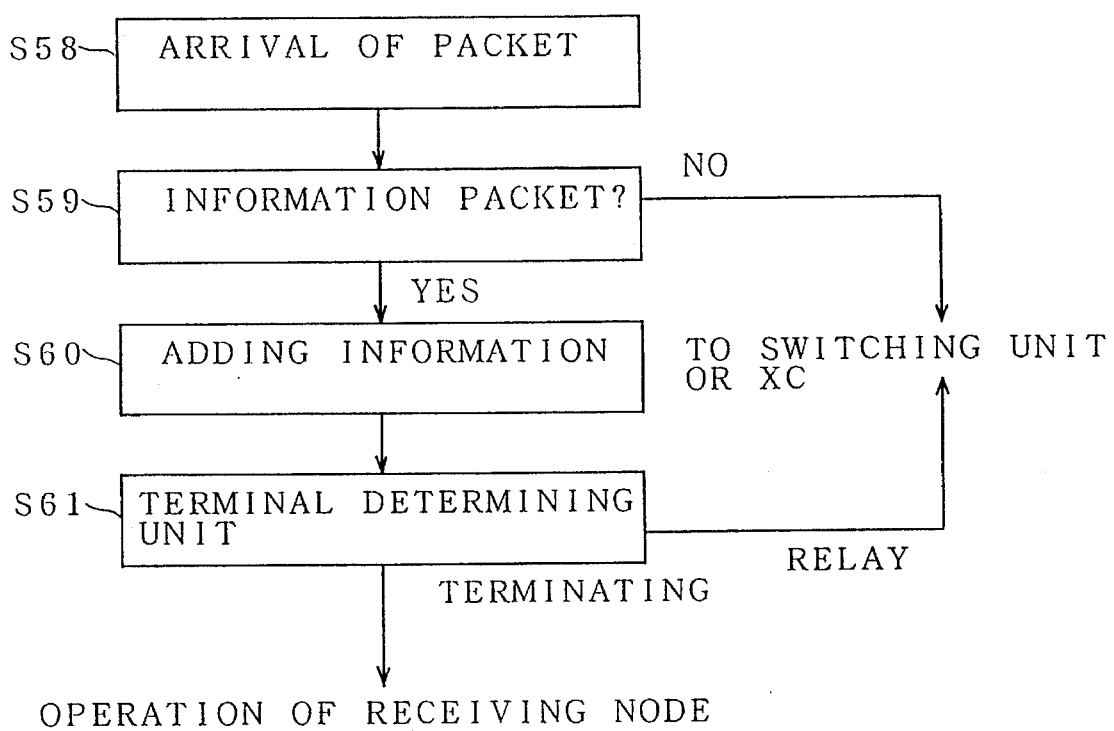
FIG. 37 is a general flowchart showing the process of relaying an information packet in a relay node.

FIG. 37 is the flowchart of the entire process of relaying an information packet in a relay node in a communications path. In FIG. 37, when the arrival of a packet is detected in step S58, then the information packet determining unit 81 shown in FIG. 33 determines whether or not it is an information packet in step S59. If no, the packet is immediately transmitted to a switching unit or the cross-connect 72.

On the other hand, if it is an information packet, the information adding unit 82 adds information in step S60. The information adding operation is explained in detail by referring to FIG. 38. After the information is added to the information packet, the packet is transmitted to the terminal determining unit 83 for determining whether or not the current node is the end point of the information packet, that is, the start point of a succeeding communications path. If no, the information packet is transmitted to the switching unit or the cross-connect 72 for relaying it to another node. If the determination indicates "yes", the current node operates as a receiving node as described later.

Figure 38:
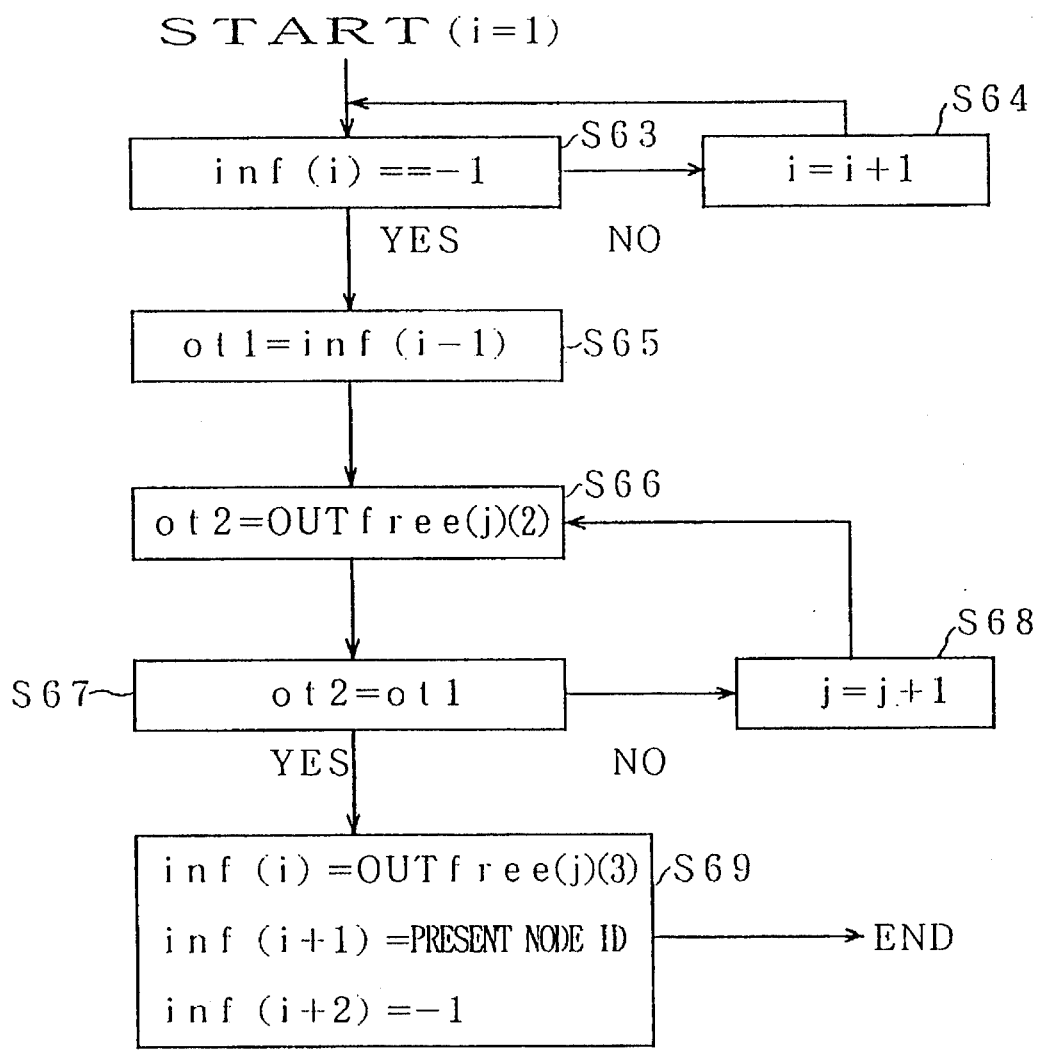
FIG. 38 is a detailed flowchart showing the process of adding information in a relay node.

FIG. 38 is the detailed flowchart of the information adding process to be performed in step S60 shown in FIG. 37. In FIG. 37, the value of i indicates the storage position of data in an information packet as described by referring to FIG. 36, and is set to 1. Then, the process starts, and it is determined whether or not the data at the first position indicates "−1". If no, the value of i is incremented in step S64, and the processes in and after step S63 is repeatedly performed. If data indicating "−1" is detected in the data storage position i in an information packet, the data in one position before the data storage position i is referred to as otl, and control is passed to the next step S66.

In step S66, the contents of the node spare capacity table provided in the node capacity self-managing unit 86 shown in FIG. 33 are retrieved. FIG. 39 shows an example of a node spare capacity table. In FIG. 39, the node spare capacity table stores, from the left-most column, an outlet number of a virtual path, an identifier of an adjacent node connected beyond the outlet, and a spare capacity (band) of the physical transmission link corresponding to the outlet.

In step S66 shown in FIG. 38, the second column from the left-most in the node spare capacity table, that is, the value of the adjacent node identifier, is sequentially retrieved from the first line in the table. The variable j indicates the line number of the node spare capacity table. First, the adjacent node identifier corresponding to j=1 equals 18, and is referred to as ot2. It is determined whether or not ot2 matches otl in step S67.

otl refers to data in which "−1" is stored next to an information packet. For example, if an information packet is generated in node 5 shown in FIG. 29, data are stored in positions 1–3 of the information packet shown in FIG. 36, "−1" is stored in position 4, and the information packet is transmitted to node 6, then node 6 needs adding to the packet a spare capacity in the link toward node 5 and an identifier of node 6 as described by referring to FIG. 30. At this time, otl is the identifier of node 5, and it is determined whether or not the identifier matches the value of the adjacent node identifier in line 1 of FIG. 39. If no, the value of j is incremented in step S68 and the processes in and after step S66 are repeatedly performed.

If otl and ot2 match each other in step S67, that is, the identifier of node 5 matches the identifier of an adjacent node in the node spare capacity table in the above example, then the processes in the next step S69 are started. In step S69, the spare capacity in the line in which the adjacent node identifier indicates a matching is stored in the position of an information packet where "−1" has been stored. The identifier of the current node is stored in the next data storage position in the information packet. Then, the value of "−1" is stored in the next position, and the information adding process terminates.

Figure 40:
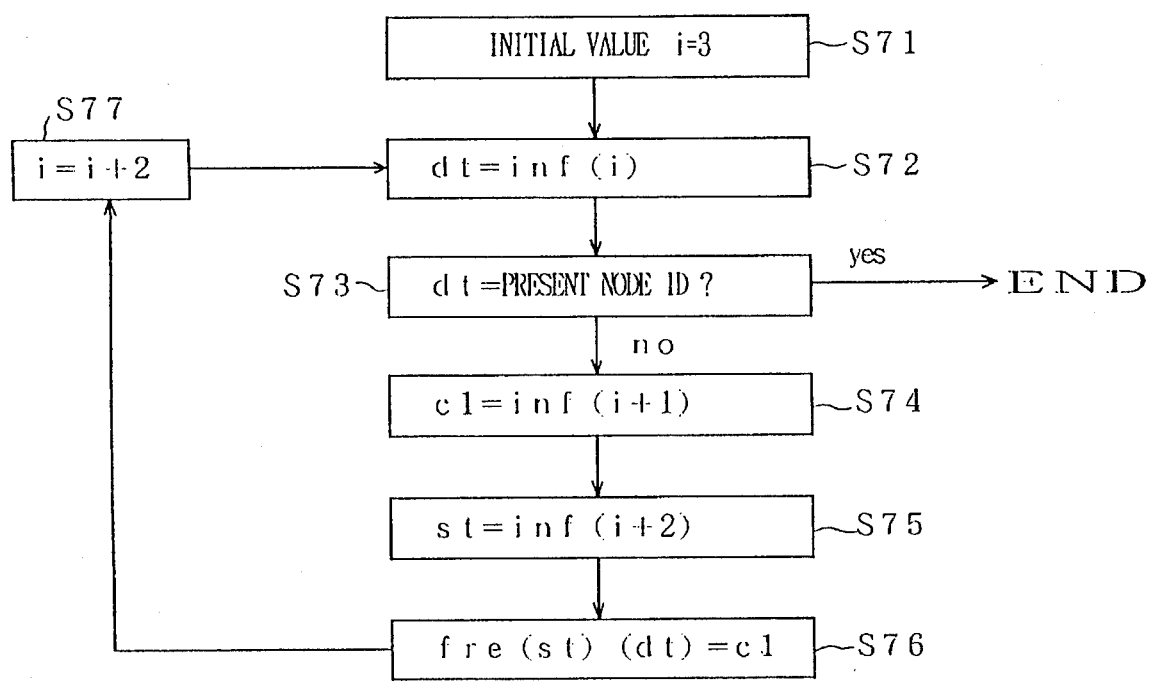
FIG. 40 is a flowchart showing the process performed by an information packet receiving node.
Figure 41:
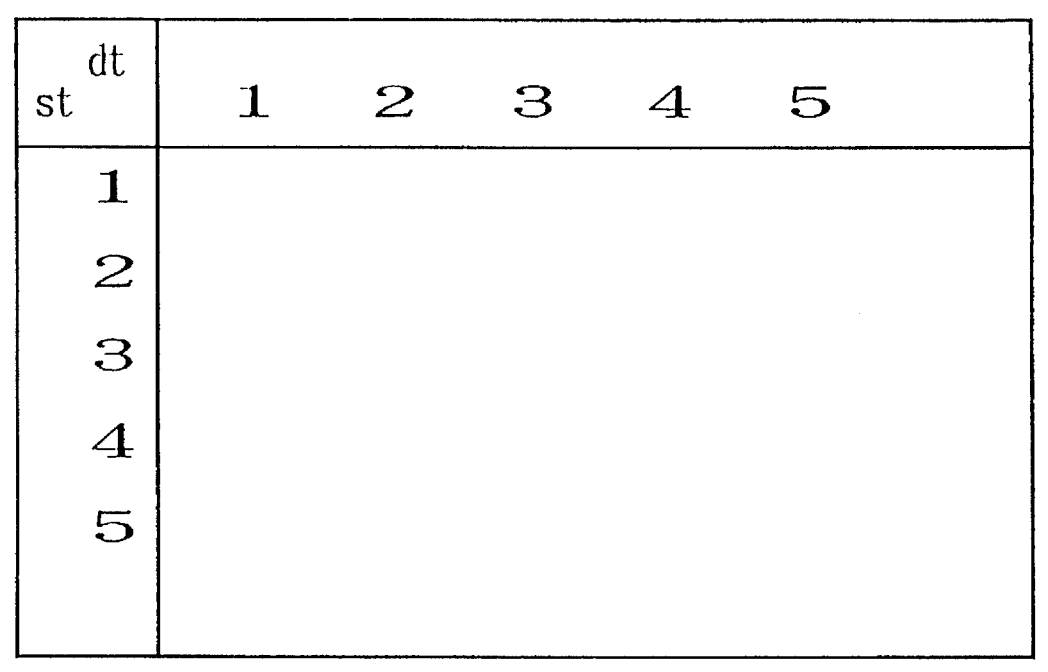

In FIG. 29, if the information packet generated in node 5 and provided with additional information in relay nodes 6 and 1 reaches node 2, then spare capacity information is stored in the spare capacity table by the spare capacity table and the spare capacity table generating unit 84. FIG. 40 is the flowchart of the processes performed by an information receiving node. FIG. 41 shows an example of a spare capacity table. The processes in the information receiving node are explained below by referring to FIGS. 40 and 41.

In step S71 shown in FIG. 40, an initial value 3 of the variable i is assigned. In the next step S72, assuming that "dt" indicates a link arrival node when a spare capacity is obtained according to the contents of an information packet, the "dt" is the i-th data of an information packet. The initial value of i is 3 as a node identifier. That is, it is the identifier of an information packet generating node 5 in FIG. 29. Then, in step S73, it is determined whether or not the "dt" matches the identifier of the current node. As described later, it is the determination condition on which the value of i is repeatedly incremented by 2, and the spare capacity table generating process terminates when the last data storage position is reached in the information packet shown in FIG. 36. That is, as described in step S69 in FIG. 38, the determination condition is used to send the packet to the spare capacity table and the spare capacity table generating unit 84 through the terminal determining unit 83 after the identifier of the current node has been stored in the packet.

In this process, since the value of i still remains 3, and dt indicates the identifier of a node in which the information packet has been generated. Therefore, it does not naturally match the node identifier, and the processes in S74 are performed.

In step S74, the value of spare capacity at position i+1 in an information packet (in this case, the spare capacity at position i=4) is C1. In step S75, the node identifier at the next position, that is, at position i+2, is set as "st". In step S76, the spare capacity of an output link from node st to node dt (the spare capacity of an output link from node 6 to node 5 in FIG. 29) is stored in the position corresponding to the spare capacity table shown in FIG. 41. That is, st indicates the identifier of the node at the start of the link.

In step S76, if the spare capacity of the link, where i=3, is stored in the spare capacity table shown in FIG. 41, then the spare capacity for the output link from node 6 to node 5 in FIG. 29 is stored in the table. Therefore, the value of i is incremented by 2 in step S77, and the processes in and after step S72 are repeatedly performed. The value of i is repeatedly incremented by 2 because the node identifier corresponding to the next link is stored in the second position. Thus, the spare capacities of the output links from node 1 to node 6 and node 2 to node 1 are sequentially stored in the spare capacity table. In step S73, when the identifier of the current node, that is, the identifier of node matches dt, the information receiving node process, that is, the spare capacity table generating process, terminates.

As described in reference to FIG. 31, described below is the method of detecting a spare capacity change history for use in determining the acceptability of a capacity change by estimating the current spare capacity without using "as is" the contents of a spare capacity table periodically informed of by an information packet.

Figure 42:
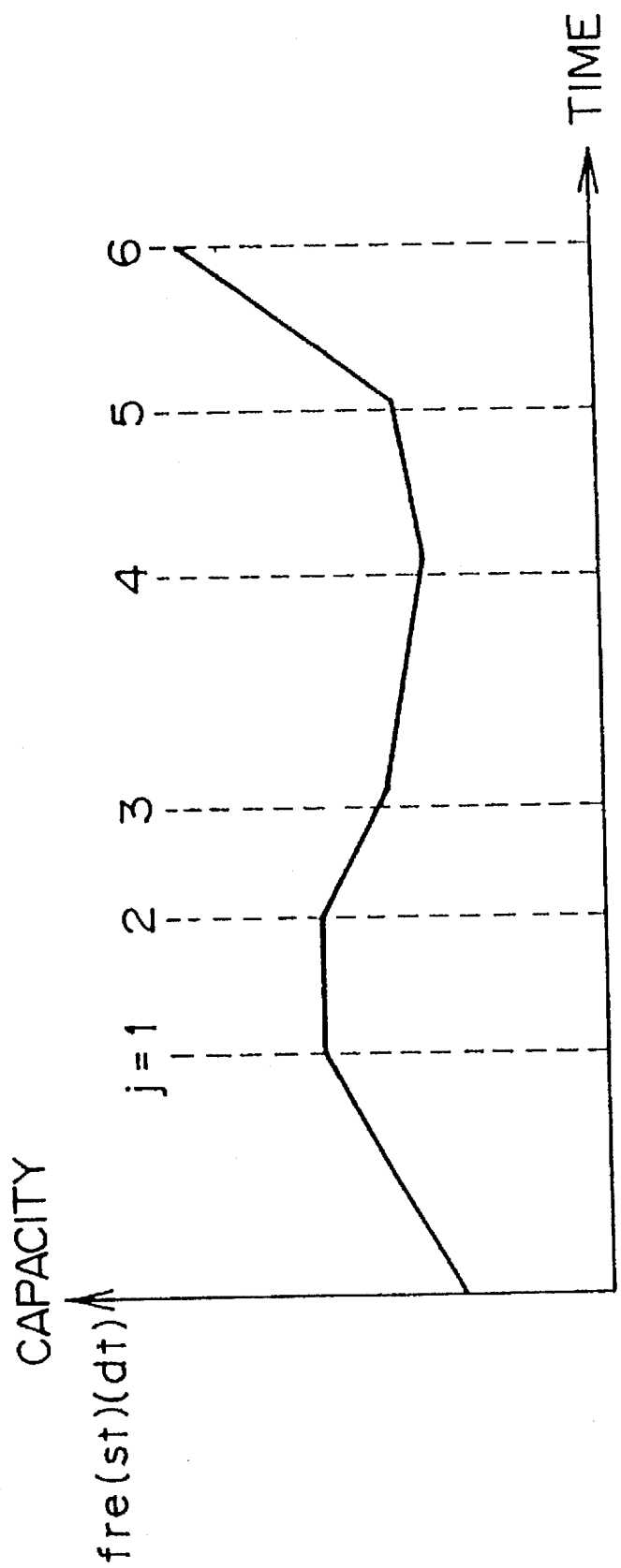
FIG. 42 shows a history of changes in spare capacity.

FIG. 42 shows the spare capacity change history. It shows in a graph examples of changes in spare capacity in an output link from node st to node dt.

Figure 43:
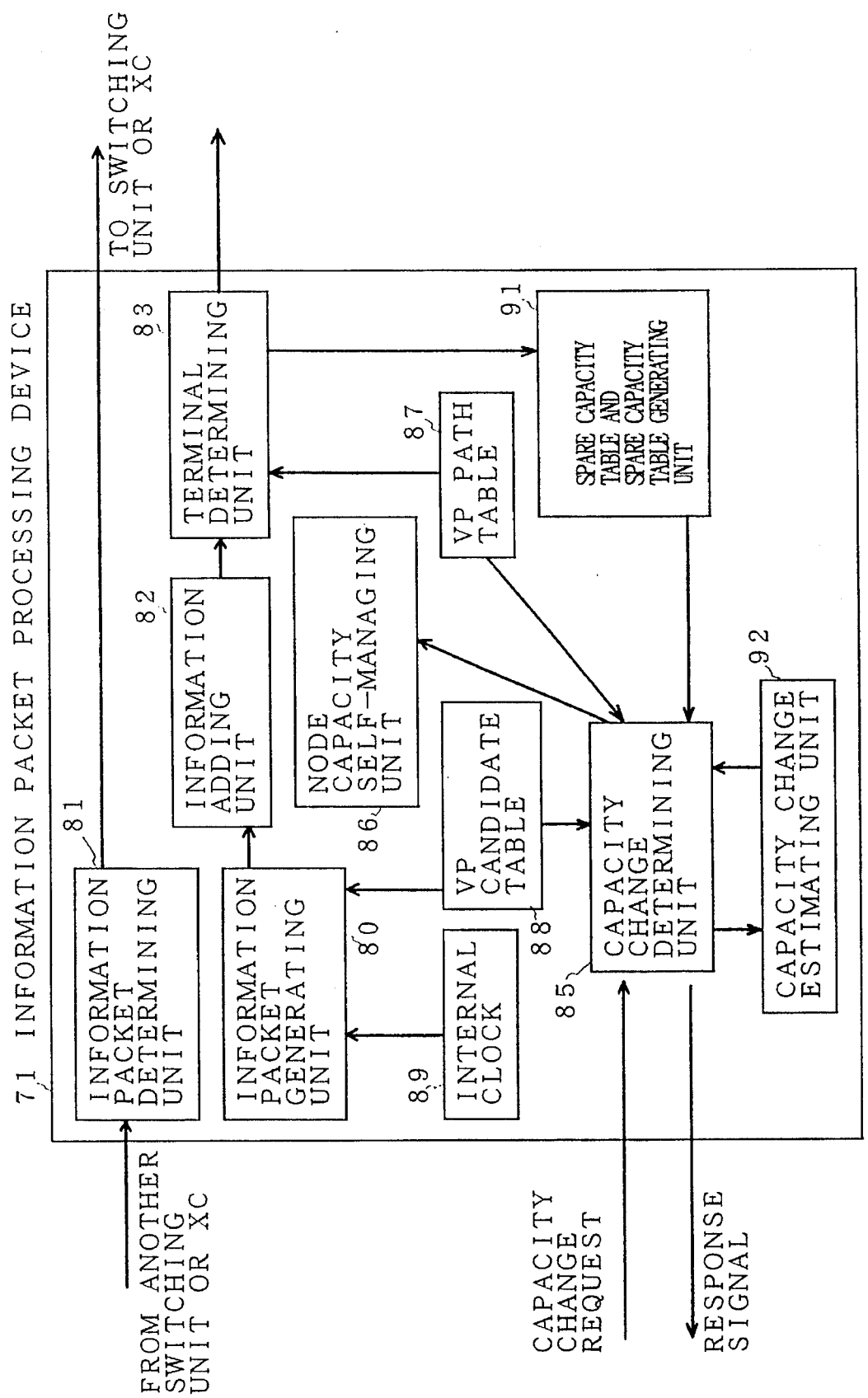
FIG. 43 is a block diagram showing the detailed configuration of the information packet processing device for estimating a capacity change.

FIG. 43 is the block diagram showing the configuration of an information packet processing device when the acceptability of a capacity change request is determined based on a value estimated using such a spare capacity history. In FIG. 43, as compared with FIG. 33, a spare capacity history table and a spare capacity history table generating unit 91 is provided instead of the spare capacity table and the spare capacity table generating unit 84, and a capacity change estimating unit 92 for estimating a capacity change is provided instead of the capacity change determining unit 85 so that a spare capacity estimated value can be output.

Figure 44:
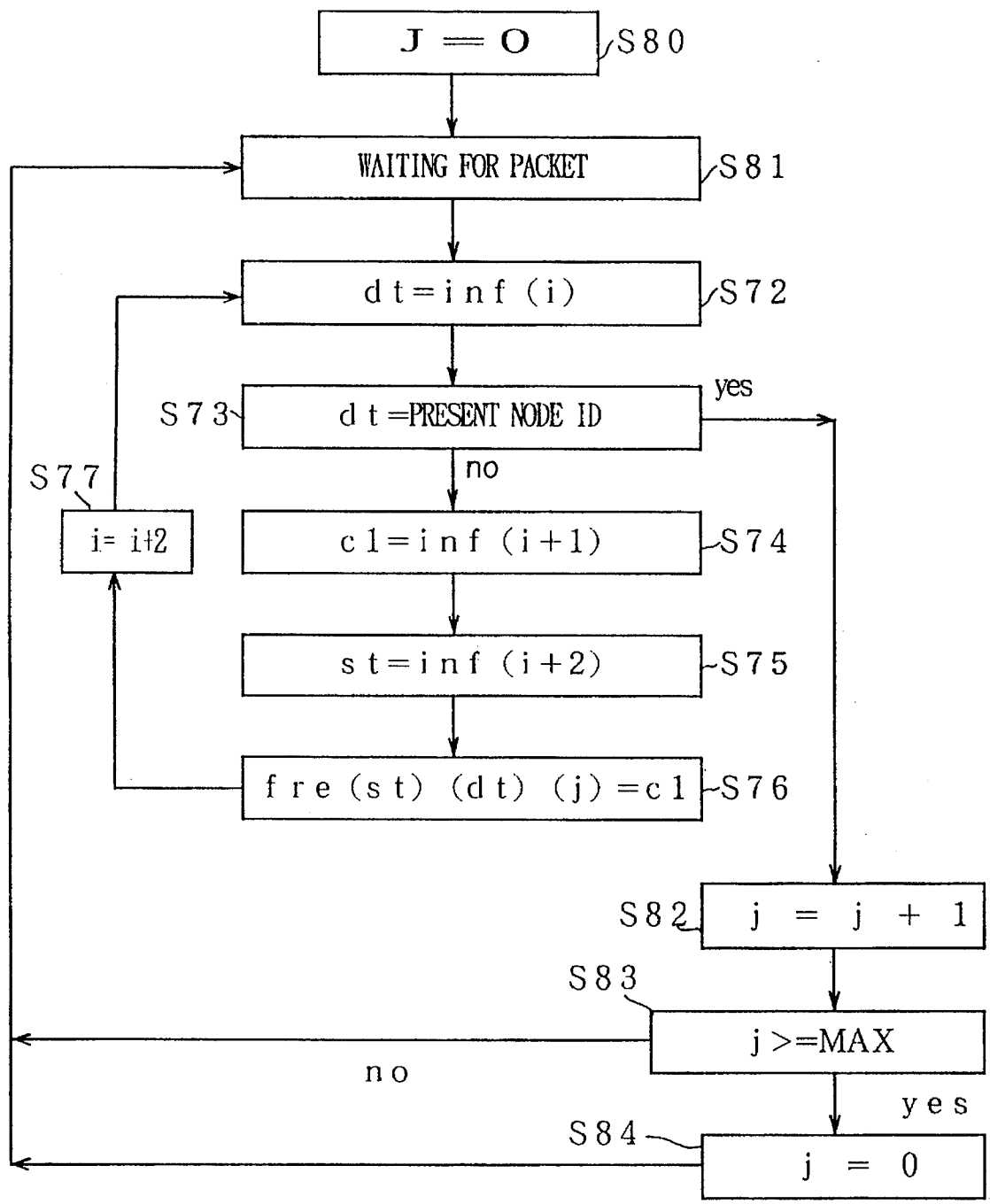
FIG. 44 is a flowchart showing the process performed by an information packet receiving node in estimating a capacity change.
Figure 45:
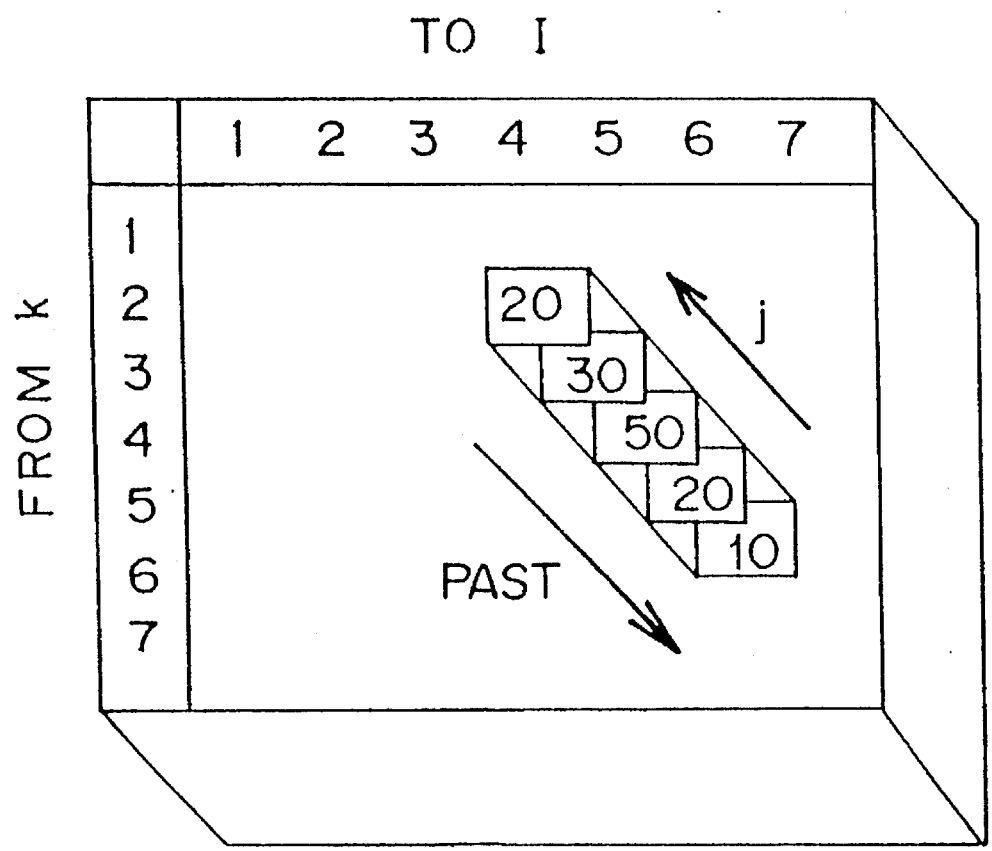
FIG. 45 shows an example of a spare capacity history table.

FIG. 44 is the flowchart showing the spare capacity history table generating process performed by the spare capacity history table and the spare capacity history table generating unit 91 shown in FIG. 43, that is, the process performed by an information receiving node. FIG. 45 shows an example of a spare capacity history table. Described below is the spare capacity history table generating process with reference to these figures.

In FIG. 44, the value of j indicating the time described by referring to FIG. 42 is set to 0 in step S80, and the system is in a state of waiting for an information packet in step S81. When an information packet has arrived, a spare capacity at the arrival time of the information packet is stored in the spare capacity history table as in the process described by referring to FIG. 40. That is, the processes in steps 72–77 are almost the same as those shown in FIG. 40. The only difference is that the contents of the spare capacity history table generated in step S76 correspond to the time j=0.

If it is determined that dt matches the current node identifier in step S73, then all spare capacities corresponding to the time are stored in the spare capacity history table. Then, the value of j is incremented in step S82. In step S83, it is determined whether or not the time value of j indicates the maximum value MAX. When the value of j indicates the maximum value, all the contents of the spare capacity history table are stored corresponding to the value of j and therefore the time value of j is set to 0 again in step S84, and the processes in and after step S81 are repeatedly performed.

Unless the value of j has not reached the maximum value in step S83, then the processes in and after step S81 are repeatedly performed, and the spare capacity history table generating process is continued. Thus, the spare capacity history table shown in FIG. 45 is generated, and the history table regenerating process is repeatedly performed each time the time value j reaches the maximum value.

Figure 46:
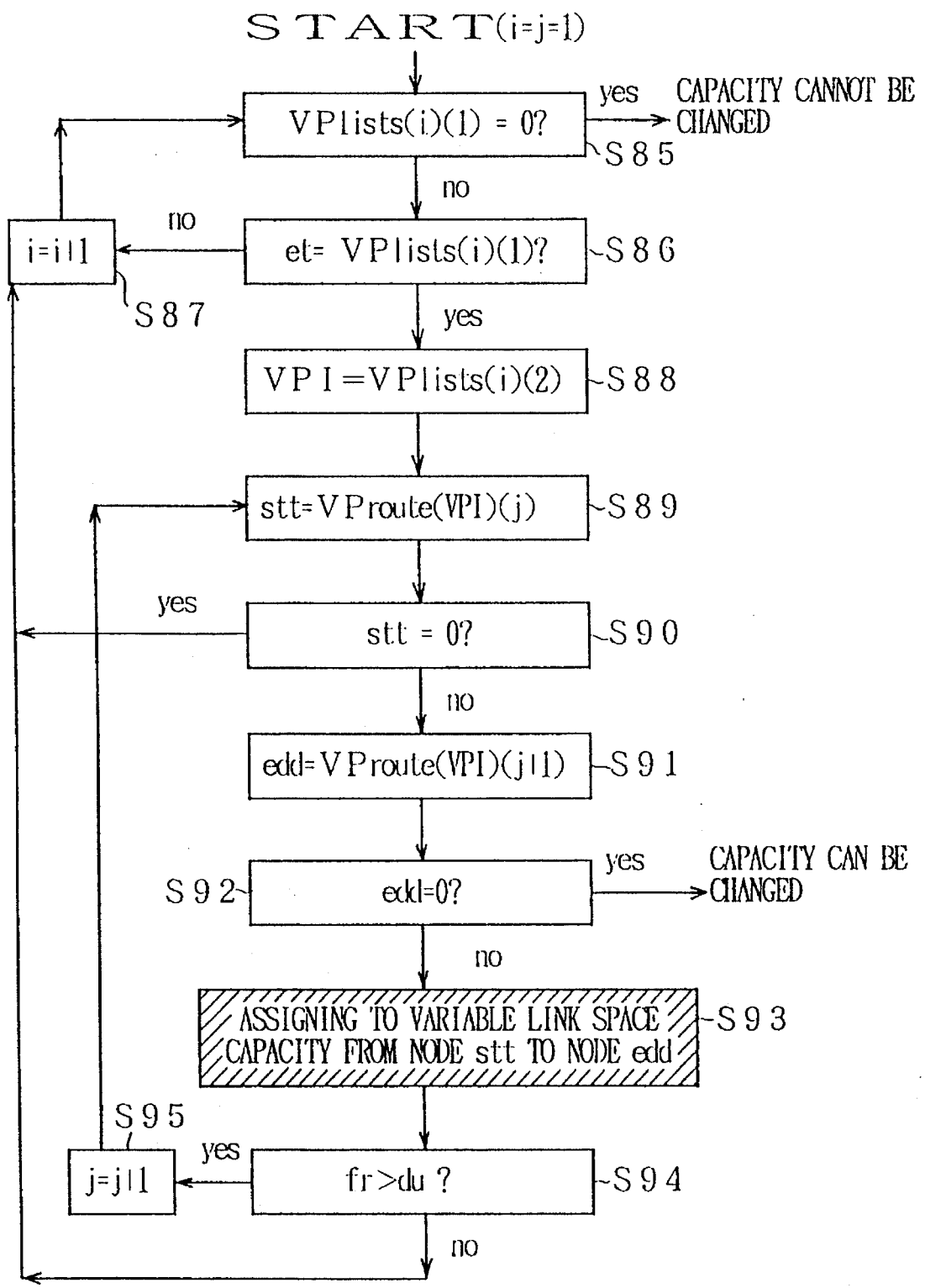
FIG. 46 is a detailed flowchart showing the process of determining the acceptability in response to a communication capacity change request.

FIG. 46 is the flowchart of the process of determining the acceptability of a communications capacity change request, that is, the determining process performed by the capacity change determining unit 85 shown in FIG. 33. The determining process is the same as that shown in FIGS. 33 and 43 except that a spare capacity estimated value is used by the capacity change estimating unit 92 as shown in FIG. 43. The capacity change request is transmitted from the circuit 48 for issuing a redesign request signal shown in FIG. 7 to the capacity Change determining unit 85 in step S5 shown in FIG. 8.

FIG. 47 shows an example of a VP path table used in the capacity change acceptability determining process. The VP path table sequentially stores all identifiers of the nodes through which the virtual path passes corresponding to the value of each VPI.

In the capacity change acceptability determining process shown in FIG. 46, the process starts with the values of i and j set to 1. In step S85, it is determined whether or not the value of the left-most object node in the first line of the VP candidate table described in FIG. 35 indicates 0. If it is 0 when i=0, then no practical data are stored in the object node in the first line. In this case, no practical data are stored in and after the second line. Thus, no virtual paths exist for which the current node is a source node. In this case, a capacity change is not accepted, and the process immediately terminates.

If an object node is not 0 in step S85, it is determined in step S86 whether or not the object node is, that is, matches the identifier of the destination node of the communications path to be changed in capacity. Unless they don't match, the virtual path is not a path to be determined for a capacity change. In this case, the value of i is incremented in step S87, and the process of determining the next virtual path in the VP candidate table is repeatedly performed in and after step S85.

If a matching is detected in step S86, the second column of the line in the VP candidate table, that is, the VPI value, is obtained in step S88. In step S89, the node identifier at the j-th position in the path information corresponding to the VPI in the VP path table shown in FIG. 47 (the first node identifier in this case, for example, the first node identifier 6 satisfying VPI=3 of the path information) is set as stt. Then, control is passed to the process in step S90.

It is determined whether or not the value of stt is 0 in step S90. Since the value of j is 1 in this example, it is considered that no practical path information is stored for the VPI value, the value of i is incremented in step S87, and the processes in and after step S85 are repeatedly performed.

On the other hand, if stt is not 0, then the node identifier at the next position in the path information for the VPI is set as edd in the next step S91. It is determined whether or not the value is 0 in step S92. When VPI is 3 as described above, the value of edd is 4, not 0, and control is passed to the process in step S93. The conditions of edd=0 is described later.

In step S93, the spare capacity in the link from node stt to node edd is assigned to variable fr. In the above described example, a spare capacity estimated value is obtained as the spare capacity in the link from node 6 to node 4 from a value of the spare capacity table described by referring to FIG. 41 or according to the spare capacity history table shown in FIG. 45. The obtained value is assigned to variable fr. Next, in step S94, it is determined whether or not the value of variable fr is larger than the value of the increment du of a requisite band. If yes, the spare capacity in the link being determined among the virtual paths having the VPI, that is, the above mentioned link from node 6 to node 4, is larger than the increment in the requisite band. Therefore, the value of j is incremented in step S95 to determine whether or not the spare capacity is larger than the increment, and the processes in and after step S89 are repeatedly performed on the next link, that is, the link from node 4 to node 3.

On the other hand, if it is determined that fr is not larger than du, then the link cannot accommodate the increment of the requisite band, and the virtual path cannot satisfy the capacity change request. Accordingly, the value of i is incremented in step S87. Determination is repeated on the virtual path stored in the VP candidate table in and after step S85.

As described above, if the processes in steps S89–95 are repeatedly performed with "VPI=3", stt is set to 1 in step S89, and edd is set to 0 in step S91, then it is determined that edd equals 0 in step S92. Thus, it is determined that the capacity can be changed because the virtual path can accept the communications capacity change request. That is, all links from node 6 to node 1 can accommodate the increment of a requisite band, and the capacity change is accepted. A "0" in path information indicates that the virtual path ends with the previous node.

On the other hand, if the value of i is incremented in the VP candidate table, and a line having a "0" in its object node is reached before it is determined that the capacity of any of virtual paths storing actual data can be changed, then no virtual paths exist that can accept a capacity change request among those for which the present node acts as a source node. Thus, the process terminates with the capacity change unaccepted. The VP candidate table shown in FIG. 35 stores data for the virtual paths in the order from the highest priority. A high-priority virtual path can be used by searching higher order virtual paths which satisfy capacity change requests.

Figure 48:
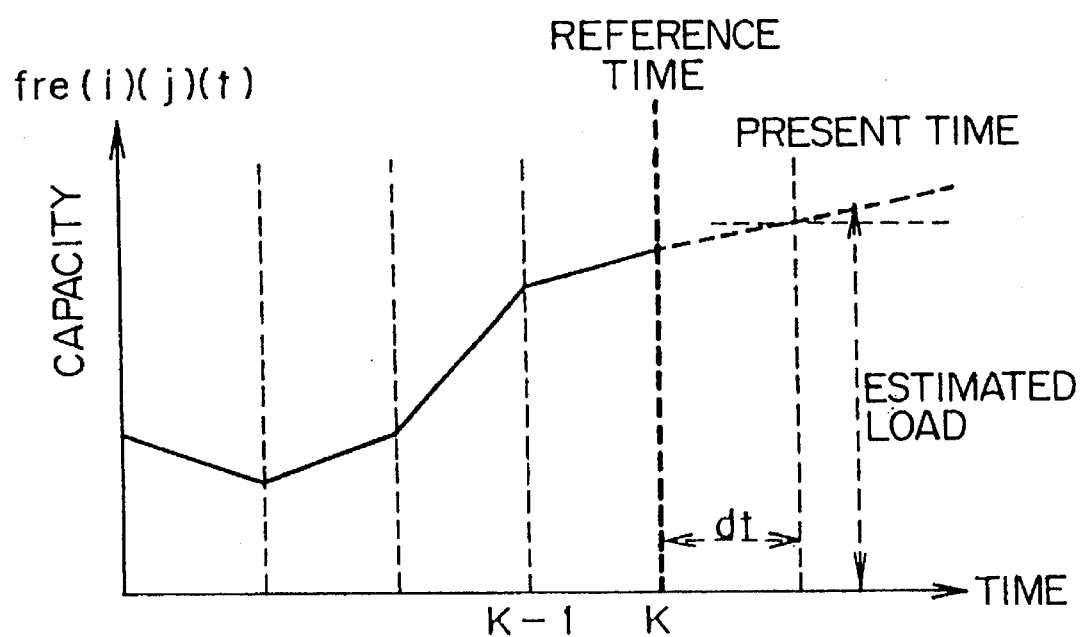
FIG. 48 shows a linear estimation of a spare capacity.

FIG. 48 shows the linear estimate used to estimate a spare capacity. In FIG. 48, an estimated value of a spare capacity can be obtained using, for example, a spare capacity at two points in the past. The following linear function is used to obtain the estimated value.

[Math 4]
$$f_{re}(i)(j)(k+dt) = fre(i)(j)(k) + \frac{fre(i)(j)(k) - fre(i)(j)(k-1)}{(k) - (k-1)} \times dt$$

where fre (i)(j)(k+dt) is an estimated value for the spare capacity of the output link from node i at dt after reference time k to node j.

Figure 49:
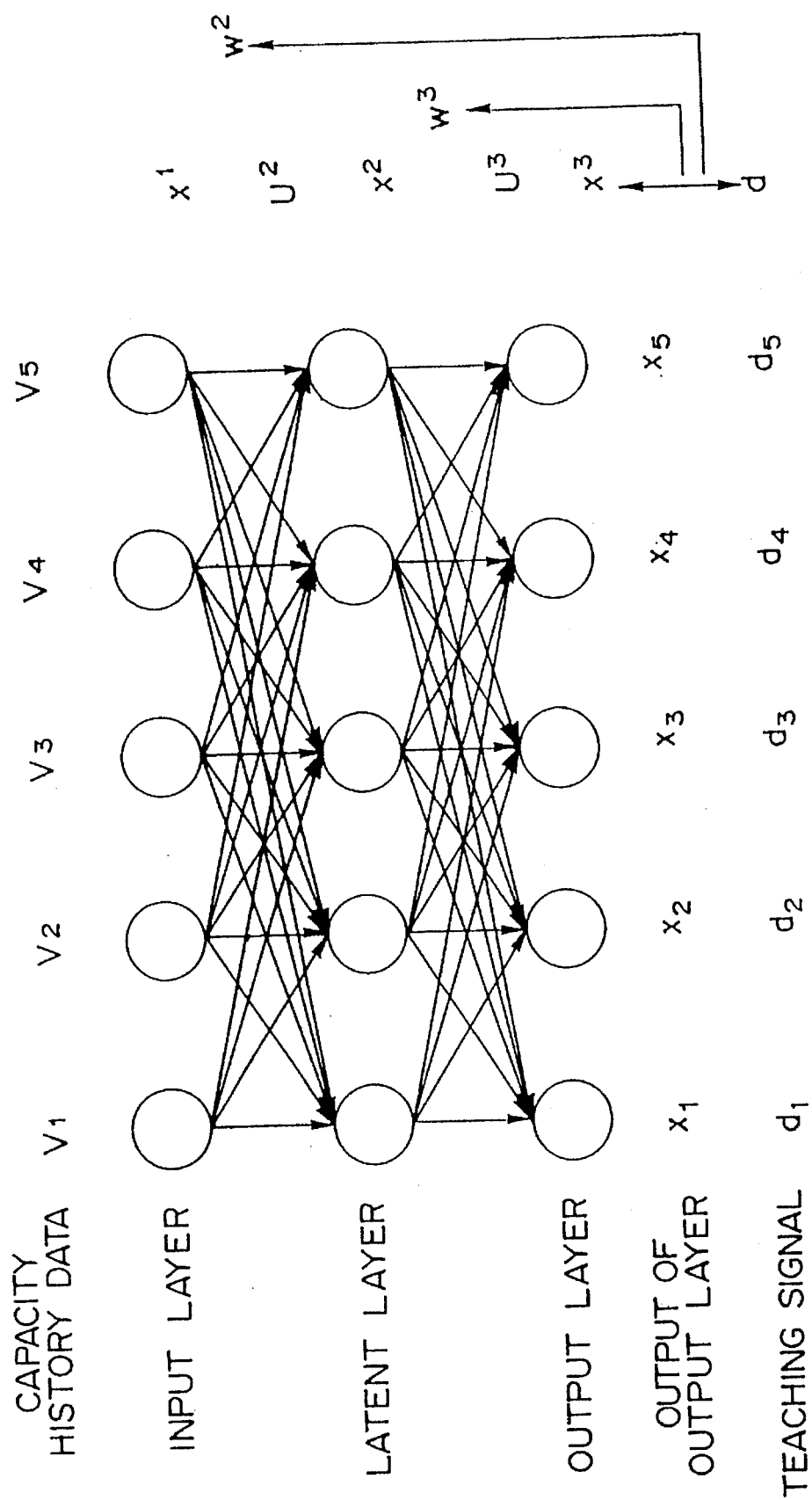
FIG. 49 shows an operation of a neural network in a learning phase.
Figure 50:
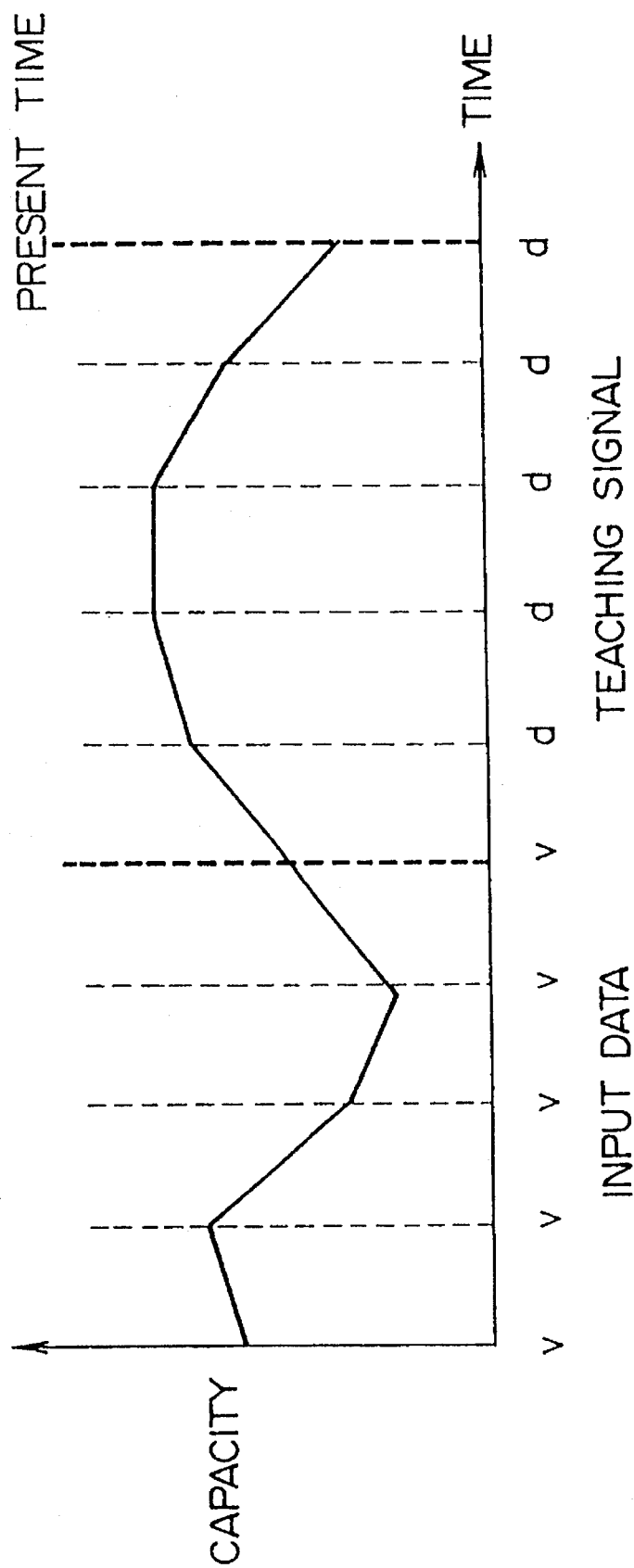
FIG. 50 shows how to provide input data and teaching signals to a neural network in a learning phase.

Then, described below is a method of estimating using a neural network a spare capacity through the capacity change estimating unit 92 shown in FIG. 43. FIG. 49 shows the neural network in the learning phase. FIG. 50 shows how to provide input data and teaching signals to the neural network.

In a hierarchical neural network shown in FIG. 49, the number of units in the m-th layer is nm, an input to a unit is $U^m_i$, an output is $x^m_i$, and the coupling matrix to the m-th layer is $W^m$. The operation is represented by the following equation.

[Math 5]
$$U_i^m = \sum_{j=1}^{n_{m-1}} w_{ij}^m x_i^{m-1} \qquad \text{equation (5)}$$

$$X_i^m = f(U_i^m)$$

The superscripts indicate layer numbers, and the subscripts indicate unit numbers in the layer.

The neural network is designed to output an estimate through a learning. It is attained by minimizing square errors between the output of the last layer $(x^3_1, \ldots, x^3_{n1})$ and the teaching signal $(d_1, \ldots, d_{n3})$ when an input vector $(x^1_1, \ldots, x^1_{n1})$ is provided.

The square error of the output can be defined by the following equation.

[Math 6]
$$E = 1/2 \sum_{i=1}^{n_3} (x_i^3 - d_i)^2$$

The differentiation of the output of the output error in the last layer is represented as follows:

[Math 7]
$$\partial E/\partial X^3_i = X^3_i - d_i$$

It corresponds to the output error in the layer.

Similarly, the slope of the output error of the intermediate layer is obtained as follows.

[Math 8]
$$\partial E/\partial x_i^2 = \sum_{k=1}^{n_3} (\partial E/\partial x_k^3) \times (\partial x_k^3/\partial u_k^3)(\partial u_k^3/\partial x_i^2)$$
$$= \Sigma(\partial E/\partial x_k^3) f'(u_k^3) w_{ki}^3$$

Thus, the square error minimizing learning is performed and the change amount of the coupling matrix is obtained by the following equation.

$$\Delta w_{ij}^m = -\mu \partial E/\partial w_{ij}^m \qquad \text{equation (6)}$$
$$= \mu \partial E/\partial x_i^m \, \partial x_i^m/\partial u_i^m \, \partial u_i^m/\partial w_{ij}^m$$
$$= \mu \partial E/\partial x_{ij}^m (u_i^m) \, x_j^{m-1}$$

When an input is provided, the calculation proceeds according to the equation (5), and the last result is compared with a teaching signal. To minimize an error, a coupling coefficient is modified according to equation (6) in the reverse order, that is, from output layer to input layer. Since the coupling error is modified in the reverse order to minimize the square error, the neural network of this type is referred to as a back-propagation network. To estimate a spare capacity through the neural network, a measurement value is given by segmenting the load between optional nodes by optional time t as input vectors $(x^1_1, \ldots, x^1_{n1})$ as shown in FIG. 50. Then, an actual load between the nodes is provided as a teaching signal. The network performs a learning process such that the error between the output of the network and the teaching signal can be minimized. It repeats the learning process a sufficient number of times, and the output value is obtained as an estimated value.

Figure 51:
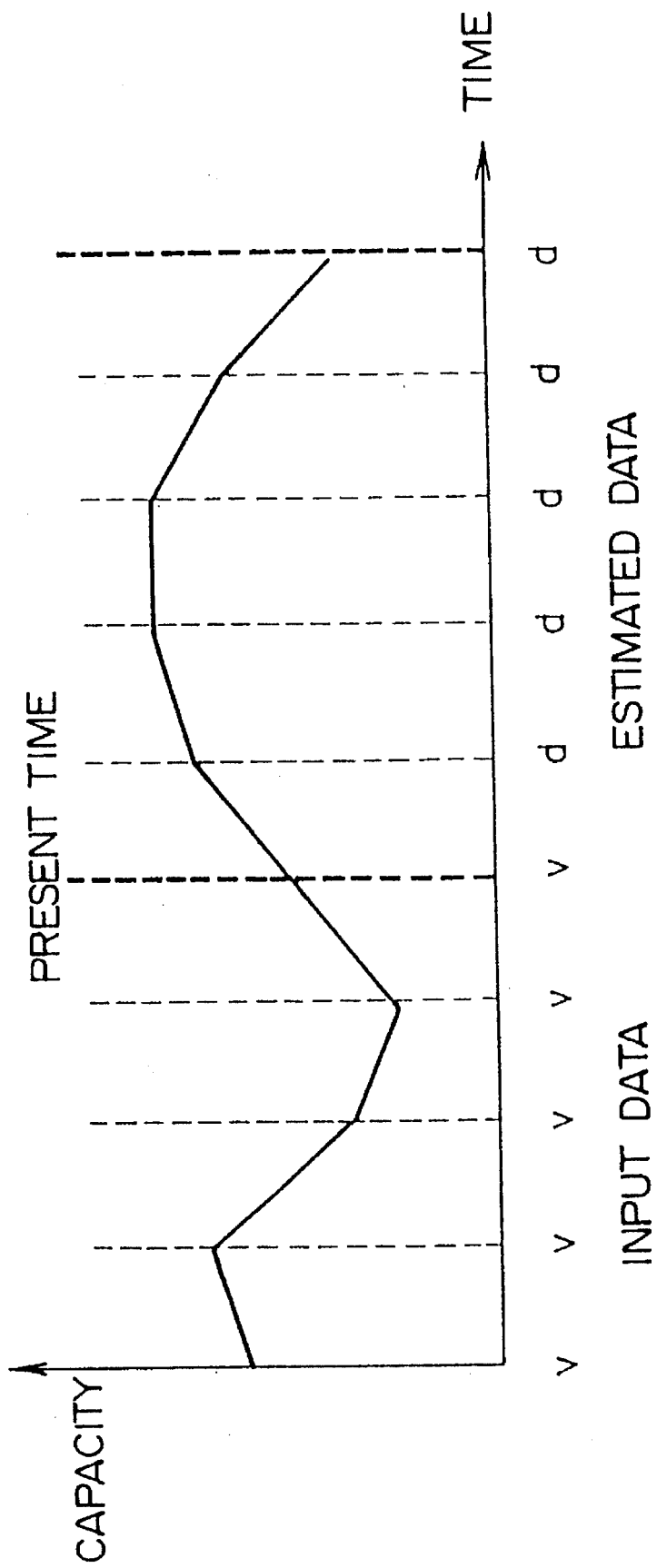
FIG. 51 shows input data and output values (estimated data) for a neural network in a learning phase.
Figure 52:
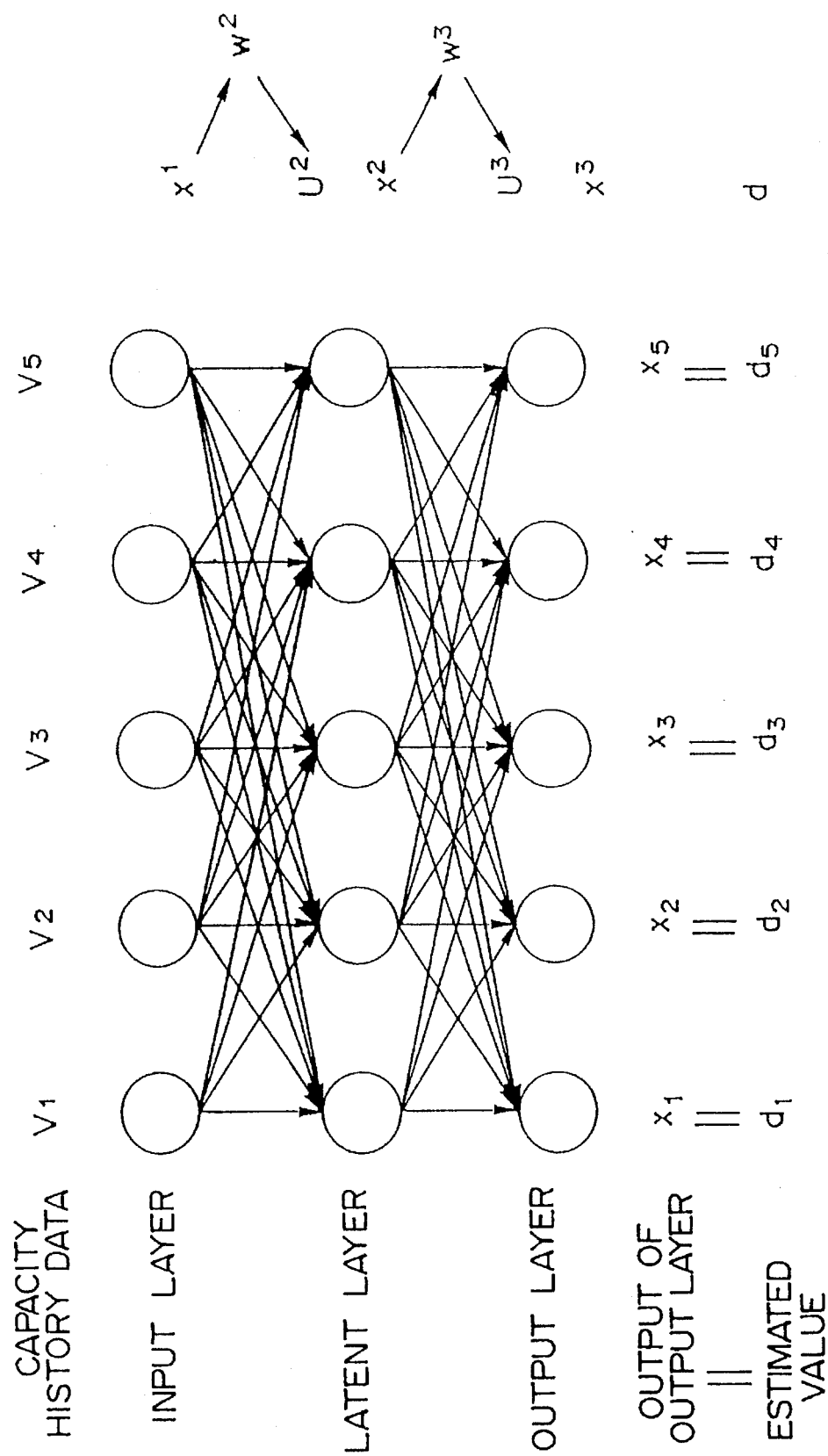
FIG. 52 shows an operation of a neural network in an estimation phase.

FIG. 51 shows the input data and the output value, that is, estimated data of a neural network in the estimate phase in which a spare capacity is estimated using the neural network Which has finished learning. FIG. 52 shows the operation of the neural network in the estimate phase. In these figures, spare capacity values of a link at a plurality of time points are applied to an input layer unit, and estimated values of the spare capacities of the link at present up to a few time points later are output. According to the present embodiment, the value at the time point nearest to the present time among the plurality of estimated values is assigned as an estimated value to variable fr in step S93 shown in FIG. 46.

Figure 53:
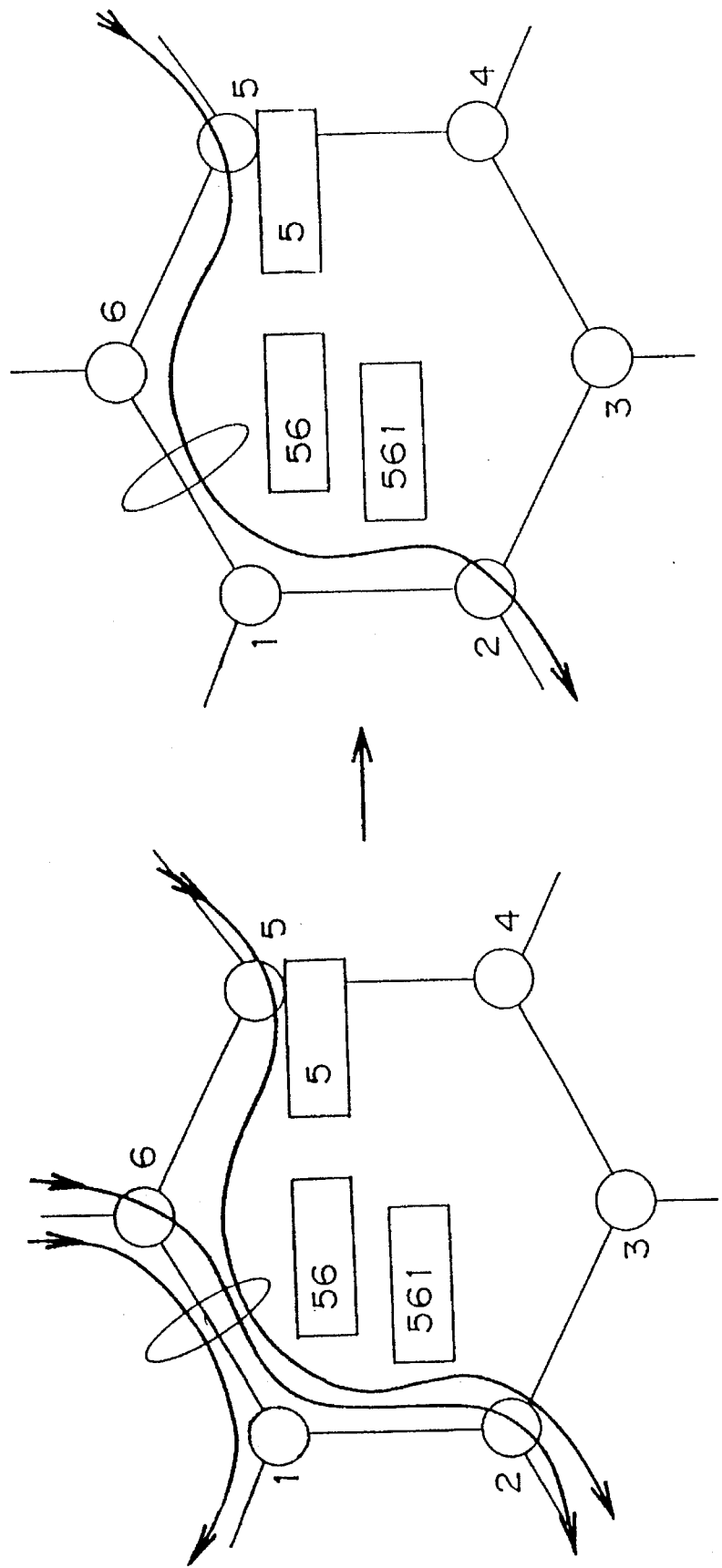
FIG. 53 shows a redundancy of an information packet.

In the above explanation, the operation of transmitting information packets from the end point node to the start point node in a communications path as described with reference to FIG. 29 is performed for all communications paths. However, if communications paths are duplicates, or a communications path is completely included in another communications path, then the communications packet is redundant. FIG. 53 explains the redundancy of an information packet. As shown on the left in FIG. 29, when three information packets are transmitted from node 6 to node 1, node 6 to node 2 by way of node 1, and from node 5 to node 2 by way of nodes 6 and 1 respectively, two information packets are transmitted to the output link from node 2 to node 1, and three information packets are transmitted from the output link from node 1 to node 6. The Spare capacity of each of the output links stored in the information packet is obtained by subtracting a sum of the spare capacities being used by the duplicated virtual paths from the spare capacity of the physical transmission link if a plurality of paths are duplicates. The obtained value is common among the duplicates and sending three information packet's may reduce the communication efficiency of a communications network. Therefore, the spare capacity of each output link can be known to all nodes by transmitting information packets only from node 5 to node 2 by way of nodes 6 and 1 in a communications network as shown on the right in FIG. 53.

Figure 54:
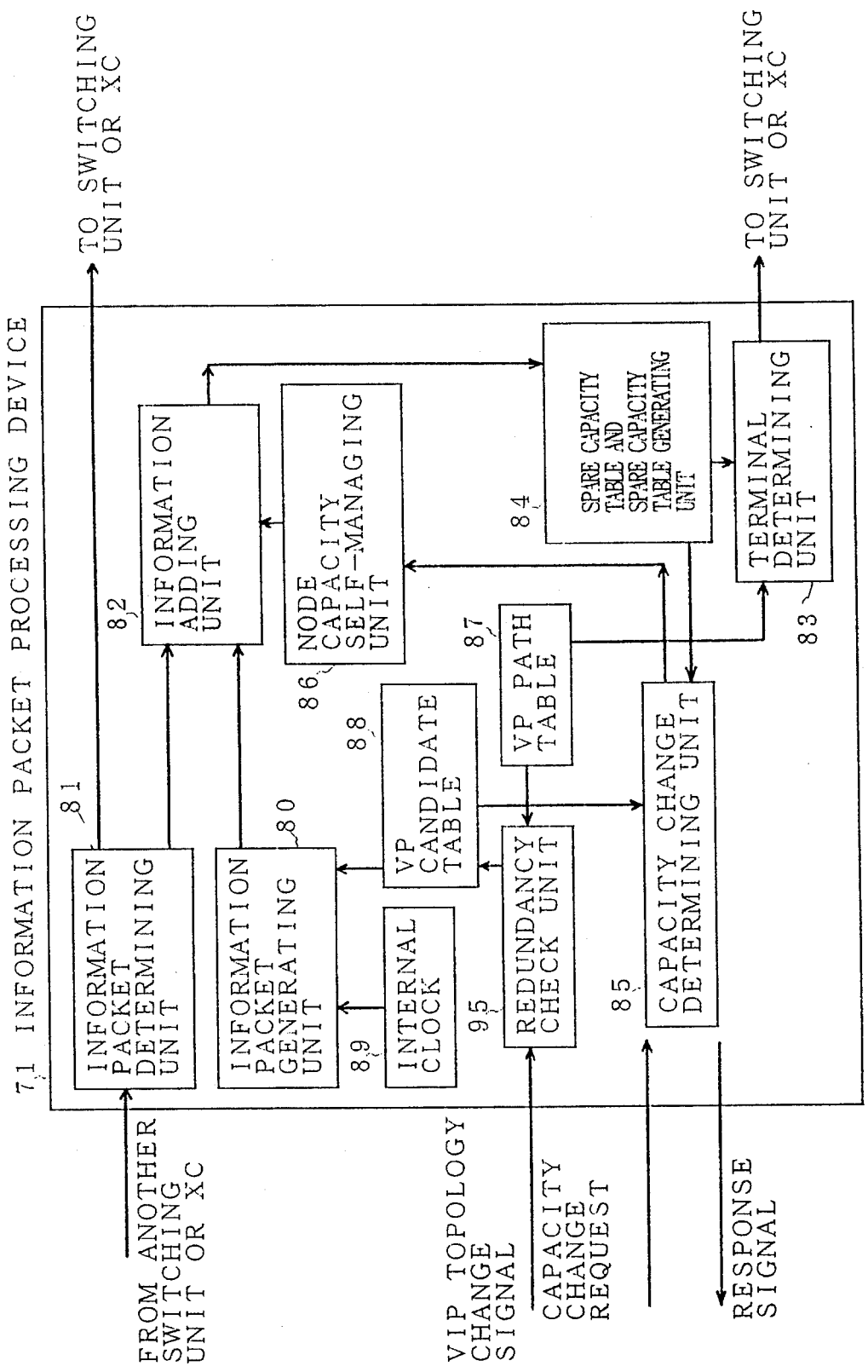
FIG. 54 is a block diagram showing the detailed configuration of the information packet processing device for removing the redundancy of an information packet.
Figure 55:
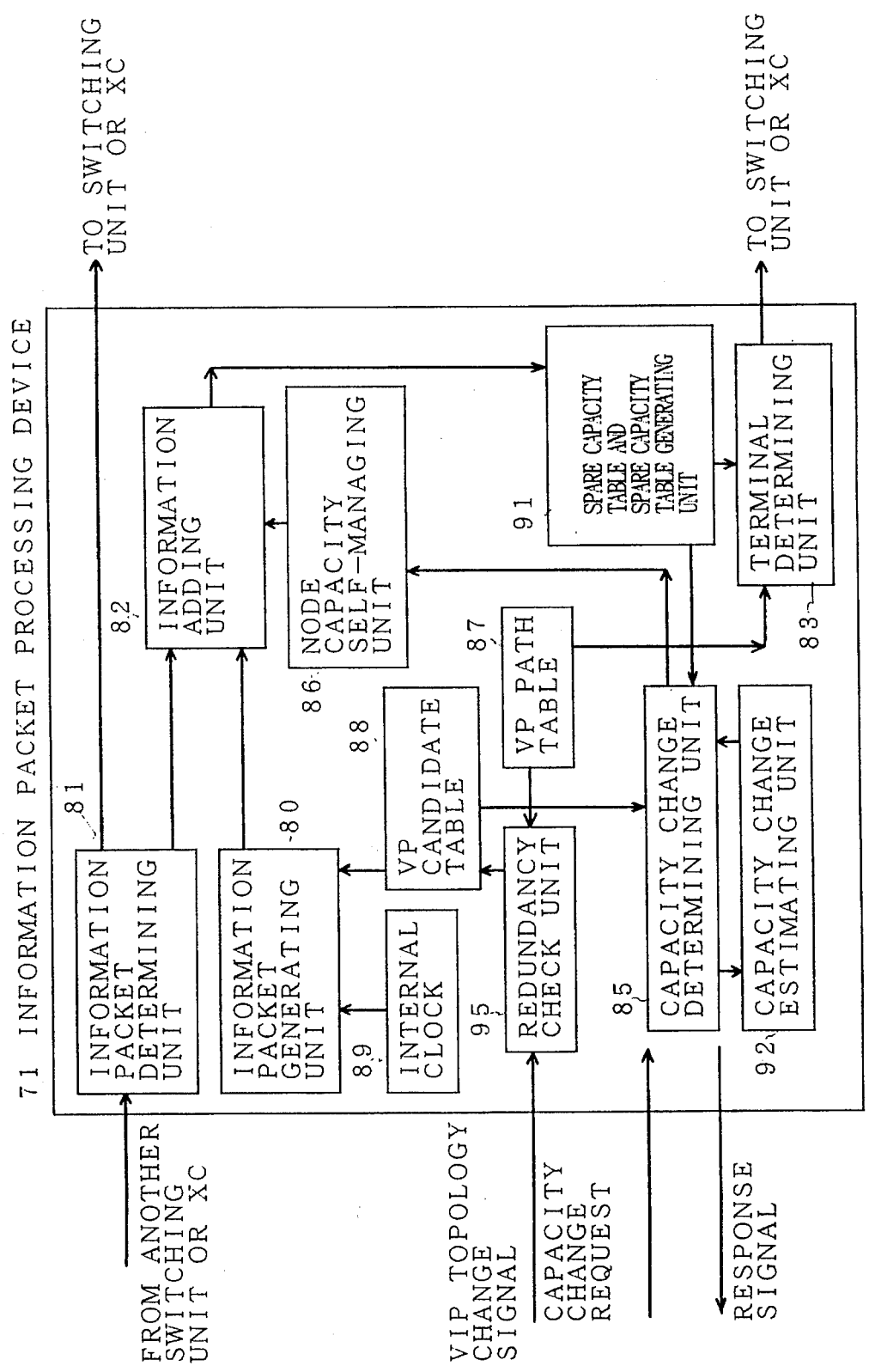
FIG. 55 is a block diagram showing the detailed configuration of the information packet processing device for removing the redundancy of an information packet and estimating a capacity change.

FIGS. 54 and 55 are the block diagrams showing the configuration of the information packet processing device when an information packet is not transmitted for a communications path completely included in another communications path, that is, when the redundancy of information packets is removed. FIG. 54 corresponds to the case when a spare capacity is not estimated, that is, the configuration shown in FIG. 33. FIG. 55 corresponds to the case when a spare capacity is estimated, that is, the configuration shown in FIG. 43.

FIGS. 54 and 55 are different from FIGS. 33 and 43 in the two following points. First, a redundancy check unit 95 is provided to check the redundancy of a virtual path in response to an input of a VP topology change signal for use in changing the virtual path. Second, for example, as shown in FIG. 54, the spare capacity table and the spare capacity table generating unit 84 is provided between the information adding unit 82 and the terminal determining unit 83, and an information packet is transmitted to the terminal determining unit 83 after a spare capacity table is generated by the spare capacity table and the spare capacity table generating unit 84. At this time, if the present node is the relay node of the information packet, then the information packet is transmitted to a switching unit or the cross-connect 72. If the present node is the end point node of the information packet, then the packet is discarded. A spare capacity table is generated in a relay node of an information packet by a spare capacity table and a spare capacity table generating unit because a start point node of a communications path shown in FIG. 53 may not receive an information packet corresponding to the communication path, and therefore, upon receipt of the information packet transmitted from node 5, required spare capacity data among spare capacity data stored in the information packet are stored in the table to be used in determining the acceptability of a size change request.

Figures 56A, 56B:
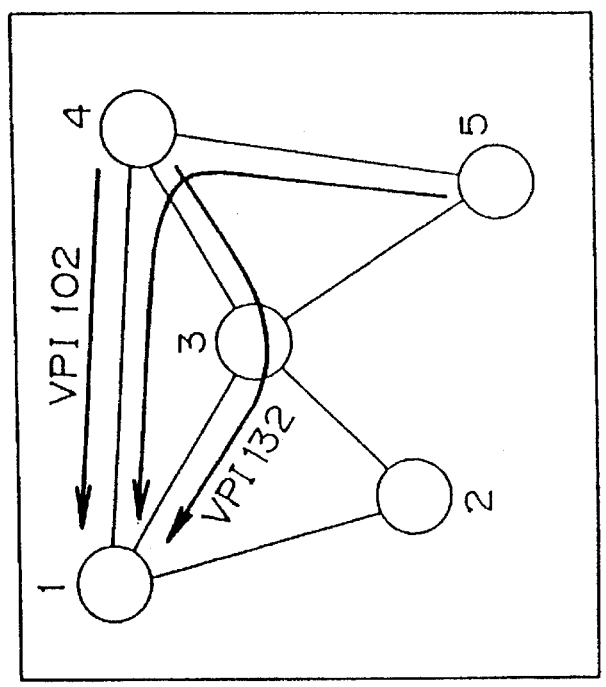
FIGS. 56A and 56B respectively show a redundancy flag in the VP candidate table (VP lists)

The redundancy shown in FIG. 53 is represented by the value of a redundancy flag in the VP candidate table shown in FIG. 35. FIG. 56 shows the redundancy flag. As shown in FIG. 56A, the virtual path (VPI102) from node 4 to node 1 is completely included by the virtual path from node 5 to node 1 by way of node 4. Therefore, as shown in FIG. 56B, the value of the redundancy flag for the virtual path assigned VPI 102 is 1, and that for the virtual path assigned VPI 132 is 0 in the VP candidate table provided in node 4.

FIG. 57 is the flowchart of the information packet transmitting process with redundancy suppressed, that is, the flowchart of the process performed by the information packet generating unit 80 shown in FIGS. 54 and 55. FIG. 57 is almost the same as FIG. 34, but is different in the following points. That is, it is determined whether or not the redundancy flag stored in the third column in the VP candidate table indicates 1 between steps S52 and S53. If yes, there is no need to transmit an information packet to the virtual path, the value of i is incremented in step S56, and the processes in and after step S52 are repeatedly performed.

Figure 58:
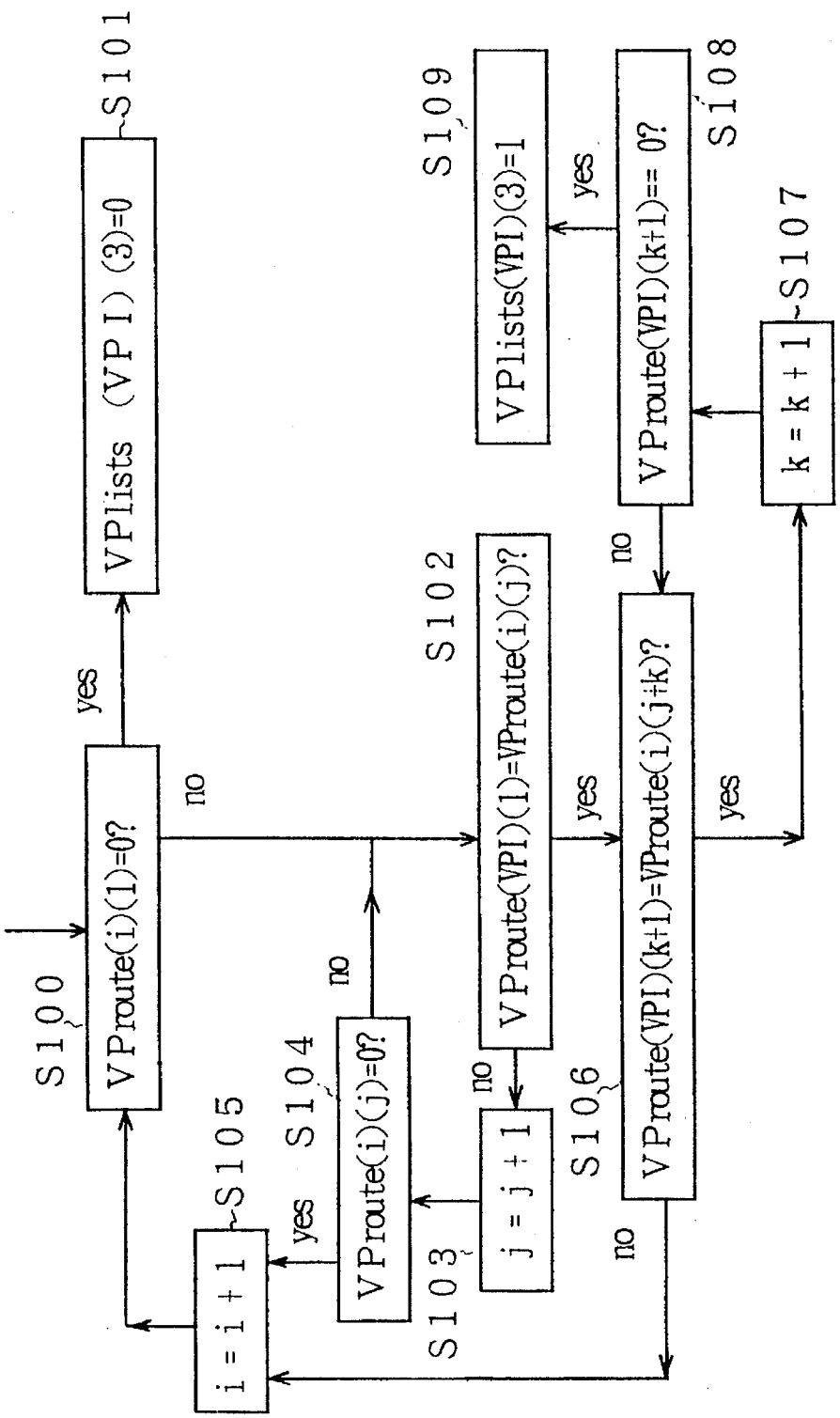
FIG. 58 is a detailed flowchart of the redundancy determining process for a VPI.

FIG. 58 is the flowchart showing the process of determining whether or not a virtual path having a specified VPI is completely included in another virtual path when it is given, that is, whether or not the redundancy flag is to be set to 1. FIG. 58 is described below by referring to an example of storing the VP path table shown in FIG. 47.

In FIG. 58, the process starts after the values of i, j, and k are set to 1, and it is determined whether or not the first node identifier of the path information for the VPI in the first line shown in FIG. 47 in step S100 is 0. When the value is 0, then the table stores no practical path information. The table accommodates data for all the virtual paths set in the communications network. If the table stores no practical path information, then the redundancy flag is set to 0 for the object VPI in step S101 and the process terminates.

By contrast, if the first identifier is not 0, it is determined whether or not the value of the identifier, that is, 6 in this case, matches the first node identifier in the path information corresponding to an object VPI in step S102. Considering the path VPI=5 in the second line of the VP path table to be checked for redundancy, the first node identifier is 2 and therefore does not match 6. As a result, the value of j is incremented in step S103 and control is passed to the process in step S104.

In step S104, it is determined whether or not the path information at the next position in the line specified by i, that is, the first line, indicates 0. In this case, the node identifier is 4, not 0, and the processes in and after step S102 are repeatedly performed. In this loop, it is checked if any of the node identifiers contained in the first path information matches the first node identifier 2 in the second line to be checked for redundancy. Since the first line contains no node identifier 2, the process for the first line terminates when the sixth value 0 of the path information is detected. Then, the value of i is incremented in step S105, and the processes from step S100 are repeatedly performed. However, since the VPI 5 to be checked for redundancy is located in the second line, the process for the second line is omitted, and the processes in and after step 100 are repeatedly performed on and after the third line.

During the process performed for the third line, when j equals 3, the first node identifier 2 in the path information for VPI=5 matches the third node identifier in the third line. At this time, control is passed to the process in step S106.

In step S106, it is determined whether or not the next node identifier when VPI=5, that is, 5 in this case, matches the next node identifier in the path VPI=4 in which the start point of the path 4 is contained. That is, with k=1, the second value of the path information for VPI=5 is compared with the fourth value of the path information for VPI=4. In this case, these value match each other and the value of k is incremented in step S107. Then, control is passed to the process in step S108.

In step S108, it is determined whether or not the (k+1)th value of the pass information for the VPI to be checked for redundancy is 0. The determination is equivalent to a checking as to whether or not the virtual path ends at that point. In this case, the value of k is 2, and the value of the path information to be determined is 6. As a result, the processes in and after step S106 are repeatedly performed.

In FIG. 47, 2, 5, 6, 3, and 1 are the path information of VPI=5 to be checked for redundancy and are completely contained in the path information in the third line, and the loop process from step S106 to S108 is performed repeatedly until the value of the path information for VPI=5 indicates 0 in step S108. When a "0" is detected as a value of the path information in step S108, the virtual path VPI=5 is completely included in the virtual path VPI=4. The redundancy flag for the VPI is set to 1 in step S109, and the process terminates.

On the other hand, even if the first value of the path information for the VPI to be checked for redundancy is detected in another path information, for example, the path information of VPI=6 in the fourth line, it is determined that the virtual path to be checked for redundancy shares a part of the path with the virtual path in the fourth line when non-coincidental values are detected among path information values during the loop process in steps S106 through S108, that is, when 3 and 7 are detected as non-coincidental values in step S106. In this case, the value of i is incremented in step S105, and the redundancy determining process for the next line is repeatedly performed from step S100. Unless redundancy is determined all through the VP path table, the value of the flag is set to 0 in step S101, and the process terminates.

As described above, according to the first embodiment of the present invention, the topologies of a physical network and a logical network are designed independently of a traffic condition in a communications network comprising the physical network and the logical network. The capacities of the physical network and the logical network can be designed based on a long-term traffic demand and the amount of an actual traffic demand respectively. As a result, both long-term and short-term traffic demands can be flexibly accepted in simple designing procedures, and appropriate processes can be performed in response to traffic fluctuation, thereby providing a simple and flexible communications network designing method.

According to the second embodiment, the traffic fluctuation can be accepted by a simple control algorithm. Even if unbalanced loads are provided or a "burst" load occurs, a virtual path can be efficiently accommodated by combined use of the band divisional management method in which the band of a physical transmission link is divided into a shared band and a reserved band and the limited detour routing method for a limited number of detour paths available. Thus, the transmission efficiency can be greatly improved and communications path resources can be effectively utilized.

According to the third embodiment, a start point node of a communications path can quickly select an optimum communications path in response to a capacity change request of a communications network by transmitting an information packet indicating a spare capacity of each physical transmission link over the communications network. Thus, the present invention has greatly improved an ATM technology for practical use and the communication quality of a broadband ISDN using the ATM technology.

What is claimed is:

1. A traffic and topology independent communications network designing system for use in a communications network having a physical network and a logical network established among a plurality of nodes, comprising:

physical network topology designing means for setting a topology of the physical network independently of a traffic condition of the communications network;

logical network topology designing means for setting a topology of the logical network independently of the traffic condition;

physical network capacity setting means, coupled to said physical network topology designing means, for setting, based on a long-term traffic demand in the communications network, a capacity of a physical transmission line in the physical network having the topology defined by said physical network topology designing means; and logical network capacity setting means, coupled to said logical network topology designing means, for setting, based on an actual traffic demand in the communications network, a capacity of a virtual path in the logical network having the topology defined by said logical network topology designing means, wherein topologies and capacities of the physical and logical networks can be independently designed.

2. The traffic and topology independent communications network designing system according to claim 1, wherein said physical network topology designing means designs the topology of the physical network corresponding to the topology of the logical network topology designed by said logical network topology designing means such that:

a number of physical transmission links accommodated in each of a plurality of cross-connects does not exceed a predetermined value in a topology of a network whose number of physical transmission links connecting said plurality of cross-connects in the physical network corresponding to either a start connection point, an end connection point or an intermediate connection point of each virtual path connection connecting start and end points of each of virtual paths required in the logical network is a minimum;

a total number of the physical transmission links to realize all virtual path connections is a minimum when counted for each virtual path connection; and a total length of the physical transmission links is a minimum.

3. The traffic and topology independent communications network designing system according to claim 1, wherein corresponding to the topology of the logical network topology designed independently of the traffic condition, said logical network topology designing means sets path information including an identification number and route information of each virtual path required in the logical network, sets to "0" a capacity of a path as a part of the path information, and enables an optional virtual path to be used by only assigning the capacity without selecting a route at a time of using the virtual path in actual communications.

4. The traffic and topology independent communications network designing system according to claim 1, further comprising:

long-term demand change detecting means for detecting a change in a long-term traffic demand and requesting said physical network capacity setting means to redesign the capacity of the transmission line in the physical network when a change amount of the long-term demand exceeds a predetermined value.

5. The traffic and topology independent communications network designing system according to claim 4, wherein said long-term demand change detecting means monitors a use rate of each of a plurality of transmission lines through accommodation of virtual paths in the physical network and requests to redesign the capacity of the transmission line in the physical network when the use rate is higher than a predetermined upper limit or lower than a predetermined lower limit, that is, when the change amount of the long-term demand is other than the predetermined value.

6. The traffic and topology independent communications network designing system according to claim 1, further comprising:

actual traffic demand change detecting means for detecting a fluctuation in an actual traffic demand and requesting said logical network capacity setting means to redesign the capacity of virtual paths in the logical network when a fluctuation amount of the actual traffic demand exceeds a predetermined value.

7. The traffic and topology independent communications network designing system according to claim 6, wherein said actual traffic demand fluctuation detecting means monitors a lost-call rate, a discarded-cell rate, and a cell delay time in the physical network through accommodation of virtual paths in the logical network and requests to redesign the capacity of the virtual path in the logical network when the lost-call rate, the discarded-cell rate, or the cell delay time is higher than a predetermined upper limit, that is, when the fluctuation amount of the actual traffic demand exceeds the predetermined value.

8. A network design management center for designing a logical network for use in a communications network having a logical network established among a plurality of nodes, comprising:

a first signal processing means for receiving a traffic condition of the communications network from one of the nodes in the communications network and outputting traffic information;

circuit control means for controlling a design change of a capacity of a virtual path based on said traffic information and a present capacity of the virtual path in the logical network;

logical network capacity setting means for changing a design of the capacity of the virtual path according to a virtual path capacity change request from said circuit control means;

a second signal processing means for outputting to the node a virtual path capacity design change instruction output from said logical network capacity setting means; and logical network topology designing means for setting a topology of the logical network independently of the traffic condition.

9. The network design management center according to claim 8, wherein said circuit control means comprises:

comparing means for comparing the traffic information from the node with the present capacity of the virtual path;

determining means coupled to said comparing means, for determining whether or not a redesigning should be performed based on an output of said comparing means and a redesign determination criterion; and redesigning request means, coupled to said determining means, for requesting according to an output of said determining means, said logical network capacity setting means to change said design of the capacity of the virtual path of the logical network.

10. The network design management center according to claim 8, further comprising:

actual traffic demand change detecting means for detecting a fluctuation in an actual traffic demand and requesting said logical network capacity setting means to redesign the capacity of virtual paths in the logical network when a fluctuation amount of the actual traffic demand exceeds a predetermined value.

11. The network design management center according to claim 10, wherein said actual traffic demand fluctuation detecting means monitors a lost-call rate, a discarded-cell rate, and a cell delay time in the physical network through accommodation of virtual paths in the logical network and requests said logical network capacity setting means to redesign the capacity of the virtual path in the logical network when the lost-call rate, the discarded-cell rate, or the cell delay time is higher than a predetermined upper limit, that is, when a fluctuation amount of the actual traffic demand exceeds the predetermined value.

12. A network design managing center for designing a physical network for use in a communications network having a physical network established among a plurality of nodes, comprising:

a first signal processing unit for receiving traffic information of the communications network;

circuit control means for controlling a capacity design change of a transmission line of the physical network based on the traffic information received from said first signal processing unit and a present capacity of the physical network;

physical network topology designing means for setting a topology of the physical network independently of a traffic condition of the communication network; and physical network capacity setting means for setting the capacity of said transmission line of the physical network of the topology set by said physical network topology designing means and changing a capacity design of the transmission line according to a physical transmission line capacity change request from said circuit control means.

13. The network design managing center according to claim 12, further comprising:

long-term demand change detecting means for detecting a change in a long-term traffic demand and requesting said physical network capacity setting means to redesign the capacity of the transmission line of the physical network when a change amount of the long-term demand exceeds a predetermined value.

14. The network designing managing center according to claim 13, wherein said long-term demand change detecting means monitors a use rate of the transmission line through accommodation of virtual paths in the physical network and requests said physical network capacity setting means to redesign the capacity of the transmission line in the physical network when the use rate is higher than a predetermined upper limit or lower than a predetermined lower limit, that is, when a change amount of the long-term demand is other than the predetermined value.

15. A communications network managing system in a communications network having a physical network and a logical network with topologies and capacities of the physical network and the logical network independently designed, wherein each node in the communications network comprises:

band managing means for managing a band of a physical transmission link from one node to an adjacent node in the physical network after dividing the band into a reserved area to be assigned to a high-priority virtual path having a high-priority communication among a plurality of virtual paths through which communications are preformed through a transmission link in the logical network, and a shared band to be used regardless of priority of the communications; and communications path connection request acceptability determining means for determining acceptability of a connection request for a communications path starting from the one node only in the shared band when the connection request is related to a low-priority communication and both in the shared band and the reserved band when the connection request is related to a high-priority communication.

16. The communications network managing system according to claim 15, further comprising:

detour path candidate registering means for preliminarily registering a plurality of communications path candidates which are available for the connection request for a communication path and providing the communications path candidates for said communications path connection request acceptability determining means at a determination of the acceptability in response to the connection request for a communication path.

17. The communications network managing system according to claim 16, wherein said detour path candidate registering means unconditionally selects and registers a predetermined number of communications paths as detour path candidates which meet a communications path condition indicated by the connection request from all communications paths from start-point nodes to end-point nodes of the communications path, and said communications path connection request acceptability determining means unconditionally selects one communications path candidate from the detour path candidates, determines the acceptability in response to the connection request for a communication path, allocates to a selected communications path a band indicated by the connection request if the connection request is acceptable, and repeats determining the acceptability of another detour path candidate after selecting it from the detour path candidates registered in said detour path candidate registering means.

18. The communications network managing system according to claim 17, wherein said detour path candidate registering means sequentially registers the predetermined number of communications paths in an ascending order starting from a shortest length to a longest length of the physical transmission link corresponding to the communications path as detour path candidates which meet a communications path condition indicated by the connection request for a communication path among all communications paths from start-point nodes to end-point nodes of the communications path; and said communications path connection request acceptability determining means selects a detour path candidate having a shortest length of the physical transmission link from the detour path candidates, determines the acceptability in response to the connection request, allocates to a selected communications path a band indicated by the connection request if the request is acceptable, and repeats determining the acceptability of detour path candidate in response to the connection request after selecting from the shortest to the longest length of the physical transmission link, the detour path candidate from the detour path candidates registered in said detour path candidate registering means.

19. The communications network managing system according to claim 16, wherein said detour path candidate registering means sequentially registers the predetermined number of communications paths from a smallest number to a largest number of the physical transmission links as detour path candidates which meet a communications path condition indicated by the connection request for a communication path among all communications paths from start-point nodes to end-point nodes of the communications path; and said communications path connection request acceptability determining means selects a communications path having a smallest number of the physical transmission links from the detour path candidates, determines the acceptability in response to the connection request, allocates to a selected detour path candidate a band indicated by the connection request if the request is acceptable, and repeats determining the acceptability of detour path candidate after selecting from the smallest number of the physical transmission links the detour path candidate from the detour path candidates registered in said detour path candidate registering means.

20. A communications network managing system in a communications network having a physical network, comprising:

information packet sending means, provided in an end-point node of a communications path set to pass through optional nodes among a plurality of nodes in the communications network, for sending through the communications path an information packet in which spare capacity information about the communications path is sent toward a start-point node of the communications path;

spare capacity information adding means, provided in each node in the communications path, for adding spare capacity information in the communications path toward an adjacent node to the information packet received from the adjacent node, and sending the information back to the start-point node through the communications path; and capacity change determining means, provided in the start-point node in the communications path, for determining based on contents of the information packet acceptability of a communication capacity change request for the communications path, wherein a communications path satisfying the communication capacity change request is selected, in response to the communication capacity change request, from a plurality of communications paths between start-point nodes and end-point nodes according to a determination result of said capacity change determining means.

21. The communications network managing system according to claim 20, wherein said capacity change determining means determines the acceptability of the communication capacity change request based on the contents of the information packet received at a plurality of points.

22. The communications network managing system according to claim 21, wherein said plurality of points are two time points.

23. The communications network managing system according to claim 22, wherein said capacity change determining means determines the acceptability of the communications capacity change request through a linear prediction based on the contents of the information packet received at the two time points.

24. The communications network managing system according to claim 21, wherein said plurality of time points include three or more time points; and said capacity change determining means determines the acceptability of the communication capacity change request based on existing change patterns of spare capacity in the communications path.

25. The communications network managing system according to claim 24, wherein said capacity change determining means determines the acceptability of the communication capacity change request based on the existing change pattern through a neural network.

26. A communications network managing system in a communications network having a physical network, comprising:

information packet sending means, provided in an end-point node of one communications path not completely included in another communications path among a plurality of communications paths set to pass through optional nodes in a plurality of nodes in the communications network, for sending through the communications path an information packet in which spare capacity information about the communications path is sent toward a start-point node of the communications path;

spare capacity information adding means, provided in each node in the communications path not completely included in said another communications path, for adding spare capacity information in the communications path toward an adjacent node to the information packet received from the adjacent node, and sending the information back to the start-point node through the communications path; and capacity change determining means, provided in the start-point node in the communications path not completely included in said another communications path, and in the start-point node of the communications path completely included in the communications path not completely included in another communications path among the nodes, for determining acceptability of a communication capacity change request for the communications path for which a present node is a start point, wherein a communications path satisfying the communication capacity change request is selected, in response to the communication capacity change request, from a plurality of communications paths between start-point nodes and end-point nodes according to a determination result of said capacity change determining means.

* * * * *